US012531073B2

(12) United States Patent
Wang et al.

(10) Patent No.: US 12,531,073 B2
(45) Date of Patent: *Jan. 20, 2026

(54) TIME-DOMAIN STEREO ENCODING AND DECODING METHOD AND RELATED PRODUCT

(71) Applicant: HUAWEI TECHNOLOGIES CO., LTD., Guangdong (CN)

(72) Inventors: Bin Wang, Shenzhen (CN); Haiting Li, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,935

(22) Filed: Dec. 19, 2023

(65) Prior Publication Data

US 2024/0153511 A1 May 9, 2024

Related U.S. Application Data

(63) Continuation of application No. 17/663,913, filed on May 18, 2022, now Pat. No. 11,900,952, which is a (Continued)

(30) Foreign Application Priority Data

Aug. 10, 2017 (CN) ......................... 201710680152.4

(51) Int. Cl.
*G10L 19/008* (2013.01)
*G10L 19/22* (2013.01)

(52) U.S. Cl.
CPC ............ *G10L 19/008* (2013.01); *G10L 19/22* (2013.01)

(58) Field of Classification Search
CPC ... G10L 19/008; G10L 19/00; G10L 19/0017; G10L 19/005; G10L 19/02; G10L 19/022; (Continued)

(56) References Cited

U.S. PATENT DOCUMENTS

2006/0195314 A1 8/2006 Taleb et al.
2006/0246868 A1 11/2006 Taleb et al.
(Continued)

FOREIGN PATENT DOCUMENTS

CN 101128866 A 2/2008
CN 101162904 A 4/2008
(Continued)

OTHER PUBLICATIONS

JungHoe Kim, et al. Enhanced stereo coding with phase parameters for MPEG unified speech and audio coding. Audi< Engineering Society Convention 127. Oct. 12, 2009, total 7 pages.
(Continued)

*Primary Examiner* — Leshui Zhang
(74) *Attorney, Agent, or Firm* — WOMBLE BOND DICKINSON (US) LLP

(57) ABSTRACT

An audio encoding and decoding method and a related apparatus are provided. The audio encoding method includes: determining a channel combination scheme for a current frame; when the channel combination scheme for the current frame is different from a channel combination scheme for a previous frame, performing segmented time-domain downmix processing on left and right channel signals in the current frame based on the channel combination scheme for the current frame and the channel combination scheme for the previous frame, to obtain a primary channel signal and a secondary channel signal in the current frame; and encoding the obtained primary channel signal and secondary channel signal in the current frame.

12 Claims, 9 Drawing Sheets

Related U.S. Application Data continuation of application No. 16/784,759, filed on Feb. 7, 2020, now Pat. No. 11,355,131, which is a continuation of application No. PCT/CN2018/100088, filed on Aug. 10, 2018.

(58) Field of Classification Search

CPC ....... G10L 19/025; G10L 19/04; G10L 19/06; G10L 19/08; G10L 19/0018; G10L 19/10; G10L 19/12; G10L 19/16; G10L 19/167; G10L 19/18; G10L 19/20; G10L 19/22; G10L 19/24; G10L 25/03; H04R 5/00; H04S 3/00; H04S 3/008; H04S 5/00; H04S 7/00

USPC .................. 704/500–504; 381/1–23; 700/94

See application file for complete search history.

(56) References Cited

U.S. PATENT DOCUMENTS

| | | | |
|---|---|---|---|
| 2008/0253576 | A1 | 10/2008 | Choo et al. |
| 2011/0106540 | A1 | 5/2011 | Schuijers et al. |
| 2012/0016680 | A1* | 1/2012 | Thesing ................ G10L 19/022 704/500 |
| 2012/0224702 | A1* | 9/2012 | Den Brinker ......... G10L 19/008 381/23 |
| 2013/0223633 | A1 | 8/2013 | Oshikiri et al. |
| 2013/0262130 | A1 | 10/2013 | Ragot et al. |
| 2015/0142451 | A1* | 5/2015 | Friedrich ............ G10L 19/0017 704/500 |
| 2016/0196831 | A1 | 7/2016 | Groeschel et al. |
| 2016/0275958 | A1 | 9/2016 | Dick et al. |
| 2018/0233154 | A1* | 8/2018 | Vaillancourt ......... G10L 19/032 |
| 2018/0286415 | A1* | 10/2018 | Vaillancourt ........... G10L 19/09 |

FOREIGN PATENT DOCUMENTS

| | | | |
|---|---|---|---|
| CN | 101552008 | A | 10/2009 |
| CN | 102157152 | A | 8/2011 |
| CN | 103026406 | A | 4/2013 |
| CN | 104347077 | A | 2/2015 |
| EP | 2323130 | A1 | 5/2011 |
| EP | 3664087 | A1 | 6/2020 |
| JP | 2002221994 | A | 8/2002 |
| KR | 102380454 | B1 | 3/2022 |
| RU | 2505941 | C2 | 1/2014 |
| WO | 2017049396 | A1 | 3/2017 |
| WO | 2017049399 | A1 | 3/2017 |
| WO | 2019070603 | A1 | 4/2019 |

OTHER PUBLICATIONS

Oh Eunmi et al "Enhanced Stereo Algorithms in the Unified Speech and Audio Coding", AES 43rd International Conference, Pohang, Korea, Sep. 29-Oct. 1, 2011, total 6 pages. XP040567673.

SO/IEC FDIS 23003-3:2011 (E), Information technology—MPEG audio technologies—Part 3: Unified speech and audio coding. ISO/IEC JTC 1/SC 29/WG 11. Sep. 20, 2011, 291 pages.

Recommendation ITU-T G.722. 7 kHz audio-coding within 64 kbil/s. Sep. 2012, 270 pages.

Bertrand Fatus. Parametric Coding for Spatial Audio. Master's Thesis, KTH, Stockholm, Sweden. Dec. 2015, 70 pages.

* cited by examiner

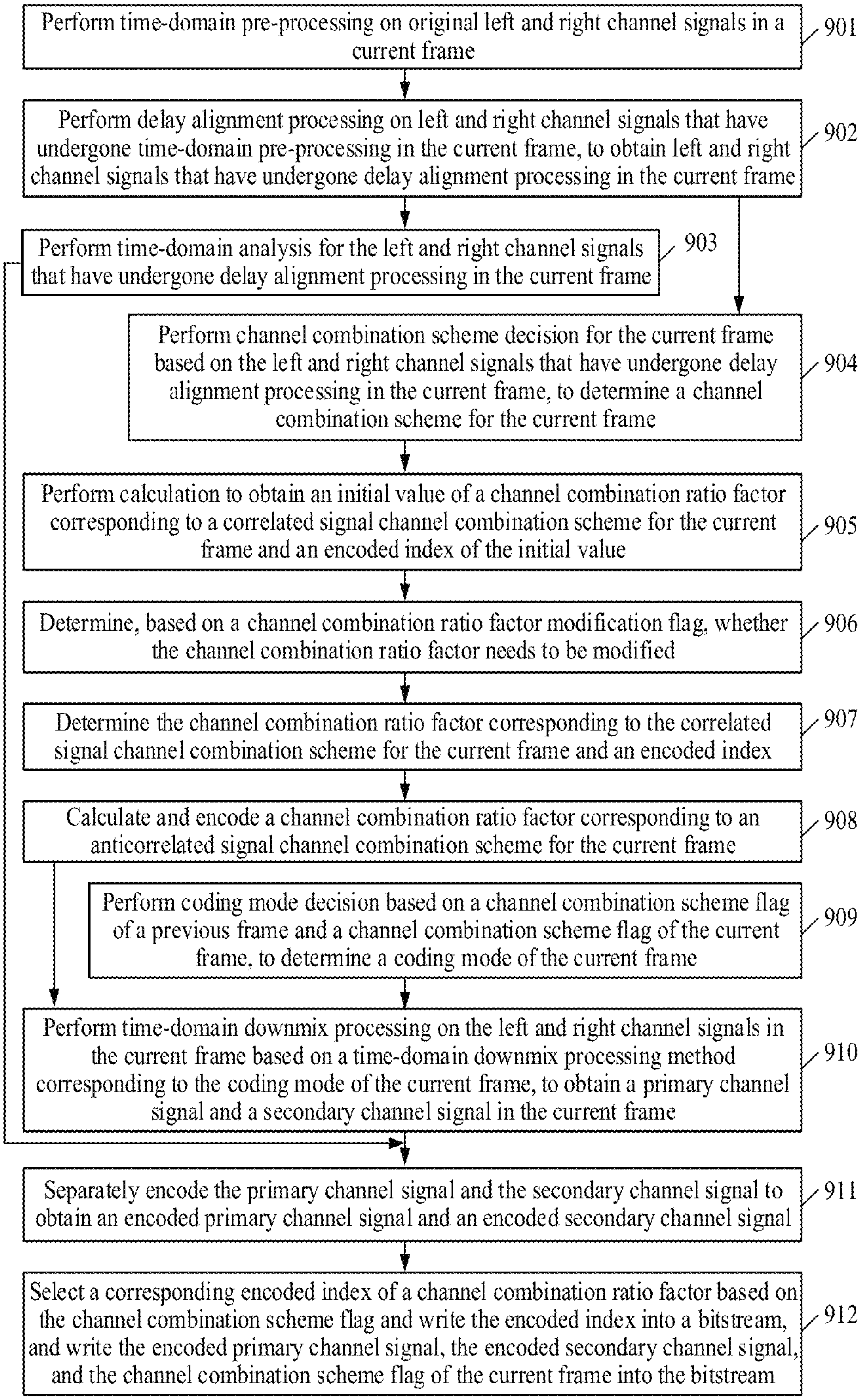
FIG. 9-A

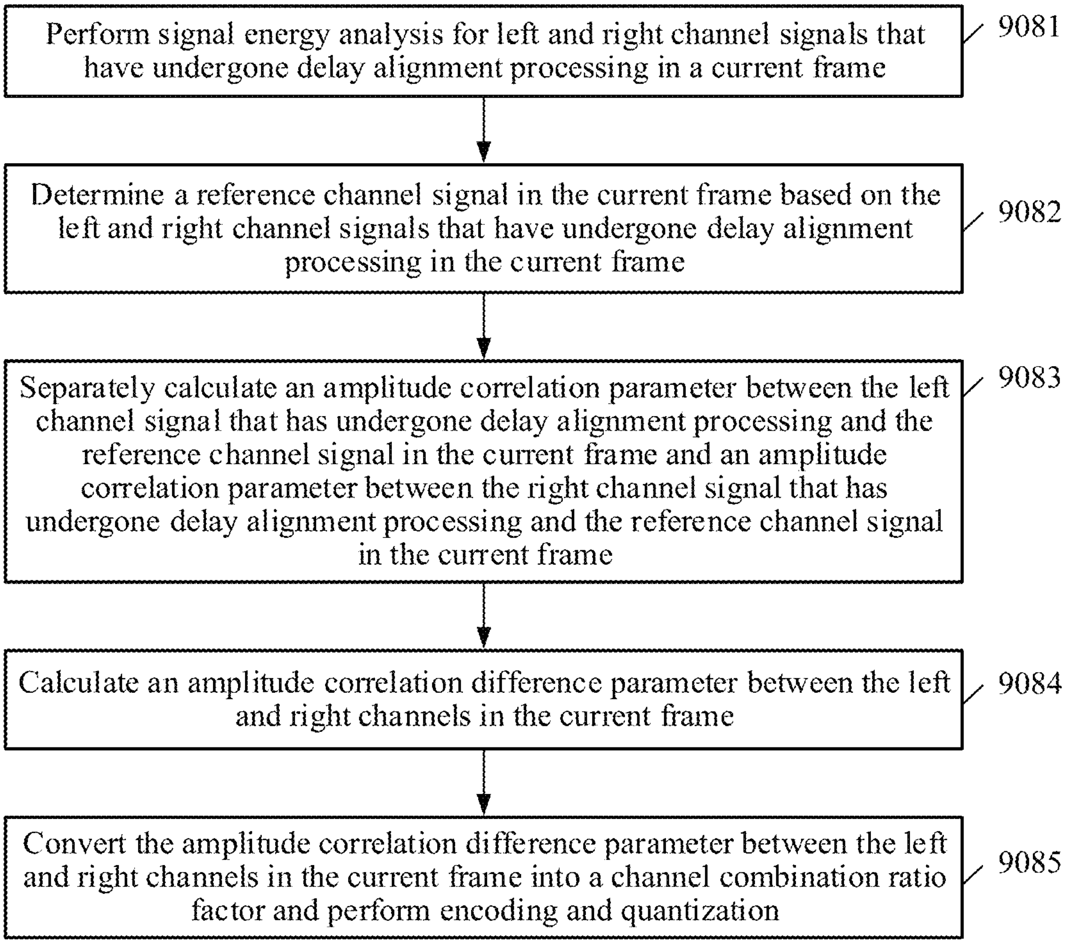
FIG. 9-B
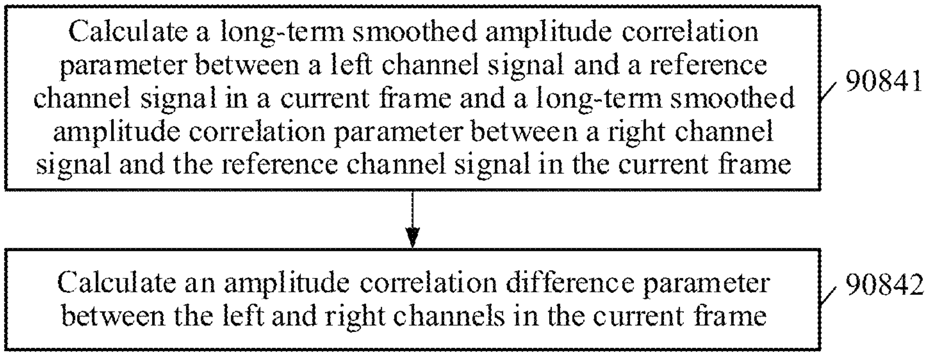
FIG. 9-C

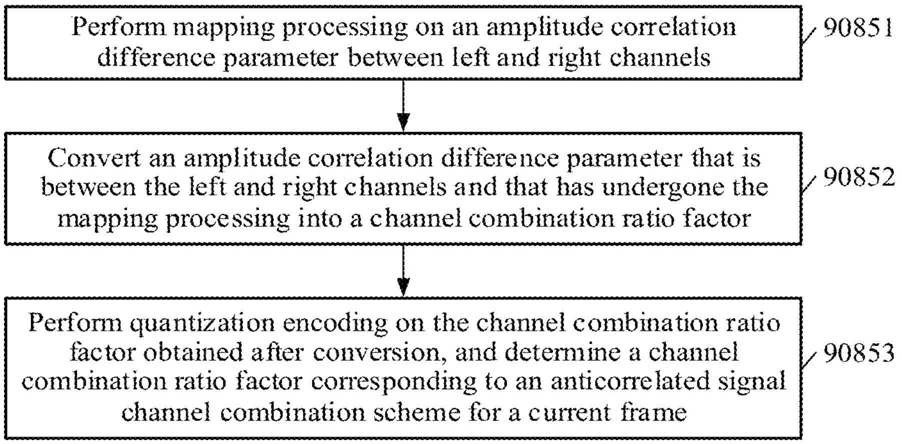
FIG. 9-D
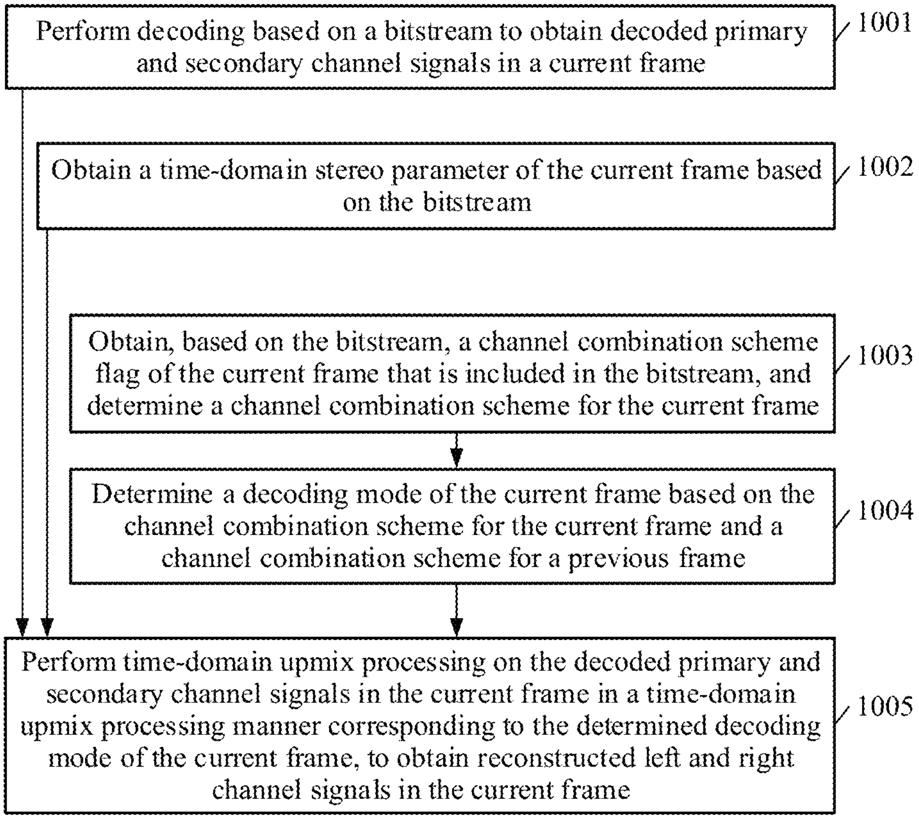
FIG. 10

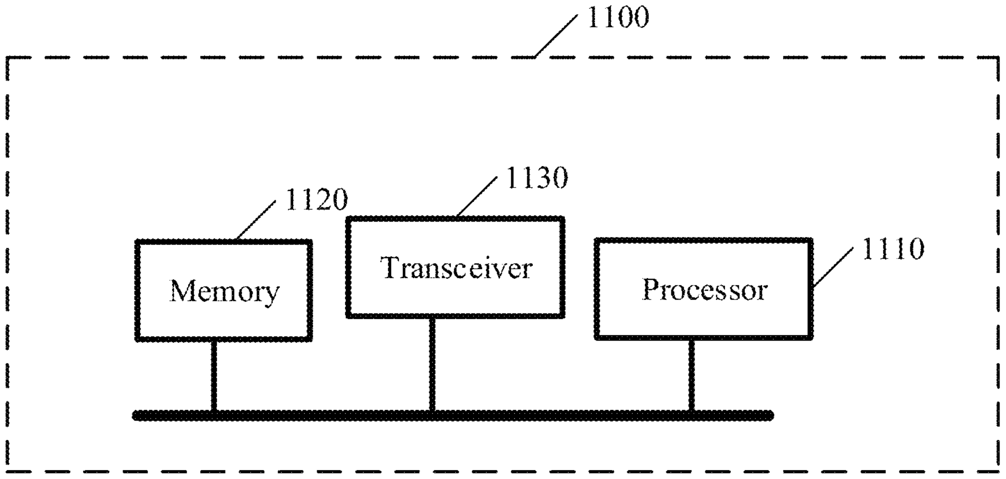
FIG. 11-A
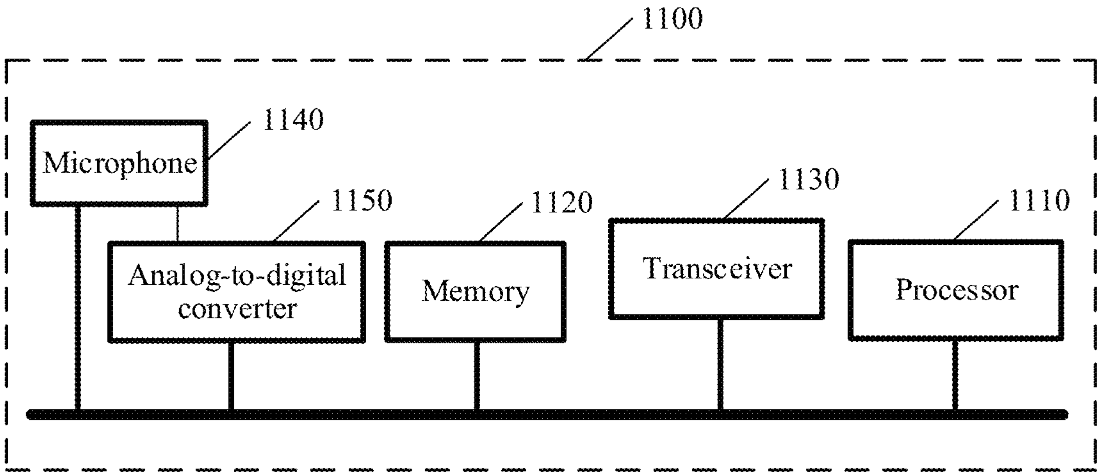
FIG. 11-B
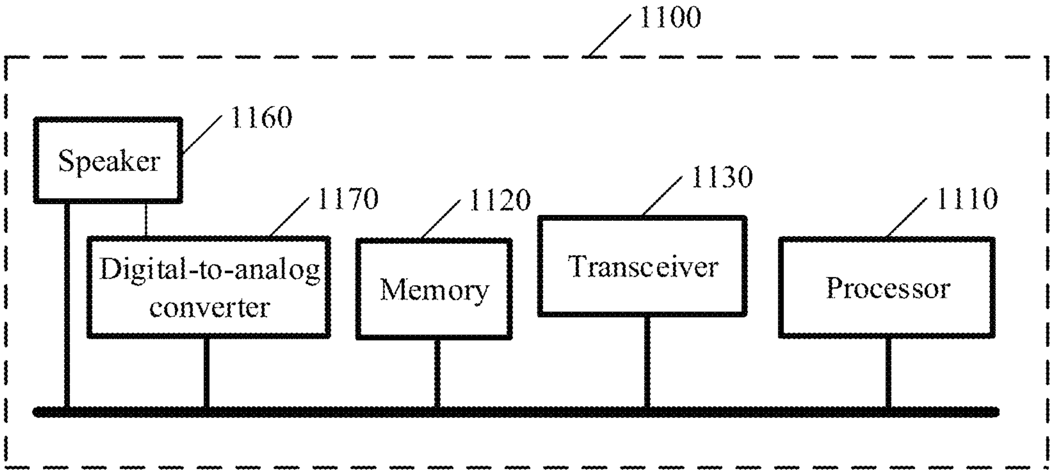
FIG. 11-C

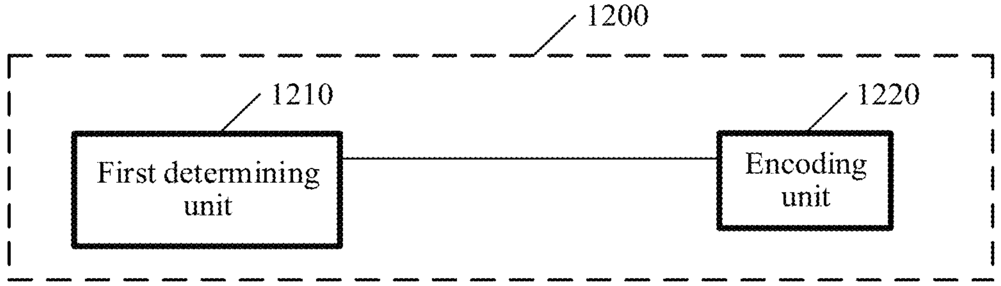
FIG. 12-A
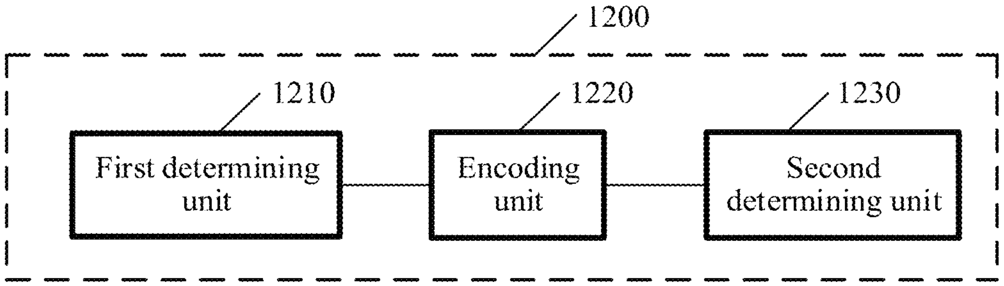
FIG. 12-B
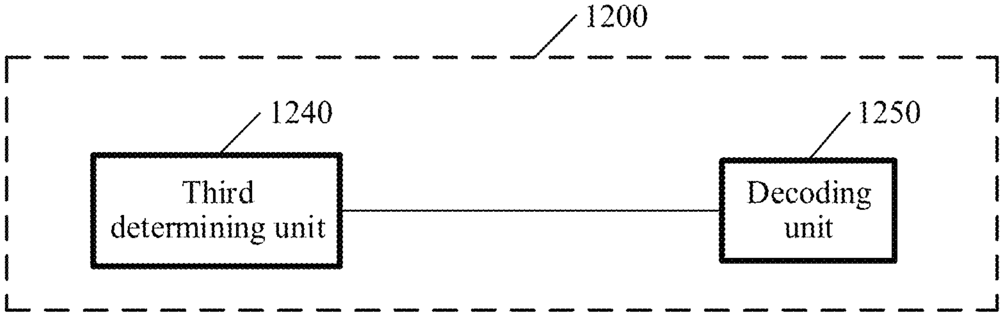
FIG. 12-C

TIME-DOMAIN STEREO ENCODING AND DECODING METHOD AND RELATED PRODUCT

CROSS-REFERENCE TO RELATED APPLICATIONS

This application is a continuation of U.S. patent application Ser. No. 17/663,913, filed on May 18, 2022, which is a continuation of U.S. patent application Ser. No. 16/784,759, filed on Feb. 7, 2020, now U.S. Pat. No. 11,355,131, which is a continuation of International Application No. PCT/CN2018/100088, filed on Aug. 10, 2018, which claims priority to Chinese Patent Application No. 201710680152.4, filed on Aug. 10, 2017. All of the afore-mentioned patent applications are hereby incorporated by reference in their entireties.

TECHNICAL FIELD

The present disclosure relates to the field of audio encoding and decoding technologies, and in particular, to a time-domain stereo encoding and decoding method and a related product.

BACKGROUND

As quality of life improves, people have increasing demands on high-quality audio. Compared with mono audio, stereo audio has a sense of direction and a sense of distribution for various sound sources, and can improve clarity, intelligibility, and a sense of presence of information, and therefore is popular among people.

In a parametric stereo encoding and decoding technology, a stereo signal is converted into a mono signal and a spatial perception parameter, and a multichannel signal is compressed. This is a common stereo encoding and decoding technology. However, in the parametric stereo encoding and decoding technology, because spatial perception parameters usually need to be extracted in frequency domain, and time-frequency conversion needs to be performed, a delay of an entire codec is relatively large. Therefore, when there is a relatively strict requirement for a delay, a time domain stereo encoding technology is a better choice.

In a conventional time domain stereo encoding technology, signals are downmixed to obtain two mono signals in time domain. For example, in an MS encoding technology, left and right channel signals are first downmixed to obtain a mid channel signal and a side channel signal. For example, L indicates the left channel signal, and R indicates the right channel signal. In this case, the mid channel signal is $0.5\times(L+R)$, and the mid channel signal indicates information about a correlation between the left channel and the right channel; and the side channel signal is $0.5\times(L-R)$, and the side channel signal indicates information about a difference between the left channel and the right channel. Then, the mid channel signal and the side channel signal are separately encoded by using a mono encoding method, the mid channel signal is usually encoded by using a larger quantity of bits, and the side channel signal is usually encoded by using a smaller quantity of bits.

It is found through research and practice that, sometimes energy of a primary signal is extremely small or even the energy is missing when the conventional time-domain stereo encoding technology is used, resulting in a decrease in final encoding quality.

SUMMARY

Embodiments of the present disclosure provide a time-domain stereo encoding and decoding method and a related product.

According to a first aspect, the embodiments of the present disclosure provide a time-domain stereo encoding method, and the method may include: determine a channel combination scheme for a current frame; when the channel combination scheme for the current frame is different from a channel combination scheme for a previous frame, performing segmented time-domain downmix processing on left and right channel signals in the current frame based on the channel combination scheme for the current frame and the channel combination scheme for the previous frame, to obtain a primary channel signal and a secondary channel signal in the current frame; and encoding the obtained primary channel signal and secondary channel signal in the current frame.

A stereo signal in the current frame includes, for example, the left and right channel signals in the current frame.

The channel combination scheme for the current frame is one of a plurality of channel combination schemes.

For example, the plurality of channel combination schemes include an anticorrelated signal channel combination scheme and a correlated signal channel combination scheme. The correlated signal channel combination scheme is a channel combination scheme corresponding to a near in phase signal. The anticorrelated signal channel combination scheme is a channel combination scheme corresponding to a near out of phase signal. It may be understood that, the channel combination scheme corresponding to a near in phase signal is applicable to a near in phase signal, and the channel combination scheme corresponding to a near out of phase signal is applicable to a near out of phase signal.

The segmented time-domain downmix processing may be understood as that the left and right channel signals in the current frame are divided into at least two segments, and a different time-domain downmix processing manner is used for each segment to perform time-domain downmix processing. It can be understood that compared with non-segmented time-domain downmix processing, the segmented time-domain downmix processing is more likely to obtain a smoother transition when a channel combination scheme for an adjacent frame changes.

It may be understood that, in the foregoing solution, the channel combination scheme for the current frame needs to be determined, and this indicates that there are a plurality of possibilities for the channel combination scheme for the current frame. Compared with a conventional solution in which there is only one channel combination scheme, this solution with a plurality of possible channel combination schemes can be better compatible with and match a plurality of possible scenarios. In addition, when the channel combination scheme for the current frame and the channel combination scheme for the previous frame are different, a mechanism of performing segmented time-domain downmix processing on the left and right channel signals in the current frame is introduced. The segmented time-domain downmix processing mechanism helps implement a smooth transition of the channel combination schemes, and further helps improve encoding quality.

In addition, because the channel combination scheme corresponding to the near out of phase signal is introduced, when a stereo signal in the current frame is a near out of phase signal, there are a more targeted channel combination scheme and coding mode, and this helps improve encoding quality.

For example, the channel combination scheme for the previous frame may be the correlated signal channel combination scheme or the anticorrelated signal channel combination scheme. The channel combination scheme for the current frame may be the correlated signal channel combination scheme or the anticorrelated signal channel combination scheme. Therefore, there are several possible cases in which the channel combination schemes for the current frame and the previous frame are different.

In one embodiment, for example, when the channel combination scheme for the previous frame is the correlated signal channel combination scheme, and the channel combination scheme for the current frame is the anticorrelated signal channel combination scheme, the left and right channel signals in the current frame include start segments of the left and right channel signals, middle segments of the left and right channel signals, and end segments of the left and right channel signals; and the primary and secondary channel signals in the current frame include start segments of the primary and secondary channel signals, middle segments of the primary and secondary channel signals, and end segments of the primary and secondary channel signals. In this case, the performing segmented time-domain downmix processing on left and right channel signals in the current frame based on the channel combination scheme for the current frame and the channel combination scheme for the previous frame, to obtain a primary channel signal and a secondary channel signal in the current frame may include:

performing, by using a channel combination ratio factor corresponding to the correlated signal channel combination scheme for the previous frame and a time-domain downmix processing manner corresponding to the correlated signal channel combination scheme for the previous frame, time-domain downmix processing on the start segments of the left and right channel signals in the current frame, to obtain the start segments of the primary and secondary channel signals in the current frame;

performing, by using a channel combination ratio factor corresponding to the anticorrelated signal channel combination scheme for the current frame and a time-domain downmix processing manner corresponding to the anticorrelated signal channel combination scheme for the current frame, time-domain downmix processing on the end segments of the left and right channel signals in the current frame, to obtain the end segments of the primary and secondary channel signals in the current frame; and performing, by using the channel combination ratio factor corresponding to the correlated signal channel combination scheme for the previous frame and the time-domain downmix processing manner corresponding to the correlated signal channel combination scheme for the previous frame, time-domain downmix processing on the middle segments of the left and right channel signals in the current frame, to obtain first middle segments of the primary and secondary channel signals; performing, by using the channel combination ratio factor corresponding to the anticorrelated signal channel combination scheme for the current frame and the time-domain downmix processing manner corresponding to the anticorrelated signal channel combination scheme for the current frame, time-domain downmix processing on the middle segments of the left and right channel signals in the current frame, to obtain second middle segments of the primary and secondary channel signals; and performing weighted summation processing on the first middle segments of the primary and secondary channel signals and the second middle segments of the primary and secondary channel signals, to obtain the middle segments of the primary and secondary channel signals in the current frame.

Lengths of the start segments of the left and right channel signals, the middle segments of the left and right channel signals, and the end segments of the left and right channel signals in the current frame may be set based on a requirement. The lengths of the start segments of the left and right channel signals, the middle segments of the left and right channel signals, and the end segments of the left and right channel signals in the current frame may be the same, or partially the same, or different from each other.

Lengths of the start segments of the primary and secondary channel signals, the middle segments of the primary and secondary channel signals, and the end segments of the primary and secondary channel signals in the current frame may be set based on a requirement. The lengths of the start segments of the primary and secondary channel signals, the middle segments of the primary and secondary channel signals, and the end segments of the primary and secondary channel signals in the current frame may be the same, or partially the same, or different from each other.

When weighted summation processing is performed on the first middle segments of the primary and secondary channel signals and the second middle segments of the primary and secondary channel signals, a weighting coefficient corresponding to the first middle segments of the primary and secondary channel signals may be equal to or unequal to a weighting coefficient corresponding to the second middle segments of the primary and secondary channel signals.

For example, when weighted summation processing is performed on the first middle segments of the primary and secondary channel signals and the second middle segments of the primary and secondary channel signals, the weighting coefficient corresponding to the first middle segments of the primary and secondary channel signals is a fade-out factor, and the weighting coefficient corresponding to the second middle segments of the primary and secondary channel signals is a fade-in factor.

In one embodiment, $$\begin{bmatrix} Y(n) \\ X(n) \end{bmatrix} = \begin{cases} \begin{bmatrix} Y_{11}(n) \\ X_{11}(n) \end{bmatrix}, & \text{if } 0 \le n < N_1 \\ \begin{bmatrix} Y_{21}(n) \\ X_{21}(n) \end{bmatrix}, & \text{if } N_1 \le n < N_2 \\ \begin{bmatrix} Y_{31}(n) \\ X_{31}(n) \end{bmatrix}, & \text{if } N_2 \le n < N \end{cases} ; \text{where}$$

$X_{11}(n)$ indicates the start segment of the primary channel signal in the current frame, $Y_{11}(n)$ indicates the start segment of the secondary channel signal in the current frame, $X_{31}(n)$ indicates the end segment of the primary channel signal in the current frame, $Y_{31}(n)$ indicates the end segment of the secondary channel signal in the current frame, $X_{21}(n)$ indicates the middle segment of the primary channel signal in the current frame, and $Y_{21}(n)$ indicates the middle segment of the secondary channel signal in the current frame;

X(n) indicates the primary channel signal in the current frame; and

Y(n) indicates the secondary channel signal in the current frame.

For example, $$\begin{bmatrix} Y_{21}(n) \\ X_{21}(n) \end{bmatrix} = \begin{bmatrix} Y_{211}(n) \\ X_{211}(n) \end{bmatrix} * \text{fade\_out}(n) + \begin{bmatrix} Y_{212}(n) \\ X_{212}(n) \end{bmatrix} * \text{fade\_in}(n).$$

For example, fade_in(n) indicates the fade-in factor, and fade_out(n) indicates the fade-out factor. For example, a sum of fade_in(n) and fade_out(n) is 1.

In one embodiment, for example, $$\text{fade\_in}(n) = \frac{n - N_1}{N_2 - N_1}; \text{ and } \text{fade\_out}(n) = 1 - \frac{n - N_1}{N_2 - N_1}.$$

Certainly, fade_in(n) may alternatively be a fade-in factor of another function relationship based on n. Certainly, fade_out (n) may alternatively be a fade-out factor of another function relationship based on n.

Herein, n indicates a sampling point number, n=0, 1, . . . , N−1, and 0 $N_1<N_2<N-1$.

For example, $N_1$ is equal to 100, 107, 120, 150, or another value.

For example, $N_2$ is equal to 180, 187, 200, 203, or another value.

Herein, $X_{211}(n)$ indicates the first middle segment of the primary channel signal in the current frame, and $Y_{211}(n)$ indicates the first middle segment of the secondary channel signal in the current frame. $X_{212}(n)$ indicates the second middle segment of the primary channel signal in the current frame, and $Y_{212}(n)$ indicates the second middle segment of the secondary channel signal in the current frame.

In one embodiment, $$\begin{bmatrix} Y_{212}(n) \\ X_{212}(n) \end{bmatrix} = M_{22} * \begin{bmatrix} X_L(n) \\ X_R(n) \end{bmatrix}, \text{ if } N_1 \le n < N_2;$$

$$\begin{bmatrix} Y_{211}(n) \\ X_{211}(n) \end{bmatrix} = M_{11} * \begin{bmatrix} X_L(n) \\ X_R(n) \end{bmatrix}, \text{ if } N_1 \le n < N_2;$$

$$\begin{bmatrix} Y_{11}(n) \\ X_{11}(n) \end{bmatrix} = M_{11} * \begin{bmatrix} X_L(n) \\ X_R(n) \end{bmatrix}, \text{ if } 0 \le n < N_1; \text{ and}$$

$$\begin{bmatrix} Y_{31}(n) \\ X_{31}(n) \end{bmatrix} = M_{22} * \begin{bmatrix} X_L(n) \\ X_R(n) \end{bmatrix}, \text{ if } N_2 \le n < N.$$

$X_L(n)$ indicates the left channel signal in the current frame, and $X_R(n)$ indicates the right channel signal in the current frame.

$M_{11}$ indicates a downmix matrix corresponding to the correlated signal channel combination scheme for the previous frame, and $M_{11}$ is constructed based on the channel combination ratio factor corresponding to the correlated signal channel combination scheme for the previous frame. $M_{22}$ indicates a downmix matrix corresponding to the anticorrelated signal channel combination scheme for the current frame, and $M_{22}$ is constructed based on the channel combination ratio factor corresponding to the anticorrelated signal channel combination scheme for the current frame.

$M_{22}$ may have a plurality of possible forms, which are specifically, for example:

$$M_{22} = \begin{bmatrix} \alpha_1 & -\alpha_2 \\ -\alpha_2 & -\alpha_1 \end{bmatrix}, \text{ or } M_{22} = \begin{bmatrix} -\alpha_1 & \alpha_2 \\ \alpha_2 & \alpha_1 \end{bmatrix}, \text{ or}$$

$$M_{22} = \begin{bmatrix} 0.5 & -0.5 \\ -0.5 & -0.5 \end{bmatrix}, \text{ or } M_{22} = \begin{bmatrix} -0.5 & 0.5 \\ 0.5 & 0.5 \end{bmatrix}, \text{ or}$$

$$M_{22} = \begin{bmatrix} -0.5 & 0.5 \\ -0.5 & -0.5 \end{bmatrix}, \text{ or } M_{22} = \begin{bmatrix} 0.5 & -0.5 \\ 0.5 & 0.5 \end{bmatrix}.$$

Herein, $\alpha_1$=ratio_SM, $\alpha_2$=1−ratio_SM, and ratio_SM indicates the channel combination ratio factor corresponding to the anticorrelated signal channel combination scheme for the current frame.

$M_{11}$ may have a plurality of possible forms, which are specifically, for example:

$$M_{11} = \begin{bmatrix} 0.5 & 0.5 \\ 0.5 & -0.5 \end{bmatrix}, \text{ or}$$

$$M_{11} = \begin{bmatrix} \text{tdm\_last\_ratio} & 1 - \text{tdm\_last\_ratio} \\ 1 - \text{tdm\_last\_ratio} & -\text{tdm\_last\_ratio} \end{bmatrix},$$

where tdm_last_ratio indicates the channel combination ratio factor corresponding to the correlated signal channel combination scheme for the previous frame.

In one embodiment, for another example, when the channel combination scheme for the previous frame is the anticorrelated signal channel combination scheme, and the channel combination scheme for the current frame is a correlated signal channel combination scheme, the left and right channel signals in the current frame include start segments of the left and right channel signals, middle segments of the left and right channel signals, and end segments of the left and right channel signals; and the primary and secondary channel signals in the current frame include start segments of the primary and secondary channel signals, middle segments of the primary and secondary channel signals, and end segments of the primary and secondary channel signals. In this case, the performing segmented time-domain downmix processing on left and right channel signals in the current frame based on the channel combination scheme for the current frame and the channel combination scheme for the previous frame, to obtain a primary channel signal and a secondary channel signal in the current frame may include:

performing, by using a channel combination ratio factor corresponding to the anticorrelated signal channel combination scheme for the previous frame and a time-domain downmix processing manner corresponding to the anticorrelated signal channel combination scheme for the previous frame, time-domain downmix processing on the start segments of the left and right channel signals in the current frame, to obtain the start segments of the primary and secondary channel signals in the current frame;

performing, by using a channel combination ratio factor corresponding to the correlated signal channel combination scheme for the current frame and a time-domain downmix processing manner corresponding to the correlated signal channel combination scheme for the current frame, time-domain downmix processing on the end segments of the left and right channel signals in the current frame, to obtain the end segments of the primary and secondary channel signals in the current frame; and performing, by using the channel combination ratio factor corresponding to the anticorrelated signal channel combination scheme for the previous frame and the time-domain downmix processing manner corresponding to the anticorrelated signal channel combination scheme for the previous frame, time-domain downmix processing on the middle segments of the left and right channel signals in the current frame, to obtain third middle segments of the primary and secondary channel signals; performing, by using the channel combination ratio factor corresponding to the correlated signal channel combination scheme for the current frame and the time-domain downmix processing manner corresponding to the correlated signal channel combination scheme for the current frame, time-domain downmix processing on the middle segments of the left and right channel signals in the current frame, to obtain fourth middle segments of the primary and secondary channel signals; and performing weighted summation processing on the third middle segments of the primary and secondary channel signals and the fourth middle segments of the primary and secondary channel signals, to obtain the middle segments of the primary and secondary channel signals in the current frame.

When weighted summation processing is performed on the third middle segments of the primary and secondary channel signals and the fourth middle segments of the primary and secondary channel signals, a weighting coefficient corresponding to the third middle segments of the primary and secondary channel signals may be equal to or unequal to a weighting coefficient corresponding to the fourth middle segments of the primary and secondary channel signals.

For example, when weighted summation processing is performed on the third middle segments of the primary and secondary channel signals and the fourth middle segments of the primary and secondary channel signals, the weighting coefficient corresponding to the third middle segments of the primary and secondary channel signals is a fade-out factor, and the weighting coefficient corresponding to the fourth middle segments of the primary and secondary channel signals is a fade-in factor.

In one embodiment, $$\begin{bmatrix} Y(n) \\ X(n) \end{bmatrix} = \begin{cases} \begin{bmatrix} Y_{12}(n) \\ X_{12}(n) \end{bmatrix}, & \text{if } 0 \le n < N_3 \\ \begin{bmatrix} Y_{22}(n) \\ X_{22}(n) \end{bmatrix}, & \text{if } N_3 \le n < N_4 \\ \begin{bmatrix} Y_{32}(n) \\ X_{32}(n) \end{bmatrix}, & \text{if } N_4 \le n < N \end{cases};$$

where $X_{12}(n)$ indicates the start segment of the primary channel signal in the current frame, $Y_{12}(n)$ indicates the start segment of the secondary channel signal in the current frame, $X_{32}(n)$ indicates the end segment of the primary channel signal in the current frame, $Y_{32}(n)$ indicates the end segment of the secondary channel signal in the current frame, $X_{22}(n)$ indicates the middle segment of the primary channel signal in the current frame, and $Y_{22}(n)$ indicates the middle segment of the secondary channel signal in the current frame;

X(n) indicates the primary channel signal in the current frame; and

Y(n) indicates the secondary channel signal in the current frame.

For example, $$\begin{bmatrix} Y_{22}(n) \\ X_{22}(n) \end{bmatrix} = \begin{bmatrix} Y_{221}(n) \\ X_{221}(n) \end{bmatrix} * \text{fade\_out}(n) + \begin{bmatrix} Y_{222}(n) \\ X_{222}(n) \end{bmatrix} * \text{fade\_in}(n).$$

fade_in(n) indicates the fade-in factor, fade_out(n) indicates the fade-out factor, and a sum of fade_in(n) and fade_out(n) is 1.

In one embodiment, for example, $$\text{fade\_in}(n) = \frac{n - N_3}{N_4 - N_3}; \text{ and } \text{fade\_out}(n) = 1 - \frac{n - N_3}{N_4 - N_3}.$$

Certainly, fade_in (n) may alternatively be a fade-in factor of another function relationship based on n. Certainly, fade_out (n) may alternatively be a fade-out factor of another function relationship based on n.

Herein, n indicates a sampling point number. For example, n=0, 1, . . . , N−1.

Herein, $0<N_3<N_4<N-1$.

For example, $N_3$ is equal to 101, 107, 120, 150, or another value.

For example, $N_4$ is equal to 181, 187, 200, 205, or another value.

$X_{221}(n)$ indicates the third middle segment of the primary channel signal in the current frame, and $Y_{221}(n)$ indicates the third middle segment of the secondary channel signal in the current frame. $X_{222}(n)$ indicates the fourth middle segment of the primary channel signal in the current frame, and $Y_{222}(n)$ indicates the fourth middle segment of the secondary channel signal in the current frame.

In one embodiment, $$\begin{bmatrix} Y_{222}(n) \\ X_{222}(n) \end{bmatrix} = M_{21} * \begin{bmatrix} X_L(n) \\ X_R(n) \end{bmatrix}, \text{ if } N_3 \le n < N_4;$$

$$\begin{bmatrix} Y_{221}(n) \\ X_{221}(n) \end{bmatrix} = M_{12} * \begin{bmatrix} X_L(n) \\ X_R(n) \end{bmatrix}, \text{ if } N_3 \le n < N_4;$$

$$\begin{bmatrix} Y_{12}(n) \\ X_{12}(n) \end{bmatrix} = M_{12} * \begin{bmatrix} X_L(n) \\ X_R(n) \end{bmatrix}, \text{ if } 0 \le n < N_3; \text{ and}$$

$$\begin{bmatrix} Y_{32}(n) \\ X_{32}(n) \end{bmatrix} = M_{21} * \begin{bmatrix} X_L(n) \\ X_R(n) \end{bmatrix}, \text{ if } N_4 \le n < N.$$

$X_L(n)$ indicates the left channel signal in the current frame, and $X_R(n)$ indicates the right channel signal in the current frame.

$M_{12}$ indicates a downmix matrix corresponding to the anticorrelated signal channel combination scheme for the previous frame, and $M_{12}$ is constructed based on the channel combination ratio factor corresponding to the anticorrelated signal channel combination scheme for the previous frame. $M_{21}$ indicates a downmix matrix corresponding to the correlated signal channel combination scheme for the current frame, and $M_{21}$ is constructed based on the channel combination ratio factor corresponding to the correlated signal channel combination scheme for the current frame.

$M_{12}$ may have a plurality of possible forms, which are specifically, for example:

$$M_{12} = \begin{bmatrix} \alpha_{1\_pre} & -\alpha_{2\_pre} \\ -\alpha_{2\_pre} & -\alpha_{1\_pre} \end{bmatrix}, \text{ or}$$

-continued $$M_{12}=\begin{bmatrix}-\alpha_{1\_pre} & \alpha_{2\_pre}\\ \alpha_{2\_pre} & \alpha_{1\_pre}\end{bmatrix}, \text{ or}$$

$$M_{12}=\begin{bmatrix}0.5 & -0.5\\ -0.5 & -0.5\end{bmatrix}, \text{ or}$$

$$M_{12}=\begin{bmatrix}-0.5 & 0.5\\ 0.5 & 0.5\end{bmatrix}, \text{ or}$$

$$M_{12}=\begin{bmatrix}-0.5 & 0.5\\ -0.5 & -0.5\end{bmatrix}, \text{ or}$$

$$M_{12}=\begin{bmatrix}0.5 & -0.5\\ 0.5 & 0.5\end{bmatrix}.$$

Herein, $\alpha_{1\_pre}$=tdm_last_ratio_SM, and $\alpha_{2\_pre}$=1−tdm_last_ratio_SM.

Herein, tdm_last_ratio_SM indicates the channel combination ratio factor corresponding to the anticorrelated signal channel combination scheme for the previous frame.

$M_{21}$ may have a plurality of possible forms, which are specifically, for example:

$$M_{21}=\begin{bmatrix}\text{ratio} & 1-\text{ratio}\\ 1-\text{ratio} & -\text{ratio}\end{bmatrix}, \text{ or}$$

$$M_{21}=\begin{bmatrix}0.5 & 0.5\\ 0.5 & -0.5\end{bmatrix}.$$

Herein, ratio indicates the channel combination ratio factor corresponding to the correlated signal channel combination scheme for the current frame.

In one embodiment, the left and right channel signals in the current frame may be, for example, original left and right channel signals in the current frame, or may be left and right channel signals that have undergone time-domain pre-processing, or may be left and right channel signals that have undergone delay alignment processing.

Specifically, for example, $$\begin{bmatrix}X_L(n)\\ X_R(n)\end{bmatrix}=\begin{bmatrix}x_L(n)\\ x_R(n)\end{bmatrix}, \text{ or}$$

$$\begin{bmatrix}X_L(n)\\ X_R(n)\end{bmatrix}=\begin{bmatrix}x_{L\_HP}(n)\\ x_{R\_HP}(n)\end{bmatrix}, \text{ or}$$

$$\begin{bmatrix}X_L(n)\\ X_R(n)\end{bmatrix}=\begin{bmatrix}x'_L(n)\\ x'_R(n)\end{bmatrix}.$$

Herein, $x_L(n)$ indicates the original left channel signal in the current frame (the original left channel signal is a left channel signal that has not undergone time-domain pre-processing), and $x_R(n)$ indicates the original right channel signal in the current frame (the original right channel signal is a right channel signal that has not undergone time-domain pre-processing).

$x_{L\_HP}(n)$ indicates the left channel signal that has undergone time-domain pre-processing in the current frame, and $x_{R\_HP}(n)$ indicates the right channel signal that has undergone time-domain pre-processing in the current frame. $x_L'(n)$ indicates the left channel signal that has undergone delay alignment in the current frame, and $x_R'(n)$ indicates the right channel signal that has undergone delay alignment in the current frame.

According to a second aspect, the embodiments of this application further provide a time-domain stereo decoding method. The method may include: performing decoding based on a bitstream to obtain decoded primary and secondary channel signals in a current frame; determining a channel combination scheme for the current frame; and when the channel combination scheme for the current frame is different from a channel combination scheme for a previous frame, performing segmented time-domain upmix processing on the decoded primary and secondary channel signals in the current frame based on the channel combination scheme for the current frame and the channel combination scheme for the previous frame, to obtain reconstructed left and right channel signals in the current frame.

The channel combination scheme for the current frame is one of a plurality of channel combination schemes.

For example, the plurality of channel combination schemes include an anticorrelated signal channel combination scheme and a correlated signal channel combination scheme. The correlated signal channel combination scheme is a channel combination scheme corresponding to a near in phase signal. The anticorrelated signal channel combination scheme is a channel combination scheme corresponding to a near out of phase signal. It may be understood that, the channel combination scheme corresponding to a near in phase signal is applicable to a near in phase signal, and the channel combination scheme corresponding to a near out of phase signal is applicable to a near out of phase signal.

The segmented time-domain upmix processing may be understood as that the left and right channel signals in the current frame are divided into at least two segments, and a different time-domain upmix processing manner is used for each segment to perform time-domain upmix processing. It can be understood that compared with non-segmented time-domain upmix processing, the segmented time-domain upmix processing is more likely to obtain a smoother transition when a channel combination scheme for an adjacent frame changes.

It may be understood that, in the foregoing solution, the channel combination scheme for the current frame needs to be determined, and this indicates that there are a plurality of possibilities for the channel combination scheme for the current frame. Compared with a conventional solution in which there is only one channel combination scheme, this solution with a plurality of possible channel combination schemes can be better compatible with and match a plurality of possible scenarios. In addition, when the channel combination scheme for the current frame and the channel combination scheme for the previous frame are different, a mechanism of performing segmented time-domain upmix processing on the left and right channel signals in the current frame is introduced. The segmented time-domain upmix processing mechanism helps implement a smooth transition of the channel combination schemes, and further helps improve encoding quality.

In addition, because the channel combination scheme corresponding to the near out of phase signal is introduced, when a stereo signal in the current frame is a near out of phase signal, there are a more targeted channel combination scheme and coding mode, and this helps improve encoding quality.

For example, the channel combination scheme for the previous frame may be the correlated signal channel combination scheme or the anticorrelated signal channel combination scheme. The channel combination scheme for the current frame may be the correlated signal channel combination scheme or the anticorrelated signal channel combination scheme. Therefore, there are several possible cases in which the channel combination schemes for the current frame and the previous frame are different.

In one embodiment, for example, the channel combination scheme for the previous frame is the correlated signal channel combination scheme, and the channel combination scheme for the current frame is the anticorrelated signal channel combination scheme. The reconstructed left and right channel signals in the current frame include start segments of the reconstructed left and right channel signals, middle segments of the reconstructed left and right channel signals, and end segments of the reconstructed left and right channel signals. The decoded primary and secondary channel signals in the current frame include start segments of the decoded primary and secondary channel signals, middle segments of the decoded primary and secondary channel signals, and end segments of the decoded primary and secondary channel signals. In this case, the performing segmented time-domain upmix processing on the decoded primary and secondary channel signals in the current frame based on the channel combination scheme for the current frame and the channel combination scheme for the previous frame, to obtain reconstructed left and right channel signals in the current frame includes: performing, by using a channel combination ratio factor corresponding to the correlated signal channel combination scheme for the previous frame and a time-domain upmix processing manner corresponding to the correlated signal channel combination scheme for the previous frame, time-domain upmix processing on the start segments of the decoded primary and secondary channel signals in the current frame, to obtain the start segments of the reconstructed left and right channel signals in the current frame;

performing, by using a channel combination ratio factor corresponding to the anticorrelated signal channel combination scheme for the current frame and a time-domain upmix processing manner corresponding to the anticorrelated signal channel combination scheme for the current frame, time-domain upmix processing on the end segments of the decoded primary and secondary channel signals in the current frame, to obtain the end segments of the reconstructed left and right channel signals in the current frame; and performing, by using the channel combination ratio factor corresponding to the correlated signal channel combination scheme for the previous frame and the time-domain upmix processing manner corresponding to the correlated signal channel combination scheme for the previous frame, time-domain upmix processing on the middle segments of the decoded primary and secondary channel signals in the current frame, to obtain first middle segments of the reconstructed left and right channel signals; performing, by using the channel combination ratio factor corresponding to the anticorrelated signal channel combination scheme for the current frame and the time-domain upmix processing manner corresponding to the anticorrelated signal channel combination scheme for the current frame, time-domain upmix processing on the middle segments of the decoded primary and secondary channel signals in the current frame, to obtain second middle segments of the reconstructed left and right channel signals; and performing weighted summation processing on the first middle segments of the reconstructed left and right channel signals and the second middle segments of the reconstructed left and right channel signals, to obtain the middle segments of the reconstructed left and right channel signals in the current frame.

Lengths of the start segments of the reconstructed left and right channel signals, the middle segments of the reconstructed left and right channel signals, and the end segments of the reconstructed left and right channel signals in the current frame may be set based on a requirement. The lengths of the start segments of the reconstructed left and right channel signals, the middle segments of the reconstructed left and right channel signals, and the end segments of the reconstructed left and right channel signals in the current frame may be the same, or partially the same, or different from each other.

Lengths of the start segments of the decoded primary and secondary channel signals, the middle segments of the decoded primary and secondary channel signals, and the end segments of the decoded primary and secondary channel signals in the current frame may be set based on a requirement. The lengths of the start segments of the decoded primary and secondary channel signals, the middle segments of the decoded primary and secondary channel signals, and the end segments of the decoded primary and secondary channel signals in the current frame may be the same, or partially the same, or different from each other.

The reconstructed left and right channel signals may be decoded left and right channel signals, or delay adjustment processing and/or time-domain post-processing may be performed on the reconstructed left and right channel signals to obtain the decoded left and right channel signals.

When weighted summation processing is performed on the first middle segments of the reconstructed left and right channel signals and the second middle segments of the reconstructed left and right channel signals, a weighting coefficient corresponding to the first middle segments of the reconstructed left and right channel signals may be equal to or unequal to a weighting coefficient corresponding to the second middle segments of the reconstructed left and right channel signals.

For example, when weighted summation processing is performed on the first middle segments of the reconstructed left and right channel signals and the second middle segments of the reconstructed left and right channel signals, the weighting coefficient corresponding to the first middle segments of the reconstructed left and right channel signals is a fade-out factor, and the weighting coefficient corresponding to the second middle segments of the reconstructed left and right channel signals is a fade-in factor.

In one embodiment, $$\begin{bmatrix}\hat{x}'_L(n)\\ \hat{x}'_R(n)\end{bmatrix}=\begin{cases}\begin{bmatrix}\hat{x}'_{L-11}(n)\\ \hat{x}'_{R-11}(n)\end{bmatrix}, & \text{if } 0\le n<N_1\\ \begin{bmatrix}\hat{x}'_{L-21}(n)\\ \hat{x}'_{R-21}(n)\end{bmatrix}, & \text{if } N_1\le n<N_2\,;\\ \begin{bmatrix}\hat{x}'_{L-31}(n)\\ \hat{x}'_{R-31}(n)\end{bmatrix}, & \text{if } N_2\le n<N\end{cases}$$

where $\hat{x}_{L-11}'(n)$ indicates the start segment of the reconstructed left channel signal in the current frame, $\hat{x}_{R-11}'(n)$ indicates the start segment of the reconstructed right channel signal in the current frame, $\hat{x}_{L-31}'(n)$ indicates the end segment of the reconstructed left channel signal in the current frame, $\hat{x}_{R-31}'(n)$ indicates the end segment of the reconstructed right channel signal in the current frame, $\hat{x}_{L-21}'(n)$ indicates the middle segment of the reconstructed left channel signal in the current frame, and $\hat{x}_{R-21}'(n)$ indicates the middle segment of the reconstructed right channel signal in the current frame;

$\hat{x}_L'(n)$ indicates the reconstructed left channel signal in the current frame; and $\hat{x}_R'(n)$ indicates the reconstructed right channel signal in the current frame.

For example, $$\begin{bmatrix} \hat{x}'_{L-21}(n) \\ \hat{x}'_{R-21}(n) \end{bmatrix} = \begin{bmatrix} \hat{x}'_{L-211}(n) \\ \hat{x}'_{R-211}(n) \end{bmatrix} * \text{fade\_out}(n) + \begin{bmatrix} \hat{x}'_{L-212}(n) \\ \hat{x}'_{R-212}(n) \end{bmatrix} * \text{fade\_in}(n).$$

For example, fade_in (n) indicates the fade-in factor, and fade_out(n) indicates the fade-out factor. For example, a sum of fade_in(n) and fade_out(n) is 1.

Specifically, for example, $$\text{fade\_in}(n) = \frac{n - N_1}{N_2 - N_1}; \text{ and fade\_out}(n) = 1 - \frac{n - N_1}{N_2 - N_1}.$$

Certainly, fade_in (n) may alternatively be a fade-in factor of another function relationship based on n. Certainly, fade_out (n) may alternatively be a fade-out factor of another function relationship based on n.

Herein, n indicates a sampling point number, and n=0, 1, . . . , N−1. Herein, $0<N_1<N_2<N-1$.

$\hat{x}_{L-211}'(n)$ indicates the first middle segment of the reconstructed left channel signal in the current frame, and $\hat{x}_{R-211}'$ current frame, and $\hat{M}_{22}$ is constructed based on the channel combination ratio factor corresponding to the anticorrelated signal channel combination scheme for the current frame.

$\hat{M}_{11}$ may have a plurality of possible forms, which are specifically, for example:

$$\hat{M}_{22} = \frac{1}{\alpha_1^2 + \alpha_2^2} * \begin{bmatrix} \alpha_1 & -\alpha_2 \\ -\alpha_2 & -\alpha_1 \end{bmatrix}, \text{ or}$$

$$\hat{M}_{22} = \frac{1}{\alpha_1^2 + \alpha_2^2} * \begin{bmatrix} -\alpha_1 & \alpha_2 \\ \alpha_2 & \alpha_1 \end{bmatrix}, \text{ or}$$

$$\hat{M}_{22} = \begin{bmatrix} 1 & -1 \\ -1 & -1 \end{bmatrix}, \text{ or}$$

$$\hat{M}_{22} = \begin{bmatrix} -1 & 1 \\ 1 & 1 \end{bmatrix}, \text{ or}$$

$$\hat{M}_{22} = \begin{bmatrix} -1 & -1 \\ 1 & -1 \end{bmatrix}, \text{ or}$$

$$\hat{M}_{22} = \begin{bmatrix} 1 & 1 \\ -1 & 1 \end{bmatrix}.$$

$\alpha_1$=ratio_SM, $\alpha_2$=1−ratio_SM, and ratio_SM indicates the channel combination ratio factor corresponding to the anticorrelated signal channel combination scheme for the current frame.

$\hat{M}_{22}$ may have a plurality of possible forms, which are specifically, for example:

$$\hat{M}_{11} = \begin{bmatrix} 1 & 1 \\ 1 & -1 \end{bmatrix}, \text{ or}$$

$$\hat{M}_{11} = \frac{1}{\text{tdm\_last\_ratio}^2 + (1 - \text{tdm\_last\_ratio})^2} * \begin{bmatrix} \text{tdm\_last\_ratio} & 1 - \text{tdm\_last\_ratio} \\ 1 - \text{tdm\_last\_ratio} & -\text{tdm\_last\_ratio} \end{bmatrix}$$

(n) indicates the first middle segment of the reconstructed right channel signal in the current frame. $\hat{x}_{L-212}'(n)$ indicates the second middle segment of the reconstructed left channel signal in the current frame, and $\hat{x}_{R-212}'(n)$ indicates the second middle segment of the reconstructed right channel signal in the current frame.

In one embodiment, $$\begin{bmatrix} \hat{x}'_{L-212}(n) \\ \hat{x}'_{R-212}(n) \end{bmatrix} = \hat{M}_{22} * \begin{bmatrix} \hat{Y}(n) \\ \hat{X}(n) \end{bmatrix}, \text{ if } N_1 \le n < N_2;$$

$$\begin{bmatrix} \hat{x}'_{L-211}(n) \\ \hat{x}'_{R-211}(n) \end{bmatrix} = \hat{M}_{11} * \begin{bmatrix} \hat{Y}(n) \\ \hat{X}(n) \end{bmatrix}, \text{ if } N_1 \le n < N_2;$$

$$\begin{bmatrix} \hat{x}'_{L-11}(n) \\ \hat{x}'_{R-11}(n) \end{bmatrix} = \hat{M}_{11} * \begin{bmatrix} \hat{Y}(n) \\ \hat{X}(n) \end{bmatrix}, \text{ if } 0 \le n < N_1; \text{ and}$$

$$\begin{bmatrix} \hat{x}'_{L-31}(n) \\ \hat{x}'_{R-31}(n) \end{bmatrix} = \hat{M}_{22} * \begin{bmatrix} \hat{Y}(n) \\ \hat{X}(n) \end{bmatrix}, \text{ if } N_2 \le n < N.$$

Herein, $\hat{X}(n)$ indicates the decoded primary channel signal in the current frame, and $\hat{Y}(n)$ indicates the decoded secondary channel signal in the current frame.

$\hat{M}_{11}$ indicates an upmix matrix corresponding to the correlated signal channel combination scheme for the previous frame, and $\hat{M}_{11}$ is constructed based on the channel combination ratio factor corresponding to the correlated signal channel combination scheme for the previous frame; and $\hat{M}_{22}$ indicates a downmix matrix corresponding to the anticorrelated signal channel combination scheme for the Herein, tdm_last_ratio indicates the channel combination ratio factor corresponding to the correlated signal channel combination scheme for the previous frame.

Specifically, for another example, the channel combination scheme for the previous frame is the anticorrelated signal channel combination scheme, and the channel combination scheme for the current frame is the correlated signal channel combination scheme. The reconstructed left and right channel signals in the current frame include start segments of the reconstructed left and right channel signals, middle segments of the reconstructed left and right channel signals, and end segments of the reconstructed left and right channel signals. The decoded primary and secondary channel signals in the current frame include start segments of the decoded primary and secondary channel signals, middle segments of the decoded primary and secondary channel signals, and end segments of the decoded primary and secondary channel signals. In this case, the performing segmented time-domain upmix processing on the decoded primary and secondary channel signals in the current frame based on the channel combination scheme for the current frame and the channel combination scheme for the previous frame, to obtain reconstructed left and right channel signals in the current frame includes:

performing, by using a channel combination ratio factor corresponding to the anticorrelated signal channel combination scheme for the previous frame and a time-domain upmix processing manner corresponding to the anticorrelated signal channel combination scheme for the previous frame, time-domain upmix processing on the start segments of the decoded primary and secondary channel signals in the current frame, to obtain the start segments of the reconstructed left and right channel signals in the current frame;

performing, by using a channel combination ratio factor corresponding to the correlated signal channel combination scheme for the current frame and a time-domain upmix processing manner corresponding to the correlated signal channel combination scheme for the current frame, time-domain upmix processing on the end segments of the decoded primary and secondary channel signals in the current frame, to obtain the end segments of the reconstructed left and right channel signals in the current frame; and performing, by using the channel combination ratio factor corresponding to the anticorrelated signal channel combination scheme for the previous frame and the time-domain upmix processing manner corresponding to the anticorrelated signal channel combination scheme for the previous frame, time-domain upmix processing on the middle segments of the decoded primary and secondary channel signals in the current frame, to obtain third middle segments of the reconstructed left and right channel signals; performing, by using the channel combination ratio factor corresponding to the correlated signal channel combination scheme for the current frame and the time-domain upmix processing manner corresponding to the correlated signal channel combination scheme for the current frame, time-domain upmix processing on the middle segments of the decoded primary and secondary channel signals in the current frame, to obtain fourth middle segments of the reconstructed left and right channel signals; and performing weighted summation processing on the third middle segments of the reconstructed left and right channel signals and the fourth middle segments of the reconstructed left and right channel signals, to obtain the middle segments of the reconstructed left and right channel signals in the current frame.

When weighted summation processing is performed on the third middle segments of the reconstructed left and right channel signals and the fourth middle segments of the reconstructed left and right channel signals, a weighting coefficient corresponding to the third middle segments of the reconstructed left and right channel signals may be equal to or unequal to a weighting coefficient corresponding to the fourth middle segments of the reconstructed left and right channel signals.

For example, when weighted summation processing is performed on the third middle segments of the reconstructed left and right channel signals and the fourth middle segments of the reconstructed left and right channel signals, the weighting coefficient corresponding to the third middle segments of the reconstructed left and right channel signals is a fade-out factor, and the weighting coefficient corresponding to the fourth middle segments of the reconstructed left and right channel signals is a fade-in factor.

In one embodiment, $$\begin{bmatrix} \hat{x}'_L(n) \\ \hat{x}'_R(n) \end{bmatrix} = \begin{cases} \begin{bmatrix} \hat{x}'_{L-12}(n) \\ \hat{x}'_{R-12}(n) \end{bmatrix}, & \text{if } 0 \le n < N_3 \\ \begin{bmatrix} \hat{x}'_{L-22}(n) \\ \hat{x}'_{R-22}(n) \end{bmatrix}, & \text{if } N_3 \le n < N_4 \\ \begin{bmatrix} \hat{x}'_{L-32}(n) \\ \hat{x}'_{R-32}(n) \end{bmatrix}, & \text{if } N_4 \le n < N \end{cases}.$$

Herein, $\hat{x}_{L-12}'(n)$ indicates the start segment of the reconstructed left channel signal in the current frame, $\hat{x}_{R-12}'(n)$ indicates the start segment of the reconstructed right channel signal in the current frame, $\hat{x}_{L-32}'(n)$ indicates the end segment of the reconstructed left channel signal in the current frame, $\hat{x}_{R-32}'(n)$ indicates the end segment of the reconstructed right channel signal in the current frame, $\hat{x}_{L-22}'(n)$ indicates the middle segment of the reconstructed left channel signal in the current frame, and $\hat{x}_{R-22}'(n)$ indicates the middle segment of the reconstructed right channel signal in the current frame.

Herein, $\hat{x}_L'(n)$ indicates the reconstructed left channel signal in the current frame.

Herein, $\hat{x}_R'(n)$ indicates the reconstructed right channel signal in the current frame.

For example, $$\begin{bmatrix} \hat{x}'_{L\_22}(n) \\ \hat{x}'_{R\_22}(n) \end{bmatrix} = \begin{bmatrix} \hat{x}'_{L\_221}(n) \\ \hat{x}'_{R\_221}(n) \end{bmatrix} * \text{fade\_out}(n) + \begin{bmatrix} \hat{x}'_{L\_222}(n) \\ \hat{x}'_{R\_222}(n) \end{bmatrix} * \text{fade\_in}(n).$$

fade_in (n) indicates the fade-in factor, fade_out(n) indicates the fade-out factor, and a sum of fade_in (n) and fade_out(n) is 1.

In one embodiment, for example, $$\text{fade\_in}(n) = \frac{n - N_3}{N_4 - N_3};$$

$$\text{fade\_out}(n) = 1 - \frac{n - N_3}{N_4 - N_3}.$$

Certainly, fade_in (n) may alternatively be a fade-in factor of another function relationship based on n. Certainly, fade_out (n) may alternatively be a fade-out factor of another function relationship based on n.

Herein, n indicates a sampling point number. For example, n=0, 1, . . . , N−1.

Herein, $0<N_3<N_4<N-1$.

For example, $N_3$ is equal to 101, 107, 120, 150, or another value.

For example, $N_4$ is equal to 181, 187, 200, 205, or another value.

$\hat{x}_{L-221}'(n)$ indicates the third middle segment of the reconstructed left channel signal in the current frame, and $\hat{x}_{R-221}'(n)$ indicates the third middle segment of the reconstructed right channel signal in the current frame. $\hat{x}_{L-222}'(n)$ indicates the fourth middle segment of the reconstructed left channel signal in the current frame, and $\hat{x}_{R-222}'(n)$ indicates the fourth middle segment of the reconstructed right channel signal in the current frame.

In one embodiment, $$\begin{bmatrix} \hat{x}'_{L\_222}(n) \\ \hat{x}'_{R\_222}(n) \end{bmatrix} = \hat{M}_{21} * \begin{bmatrix} \hat{Y}(n) \\ \hat{X}(n) \end{bmatrix}, \text{ if } N_3 \le n < N_4;$$

$$\begin{bmatrix} \hat{x}'_{L\_221}(n) \\ \hat{x}'_{R\_221}(n) \end{bmatrix} = \hat{M}_{12} * \begin{bmatrix} \hat{Y}(n) \\ \hat{X}(n) \end{bmatrix}, \text{ if } N_3 \le n < N_4;$$

$$\begin{bmatrix} \hat{x}'_{L\_12}(n) \\ \hat{x}'_{R\_12}(n) \end{bmatrix} = \hat{M}_{12} * \begin{bmatrix} \hat{Y}(n) \\ \hat{X}(n) \end{bmatrix}, \text{ if } 0 \le n < N_3;$$

and $\begin{bmatrix} \hat{x}'_{L\_32}(n) \\ \hat{x}'_{R\_32}(n) \end{bmatrix} = \hat{M}_{21} * \begin{bmatrix} \hat{Y}(n) \\ \hat{X}(n) \end{bmatrix}$, if $N_4 \le n < N$.

Herein, $\hat{X}(n)$ indicates the decoded primary channel signal in the current frame, and $\hat{Y}(n)$ indicates the decoded secondary channel signal in the current frame.

$\hat{M}_{12}$ indicates an upmix matrix corresponding to the anticorrelated signal channel combination scheme for the previous frame, and $\hat{M}_{12}$ is constructed based on the channel combination ratio factor corresponding to the anticorrelated signal channel combination scheme for the previous frame. $\hat{M}_{21}$ indicates an upmix matrix corresponding to the correlated signal channel combination scheme for the current frame, and $\hat{M}_{21}$ is constructed based on the channel combination ratio factor corresponding to the correlated signal channel combination scheme for the current frame.

$\hat{M}_{12}$ may have a plurality of possible forms, which are specifically, for example:

$$\hat{M}_{12} = \frac{1}{\alpha_{1\_pre}^2 + \alpha_{2\_pre}^2} * \begin{bmatrix} \alpha_{1\_pre} & -\alpha_{2\_pre} \\ -\alpha_{2\_pre} & -\alpha_{1\_pre} \end{bmatrix},$$

$$\text{or } \hat{M}_{12} = \frac{1}{\alpha_{1\_pre}^2 + \alpha_{2\_pre}^2} * \begin{bmatrix} -\alpha_{1\_pre} & \alpha_{2\_pre} \\ \alpha_{2\_pre} & \alpha_{1\_pre} \end{bmatrix},$$

$$\text{or } \hat{M}_{12} = \begin{bmatrix} 1 & -1 \\ -1 & -1 \end{bmatrix},$$

$$\text{or } \hat{M}_{12} = \begin{bmatrix} -1 & 1 \\ 1 & 1 \end{bmatrix},$$

$$\text{or } \hat{M}_{12} = \begin{bmatrix} -1 & -1 \\ 1 & -1 \end{bmatrix},$$

$$\text{or } \hat{M}_{12} = \begin{bmatrix} 1 & 1 \\ -1 & 1 \end{bmatrix},$$

Herein, $\alpha_{1\_pre}$=tdm_last_ratio_SM, and $\alpha_{2\_pre}$=1−tdm_last_ratio_SM; and Herein, tdm_last_ratio_SM indicates the channel combination ratio factor corresponding to the anticorrelated signal channel combination scheme for the previous frame.

$\hat{M}_{21}$ may have a plurality of possible forms, which are specifically, for example:

$$\hat{M}_{21} = \begin{bmatrix} 1 & 1 \\ 1 & -1 \end{bmatrix},$$

$$\text{or } \hat{M}_{21} = \frac{1}{\text{ratio}^2 + (1-\text{ratio})^2} * \begin{bmatrix} \text{ratio} & 1-\text{ratio} \\ 1-\text{ratio} & -\text{ratio} \end{bmatrix}.$$

Herein, ratio indicates the channel combination ratio factor corresponding to the correlated signal channel combination scheme for the current frame.

According to a third aspect, the embodiments of this application further provide a time-domain stereo encoding apparatus, and the apparatus may include a processor and a memory that are coupled to each other. The processor may be configured to perform some or all operations of any stereo encoding method in the first aspect.

According to a fourth aspect, the embodiments of this application further provide a time-domain stereo decoding apparatus, and the apparatus may include a processor and a memory that are coupled to each other. The processor may be configured to perform some or all operations of any stereo decoding method in the second aspect.

According to a fifth aspect, the embodiments of this application provide a time-domain stereo decoding apparatus, including several functional units configured to implement any method in the first aspect.

According to a sixth aspect, the embodiments of this application provide a time-domain stereo encoding apparatus, including several functional units configured to implement any method in the second aspect.

According to a seventh aspect, the embodiments of this application provide a computer readable storage medium, and the computer readable storage medium stores program code, where the program code includes an instruction used to perform some or all operations of any method in the first aspect.

According to an eighth aspect, the embodiments of this application provide a computer readable storage medium, and the computer readable storage medium stores program code, where the program code includes an instruction used to perform some or all operations of any method in the second aspect.

According to a ninth aspect, the embodiments of this application provide a computer program product, and when the computer program product is run on a computer, the computer is enabled to perform some or all operations of any method in the first aspect.

According to a tenth aspect, the embodiments of this application provide a computer program product, and when the computer program product is run on a computer, the computer is enabled to perform some or all operations of any method in the second aspect.

BRIEF DESCRIPTION OF DRAWINGS

The following describes the accompanying drawings required for describing the embodiments or the background of this application.

FIG. 9-A is a schematic flowchart of another audio encoding method according to an embodiment of this application;

FIG. 9-B is a schematic flowchart of a method for calculating and encoding a channel combination ratio factor corresponding to an anticorrelated signal channel combination scheme for a current frame according to an embodiment of this application;

FIG. 9-C is a schematic flowchart of a method for calculating an amplitude correlation difference parameter between a left channel and a right channel in a current frame according to an embodiment of this application;

FIG. 9-D is a schematic flowchart of a method for converting an amplitude correlation difference parameter between a left channel and a right channel in a current frame into a channel combination ratio factor according to an embodiment of this application;

FIG. 10 is a schematic flowchart of another audio decoding method according to an embodiment of this application;

FIG. 11-A is a schematic diagram of an apparatus according to an embodiment of this application;

FIG. 11-B is a schematic diagram of another apparatus according to an embodiment of this application;

FIG. 11-C is a schematic diagram of another apparatus according to an embodiment of this application;

FIG. 12-A is a schematic diagram of another apparatus according to an embodiment of this application;

FIG. 12-B is a schematic diagram of another apparatus according to an embodiment of this application; and FIG. 12-C is a schematic diagram of another apparatus according to an embodiment of this application.

DESCRIPTION OF EMBODIMENTS

Figure 1:
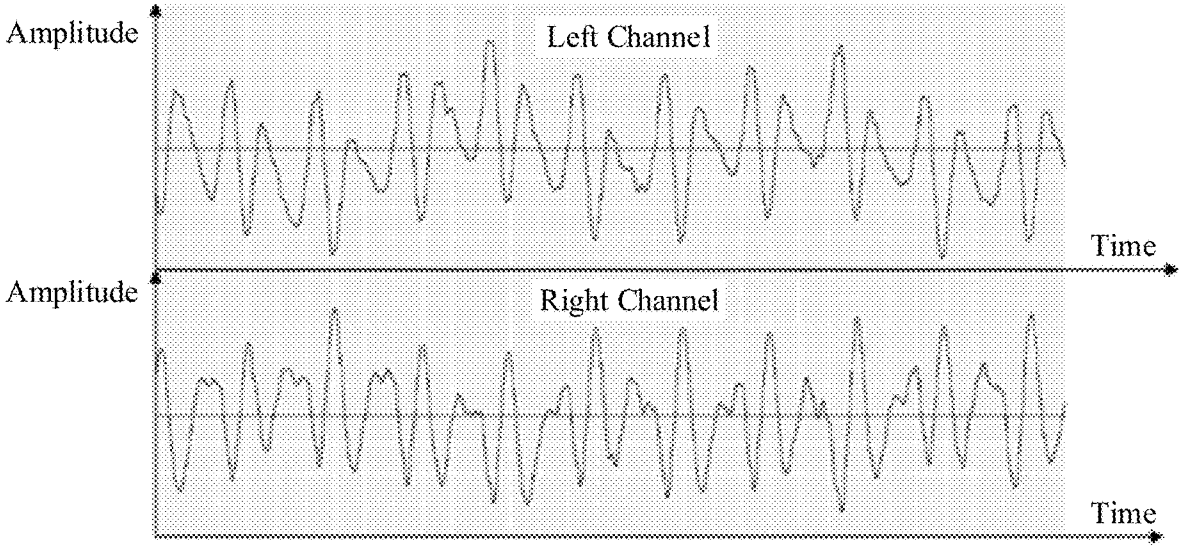
FIG. 1 is a schematic diagram of a near out of phase signal according to an embodiment of this application.

The following describes the embodiments of this application with reference to accompanying drawings in the embodiments of this application.

The terms "include", "have", and any other variant thereof mentioned in the specification, claims, and the accompanying drawings of this application are intended to cover a non-exclusive inclusion. For example, a process, a method, a system, a product, or a device that includes a series of operations or units is not limited to the listed operations or units, but optionally may further include an unlisted operation or unit, or optionally further includes another inherent operation or unit of the process, the method, the product, or the device. In addition, terms "first", "second", "third", "fourth", and the like are used to differentiate objects, instead of describing a specific sequence.

It should be noted that, because the solutions of the embodiments of this application are specific to a time-domain scenario, for brevity of description, a time-domain signal may be briefly referred to as a "signal". For example, a left channel time-domain signal may be briefly referred to as a "left channel signal". For another example, a right channel time-domain signal may be briefly referred to as a "right channel signal". For another example, a mono time-domain signal may be briefly referred to as a "mono signal". For another example, a reference channel time-domain signal may be briefly referred to as a "reference channel signal". For another example, a primary channel time-domain signal may be briefly referred to as a "primary channel signal". A secondary channel time-domain signal may be briefly referred to as a "secondary channel signal". For another example, a mid channel (Mid channel) time-domain signal may be briefly referred to as a "mid channel signal". For another example, a side channel (Side channel) time-domain signal may be briefly referred to as a "side channel signal". Other cases can be deduced by analogy.

It should be noted that, in the embodiments of this application, the left channel time-domain signal and the right channel time-domain signal may be collectively referred to as "left and right channel time-domain signals", or may be collectively referred to as "left and right channel signals". In other words, the left and right channel time-domain signals include the left channel time-domain signal and the right channel time-domain signal. For another example, left and right channel time-domain signals that have undergone delay alignment processing in a current frame include a left channel time-domain signal that has undergone delay alignment processing in the current frame and a right channel time-domain signal that has undergone delay alignment processing in the current frame. Similarly, the primary channel signal and the secondary channel signal may be collectively referred to as "primary and secondary channel signals". In other words, the primary and secondary channel signals include the primary channel signal and the secondary channel signal. For another example, decoded primary and secondary channel signals include a decoded primary channel signal and a decoded secondary channel signal. For another example, reconstructed left and right channel signals include a left channel reconstructed signal and a right channel reconstructed signal. The rest can be deduced by analogy.

For example, in a conventional MS encoding technology, left and right channel signals are first downmixed to obtain a mid channel signal and a side channel signal. For example, L indicates the left channel signal, and R indicates the right channel signal. In this case, the mid channel signal is $0.5\times(L+R)$, and the mid channel signal indicates information about a correlation between the left channel and the right channel; and the side channel signal is $0.5\times(L-R)$, and the side channel signal indicates information about a difference between the left channel and the right channel. Then, the mid channel signal and the side channel signal are separately encoded by using a mono encoding method. The mid channel signal is usually encoded by using a larger quantity of bits, and the side channel signal is usually encoded by using a smaller quantity of bits.

Further, in some solutions, to improve encoding quality, left and right channel time-domain signals are analyzed, to extract a time-domain stereo parameter used to indicate a proportion of the left channel to the right channel in time-domain downmix processing. An objective of the proposed method is: When an energy difference between stereo left and right channel signals is relatively large, in time-domain downmixed signals, energy of a primary channel can be increased, and energy of a secondary channel can be decreased. For example, L indicates the left channel signal, and R indicates the right channel signal. In this case, the primary channel (Primary channel) signal is denoted as Y, where $Y=alpha\times L+beta\times R$, and Y indicates information about a correlation between the two channels; and the secondary channel (Secondary channel) signal is denoted as X, where $X=alpha\times L-beta\times R$, and X represents information about a difference between the two channels. Herein, alpha and beta are real numbers from 0 to 1.

FIG. 1 shows amplitude variations of a left channel signal and a right channel signal. At a moment in time domain, an absolute value of an amplitude of a sampling point of the left channel signal in a specific position and an absolute value of an amplitude of a sampling point of the right channel signal in the corresponding position are basically the same, but the amplitudes have opposite signs. This is a typical near out of phase signal. FIG. 1 merely shows a typical example of a near out of phase signal. Actually, a near out of phase signal is a stereo signal whose phase difference between left and right channel signals is approximately 180 degrees. For example, a stereo signal whose phase difference between left and right channel signals falls within $[180-\theta,180+\theta]$ may be referred to as a near out of phase signal, where $\theta$ may be any angle between 0° and 90°. For example, $\theta$ may be equal to an angle of 0°, 5°, 15°, 17°, 20°, 30°, or 40°.

Similarly, a near in phase signal is a stereo signal whose phase difference between left and right channel signals is approximately 0 degrees. For example, a stereo signal whose phase difference between left and right channel signals falls within $[-\theta, \theta]$ may be referred to as a near in phase signal. $\theta$ may be any angle between 0° and 90°. For example, $\theta$ may be equal to an angle of 0°, 5°, 15°, 17°, 20°, 30°, or 40°.

When left and right channel signals are a near in phase signal, energy of a primary channel signal generated through time-domain downmix processing is usually significantly greater than energy of a secondary channel signal. If the primary channel signal is encoded by using a larger quantity of bits and the secondary channel signal is encoded by using a smaller quantity of bits, a better encoding effect can be obtained. However, when left and right channel signals are a near out of phase signal, if the same time-domain downmix processing method is used, energy of a generated primary channel signal may be very small or even lost, resulting in a decrease in final encoding quality.

The following continues to describe some technical solutions that can help improve stereo encoding and decoding quality.

The encoding apparatus and the decoding apparatus mentioned in the embodiments of this application may be apparatuses that have functions such as collection, storage, and transmission of a voice signal to the outside. Specifically, the encoding apparatus and the decoding apparatus may be, for example, mobile phones, servers, tablet computers, personal computers, or notebook computers.

It can be understood that, in the solutions of this application, the left and right channel signals are left and right channel signals of a stereo signal. The stereo signal may be an original stereo signal, or a stereo signal including two channels of signals in a multichannel signal, or a stereo signal including two channels of signals that are jointly generated by a plurality of channels of signals in a multichannel signal. A stereo encoding method may also be a stereo encoding method used in multichannel encoding. A stereo encoding apparatus may also be a stereo encoding apparatus used in a multichannel encoding apparatus. A stereo decoding method may also be a stereo decoding method used in multichannel decoding. A stereo decoding apparatus may also be a stereo decoding apparatus used in a multichannel decoding apparatus. The audio encoding method in the embodiments of this application is, for example, specific to a stereo encoding scenario, and the audio decoding method in the embodiments of this application is, for example, specific to a stereo decoding scenario.

The following first provides a method for determining an audio coding mode, and the method may include: determining a channel combination scheme for a current frame, and determining a coding mode of the current frame based on a channel combination scheme for a previous frame and the channel combination scheme for the current frame.

Figure 2:
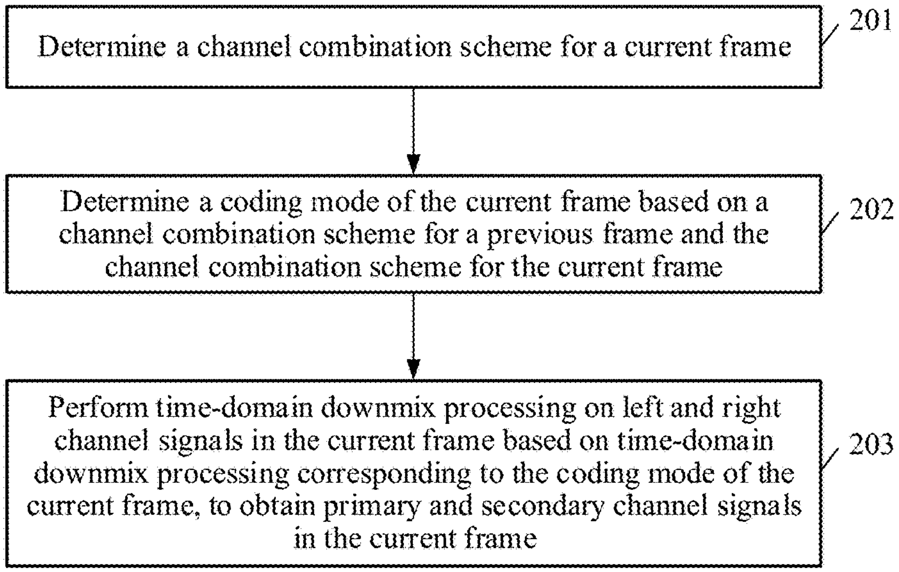
FIG. 2 is a schematic flowchart of an audio encoding method according to an embodiment of this application.

FIG. 2 is a schematic flowchart of an audio encoding method according to an embodiment of this application. Related operations of the audio encoding method may be implemented by an encoding apparatus, and may include, for example, the following operations.

201. Determine a channel combination scheme for a current frame.

The channel combination scheme for the current frame is one of a plurality of channel combination schemes. For example, the plurality of channel combination schemes include an anticorrelated signal channel combination scheme and a correlated signal channel combination scheme. The correlated signal channel combination scheme is a channel combination scheme corresponding to a near in phase signal. The anticorrelated signal channel combination scheme is a channel combination scheme corresponding to a near out of phase signal. It may be understood that, the channel combination scheme corresponding to a near in phase signal is applicable to a near in phase signal, and the channel combination scheme corresponding to a near out of phase signal is applicable to a near out of phase signal.

202. Determine a coding mode of the current frame based on a channel combination scheme for a previous frame and the channel combination scheme for the current frame.

In addition, if the current frame is the first frame (that is, the previous frame of the current frame does not exist), the coding mode of the current frame may be determined based on the channel combination scheme for the current frame. Alternatively, a default coding mode may be used as the coding mode of the current frame.

The coding mode of the current frame is one of a plurality of coding modes. For example, the plurality of coding modes may include a correlated-to-anticorrelated signal coding switching mode, an anticorrelated-to-correlated signal coding switching mode, a correlated signal coding mode, an anticorrelated signal coding mode, and the like.

A time-domain downmix mode corresponding to the correlated-to-anticorrelated signal coding switching mode may be referred to as, for example, a "correlated-to-anticorrelated signal downmix switching mode". A time-domain downmix mode corresponding to the anticorrelated-to-correlated signal coding switching mode may be referred to as, for example, an "anticorrelated-to-correlated signal downmix switching mode". A time-domain downmix mode corresponding to the correlated signal coding mode may be referred to as, for example, a "correlated signal downmix mode". A time-domain downmix mode corresponding to the anticorrelated signal coding mode may be referred to as, for example, an "anticorrelated signal downmix mode".

It may be understood that in this embodiment of this application, names of objects such as the coding modes, the decoding modes, and the channel combination schemes are all examples, and other names may also be used in actual application.

203. Perform time-domain downmix processing on left and right channel signals in the current frame based on time-domain downmix processing corresponding to the coding mode of the current frame, to obtain primary and secondary channel signals in the current frame.

Time-domain downmix processing may be performed on the left and right channel signals in the current frame to obtain the primary and secondary channel signals in the current frame, and the primary and secondary channel signals are further encoded to obtain a bitstream. Further, a channel combination scheme flag (the channel combination scheme flag of the current frame is used to indicate the channel combination scheme for the current frame) of the current frame may be written into the bitstream, so that a decoding apparatus determines the channel combination scheme for the current frame based on the channel combination scheme flag of the current frame that is included in the bitstream.

There may be various specific implementations of determining the coding mode of the current frame based on the channel combination scheme for the previous frame and the channel combination scheme for the current frame.

In one embodiment, the determining a coding mode of the current frame based on a channel combination scheme for a previous frame and the channel combination scheme for the current frame may include:

when the channel combination scheme for the previous frame is the correlated signal channel combination scheme, and the channel combination scheme for the current frame is the anticorrelated signal channel combination scheme, determining that the coding mode of the current frame is the correlated-to-anticorrelated signal coding switching mode, where in the correlated-to-anticorrelated signal coding switching mode, time-domain downmix processing is performed by using a downmix processing method corresponding to a transition from the correlated signal channel combination scheme to the anticorrelated signal channel combination scheme; or when the channel combination scheme for the previous frame is the anticorrelated signal channel combination scheme, and the channel combination scheme for the current frame is the anticorrelated signal channel combination scheme, determining that the coding mode of the current frame is the anticorrelated signal coding mode, where in the anticorrelated signal coding mode, time-domain downmix processing is performed by using a downmix processing method corresponding to the anticorrelated signal channel combination scheme; or when the channel combination scheme for the previous frame is the anticorrelated signal channel combination scheme, and the channel combination scheme for the current frame is the correlated signal channel combination scheme, determining that the coding mode of the current frame is the anticorrelated-to-correlated signal coding switching mode, where in the anticorrelated-to-correlated signal coding switching mode, time-domain downmix processing is performed by using a downmix processing method corresponding to a transition from the anticorrelated signal channel combination scheme to the correlated signal channel combination scheme, and the time-domain downmix processing manner corresponding to the anticorrelated-to-correlated signal coding switching mode may be specifically a segmented time-domain downmix manner, that is, performing segmented time-domain downmix processing on the left and right channel signals in the current frame based on the channel combination scheme for the current frame and the channel combination scheme for the previous frame; or when the channel combination scheme for the previous frame is the correlated signal channel combination scheme, and the channel combination scheme for the current frame is the correlated signal channel combination scheme, determining that the coding mode of the current frame is the correlated signal coding mode, where in the correlated signal coding mode, time-domain downmix processing is performed by using a downmix processing method corresponding to the correlated signal channel combination scheme.

It can be understood that time-domain downmix processing manners corresponding to different coding modes are usually different. In addition, each coding mode may correspond to one or more time-domain downmix processing manners.

In one embodiment, when it is determined that the coding mode of the current frame is the correlated signal coding mode, time-domain downmix processing is performed on the left and right channel signals in the current frame by using a time-domain downmix processing manner corresponding to the correlated signal coding mode, to obtain the primary and secondary channel signals in the current frame. The time-domain downmix processing manner corresponding to the correlated signal coding mode is the time-domain downmix processing manner corresponding to the correlated signal channel combination scheme.

For another embodiment, when it is determined that the coding mode of the current frame is the anticorrelated signal coding mode, time-domain downmix processing is performed on the left and right channel signals in the current frame by using a time-domain downmix processing manner corresponding to the anticorrelated signal coding mode, to obtain the primary and secondary channel signals in the current frame. The time-domain downmix processing manner corresponding to the anticorrelated signal coding mode is the time-domain downmix processing manner corresponding to the anticorrelated signal channel combination scheme.

For another embodiment, when it is determined that the coding mode of the current frame is the correlated-to-anticorrelated signal coding switching mode, time-domain downmix processing is performed on the left and right channel signals in the current frame by using a time-domain downmix processing manner corresponding to the correlated-to-anticorrelated signal coding switching mode, to obtain the primary and secondary channel signals in the current frame. The time-domain downmix processing manner corresponding to the correlated-to-anticorrelated signal coding switching mode is the time-domain downmix processing manner corresponding to the transition from the correlated signal channel combination scheme to the anticorrelated signal channel combination scheme. The time-domain downmix processing manner corresponding to the correlated-to-anticorrelated signal coding switching mode may be specifically a segmented time-domain downmix manner, that is, performing segmented time-domain downmix processing on the left and right channel signals in the current frame based on the channel combination scheme for the current frame and the channel combination scheme for the previous frame.

For another embodiment, when it is determined that the coding mode of the current frame is the anticorrelated-to-correlated signal coding switching mode, time-domain downmix processing is performed on the left and right channel signals in the current frame by using a time-domain downmix processing manner corresponding to the anticorrelated-to-correlated signal coding switching mode, to obtain the primary and secondary channel signals in the current frame. The time-domain downmix processing manner corresponding to the anticorrelated-to-correlated signal coding switching mode is the time-domain downmix processing manner corresponding to the transition from the anticorrelated signal channel combination scheme to the correlated signal channel combination scheme.

It can be understood that time-domain downmix processing manners corresponding to different coding modes are usually different. In addition, each coding mode may correspond to one or more time-domain downmix processing manners.

In one embodiment, the performing time-domain downmix processing on the left and right channel signals in the current frame by using the time-domain downmix processing manner corresponding to the anticorrelated signal coding mode, to obtain the primary and secondary channel signals in the current frame may include: performing time-domain downmix processing on the left and right channel signals in the current frame based on a channel combination ratio factor of the anticorrelated signal channel combination scheme for the current frame, to obtain the primary and secondary channel signals in the current frame; or performing time-domain downmix processing on the left and right channel signals in the current frame based on the channel combination ratio factor of the anticorrelated signal channel combination scheme for the current frame and a channel combination ratio factor of the anticorrelated signal channel combination scheme for the previous frame, to obtain the primary and secondary channel signals in the current frame.

It may be understood that, in the foregoing solution, the channel combination scheme for the current frame needs to be determined, and this indicates that there are a plurality of possibilities for the channel combination scheme for the current frame. Compared with a conventional solution in which there is only one channel combination scheme, this solution with a plurality of possible channel combination schemes can be better compatible with and match a plurality of possible scenarios. In the foregoing solution, the coding mode of the current frame needs to be determined based on the channel combination scheme for the previous frame and the channel combination scheme for the current frame, and there are a plurality of possibilities for the coding mode of the current frame. Compared with the conventional solution in which there is only one coding mode, this solution with a plurality of possible coding modes can be better compatible with and match a plurality of possible scenarios.

In one embodiment, for example, if the channel combination scheme for the current frame is different from the channel combination scheme for the previous frame, it may be determined that the coding mode of the current frame may be, for example, the correlated-to-anticorrelated signal coding switching mode or the anticorrelated-to-correlated signal coding switching mode. In this case, segmented time-domain downmix processing may be performed on the left and right channel signals in the current frame based on the channel combination scheme for the current frame and the channel combination scheme for the previous frame.

When the channel combination scheme for the current frame and the channel combination scheme for the previous frame are different, a mechanism of performing segmented time-domain downmix processing on the left and right channel signals in the current frame is introduced. The segmented time-domain downmix processing mechanism helps implement a smooth transition of the channel combination schemes, and further helps improve encoding quality.

Correspondingly, the following describes a time-domain stereo decoding scenario by using an example.

Figure 3:
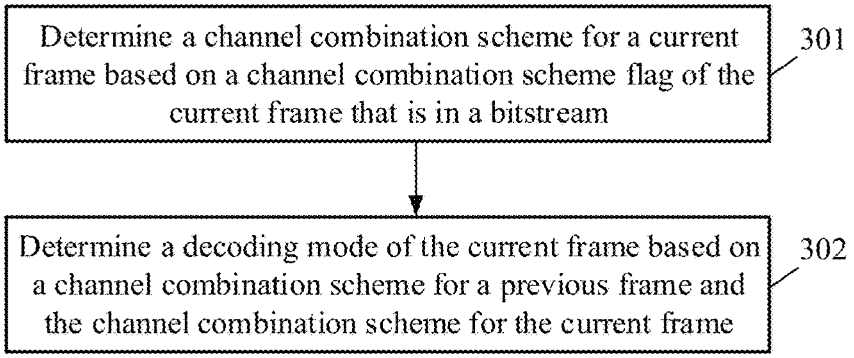
FIG. 3 is a schematic flowchart of a method for determining an audio decoding mode according to an embodiment of this application.

Referring to FIG. 3, the following provides a method for determining an audio decoding mode. Related operations of the method for determining an audio decoding mode may be implemented by a decoding apparatus, and the method may specifically include the following operations.

301. Determine a channel combination scheme for a current frame based on a channel combination scheme flag of the current frame that is in a bitstream.

302. Determine a decoding mode of the current frame based on a channel combination scheme for a previous frame and the channel combination scheme for the current frame.

The decoding mode of the current frame is one of a plurality of decoding modes. For example, the plurality of decoding modes may include a correlated-to-anticorrelated signal decoding switching mode, an anticorrelated-to-correlated signal decoding switching mode, a correlated signal decoding mode, an anticorrelated signal decoding mode, and the like.

A time-domain upmix mode corresponding to the correlated-to-anticorrelated signal decoding switching mode may be referred to as, for example, a "correlated-to-anticorrelated signal upmix switching mode". A time-domain upmix mode corresponding to the anticorrelated-to-correlated signal decoding switching mode may be referred to as, for example, an "anticorrelated-to-correlated signal upmix switching mode". A time-domain upmix mode corresponding to the correlated signal decoding mode may be referred to as, for example, a "correlated signal upmix mode". A time-domain upmix mode corresponding to the anticorrelated signal decoding mode may be referred to as, for example, an "anticorrelated signal upmix mode".

It may be understood that in this embodiment of this application, names of objects such as coding modes, the decoding modes, and the channel combination schemes are all examples, and other names may also be used in actual application.

In one embodiment, the determining a decoding mode of the current frame based on a channel combination scheme for a previous frame and the channel combination scheme for the current frame includes:

when the channel combination scheme for the previous frame is the correlated signal channel combination scheme, and the channel combination scheme for the current frame is the anticorrelated signal channel combination scheme, determining that the decoding mode of the current frame is the correlated-to-anticorrelated signal decoding switching mode, where in the correlated-to-anticorrelated signal decoding switching mode, time-domain upmix processing is performed by using an upmix processing method corresponding to a transition from the correlated signal channel combination scheme to the anticorrelated signal channel combination scheme; or when the channel combination scheme for the previous frame is the anticorrelated signal channel combination scheme, and the channel combination scheme for the current frame is the anticorrelated signal channel combination scheme, determining that the decoding mode of the current frame is the anticorrelated signal decoding mode, where in the anticorrelated signal decoding mode, time-domain upmix processing is performed by using an upmix processing method corresponding to the anticorrelated signal channel combination scheme; or when the channel combination scheme for the previous frame is the anticorrelated signal channel combination scheme, and the channel combination scheme for the current frame is the correlated signal channel combination scheme, determining that the decoding mode of the current frame is the anticorrelated-to-correlated signal decoding switching mode, where in the anticorrelated-to-correlated signal decoding switching mode, time-domain upmix processing is performed by using an upmix processing method corresponding to a transition from the anticorrelated signal channel combination scheme to the correlated signal channel combination scheme; or when the channel combination scheme for the previous frame is the correlated signal channel combination scheme, and the channel combination scheme for the current frame is the correlated signal channel combination scheme, determining that the decoding mode of the current frame is the correlated signal decoding mode, where in the correlated signal decoding mode, time-domain upmix processing is performed by using an upmix processing method corresponding to the correlated signal channel combination scheme.

For example, when determining that the decoding mode of the current frame is the anticorrelated signal decoding mode, the decoding apparatus performs time-domain upmix processing on decoded primary and secondary channel signals in the current frame by using a time-domain upmix processing manner corresponding to the anticorrelated signal decoding mode, to obtain reconstructed left and right channel signals in the current frame.

The reconstructed left and right channel signals may be decoded left and right channel signals, or delay adjustment processing and/or time-domain post-processing may be performed on the reconstructed left and right channel signals to obtain the decoded left and right channel signals.

The time-domain upmix processing manner corresponding to the anticorrelated signal decoding mode is the time-domain upmix processing manner corresponding to the anticorrelated signal channel combination scheme, and the anticorrelated signal channel combination scheme is a channel combination scheme corresponding to a near out of phase signal.

The decoding mode of the current frame may be one of a plurality of decoding modes. For example, the decoding mode of the current frame may be one of the following decoding modes: a correlated signal decoding mode, an anticorrelated signal decoding mode, a correlated-to-anticorrelated signal decoding switching mode, and an anticorrelated-to-correlated signal decoding switching mode.

It may be understood that, in the foregoing solution, the decoding mode of the current frame needs to be determined, and this indicates that there are a plurality of possibilities for the decoding mode of the current frame. Compared with a conventional solution in which there is only one decoding mode, this solution with a plurality of possible decoding modes can be better compatible with and match a plurality of possible scenarios. In addition, because the channel combination scheme corresponding to the near out of phase signal is introduced, when a stereo signal in the current frame is a near out of phase signal, there are a more targeted channel combination scheme and decoding mode, and this helps improve decoding quality.

For another embodiment, when determining that the decoding mode of the current frame is the correlated signal decoding mode, the decoding apparatus performs time-domain upmix processing on the decoded primary and secondary channel signals in the current frame by using a time-domain upmix processing manner corresponding to the correlated signal decoding mode, to obtain the reconstructed left and right channel signals in the current frame. The time-domain upmix processing manner corresponding to the correlated signal decoding mode is the time-domain upmix processing manner corresponding to the correlated signal channel combination scheme, and the correlated signal channel combination scheme is a channel combination scheme corresponding to a near in phase signal.

For another embodiment, when determining that the decoding mode of the current frame is the correlated-to-anticorrelated signal decoding switching mode, the decoding apparatus performs time-domain upmix processing on the decoded primary and secondary channel signals in the current frame by using a time-domain upmix processing manner corresponding to the correlated-to-anticorrelated signal decoding switching mode, to obtain the reconstructed left and right channel signals in the current frame. The time-domain upmix processing manner corresponding to the correlated-to-anticorrelated signal decoding switching mode is the time-domain upmix processing manner corresponding to the transition from the correlated signal channel combination scheme to the anticorrelated signal channel combination scheme.

For another embodiment, when determining that the decoding mode of the current frame is the anticorrelated-to-correlated signal decoding switching mode, the decoding apparatus performs time-domain upmix processing on the decoded primary and secondary channel signals in the current frame by using a time-domain upmix processing manner corresponding to the anticorrelated-to-correlated signal decoding switching mode, to obtain the reconstructed left and right channel signals in the current frame. The time-domain upmix processing manner corresponding to the anticorrelated-to-correlated signal decoding switching mode is the time-domain upmix processing manner corresponding to the transition from the anticorrelated signal channel combination scheme to the correlated signal channel combination scheme.

It can be understood that time-domain upmix processing manners corresponding to different decoding modes are usually different. In addition, each decoding mode may correspond to one or more time-domain upmix processing manners.

It may be understood that, in the foregoing solution, the channel combination scheme for the current frame needs to be determined, and this indicates that there are a plurality of possibilities for the channel combination scheme for the current frame. Compared with a conventional solution in which there is only one channel combination scheme, this solution with a plurality of possible channel combination schemes can be better compatible with and match a plurality of possible scenarios. In the foregoing solution, the decoding mode of the current frame needs to be determined based on the channel combination scheme for the previous frame and the channel combination scheme for the current frame, and there are a plurality of possibilities for the decoding mode of the current frame. Compared with the conventional solution in which there is only one decoding mode, this solution with a plurality of possible decoding modes can be better compatible with and match a plurality of possible scenarios.

Further, the decoding apparatus performs time-domain upmix processing on the decoded primary and secondary channel signals in the current frame based on time-domain upmix processing corresponding to the decoding mode of the current frame, to obtain the reconstructed left and right channel signals in the current frame.

The following uses examples to describe some specific implementations of determining the channel combination scheme for the current frame by the encoding apparatus. There are various specific implementations of determining the channel combination scheme for the current frame by the encoding apparatus.

For example, in some possible implementations, the determining the channel combination scheme for the current frame may include: performing channel combination scheme decision for the current frame for at least one time, to determine the channel combination scheme for the current frame.

In one embodiment, for example, the determining the channel combination scheme for the current frame includes: performing initial channel combination scheme decision for the current frame, to determine an initial channel combination scheme for the current frame; and performing channel combination scheme modification decision for the current frame based on the initial channel combination scheme for the current frame, to determine the channel combination scheme for the current frame. In addition, the initial channel combination scheme for the current frame may also be directly used as the channel combination scheme for the current frame. In other words, the channel combination scheme for the current frame may be the initial channel combination scheme for the current frame that is determined after the initial channel combination scheme decision is performed for the current frame.

For example, the performing initial channel combination scheme decision for the current frame may include: determining a signal type of in/out of phase of the stereo signal in the current frame by using the left and right channel signals in the current frame; and determining the initial channel combination scheme for the current frame based on the signal type of in/out of phase of the stereo signal in the current frame and the channel combination scheme for the previous frame. The signal type of in/out of phase of the stereo signal in the current frame may be a near in phase signal or a near out of phase signal. The signal type of in/out of phase of the stereo signal in the current frame may be indicated by a signal type of in/out of phase flag (for example, the signal type of in/out of phase flag is represented by tmp_SM_flag) of the current frame. Specifically, for example, when a value of the signal type of in/out of phase flag of the current frame is "1", it indicates that the signal type of in/out of phase of the stereo signal in the current frame is a near in phase signal; or when the value of the signal type of in/out of phase flag of the current frame is "0", it indicates that the signal type of in/out of phase of the stereo signal in the current frame is a near out of phase signal; or vice versa.

A channel combination scheme for an audio frame (for example, the previous frame or the current frame) may be indicated by a channel combination scheme flag of the audio frame. For example, when a value of the channel combination scheme flag of the audio frame is "0", it indicates that the channel combination scheme for the audio frame is a correlated signal channel combination scheme; or when the value of the channel combination scheme flag of the audio frame is "1", it indicates that the channel combination scheme for the audio frame is an anticorrelated signal channel combination scheme; or vice versa.

Similarly, an initial channel combination scheme for an audio frame (for example, the previous frame or the current frame) may be indicated by an initial channel combination scheme flag (for example, the initial channel combination scheme flag is represented by tdm_SM_flag_loc) of the audio frame. For example, when a value of the initial channel combination scheme flag of the audio frame is "0", it indicates that the initial channel combination scheme for the audio frame is a correlated signal channel combination scheme; or for another example, when the value of the initial channel combination scheme flag of the audio frame is "1", it indicates that the initial channel combination scheme for the audio frame is an anticorrelated signal channel combination scheme; or vice versa.

The determining a signal type of in/out of phase of the stereo signal in the current frame by using the left and right channel signals in the current frame may include: calculating a correlation value xorr between the left and right channel signals in the current frame; and when xorr is less than or equal to a first threshold, determining that the signal type of in/out of phase of the stereo signal in the current frame is the near in phase signal; or when xorr is greater than the first threshold, determining that the signal type of in/out of phase of the stereo signal in the current frame is the near out of phase signal. Further, if the signal type of in/out of phase flag of the current frame is used to indicate the signal type of in/out of phase of the stereo signal in the current frame, when it is determined that the signal type of in/out of phase of the stereo signal in the current frame is the near in phase signal, a value of the signal type of in/out of phase flag of the current frame may be set to indicate that the signal type of in/out of phase of the stereo signal in the current frame is the near in phase signal; or when it is determined that the signal type of in/out of phase of the current frame is the near out of phase signal, the value of the signal type of in/out of phase flag of the current frame may be set to indicate that the signal type of in/out of phase of the stereo signal in the current frame is the near out of phase signal.

A value range of the first threshold may be, for example, (0.5, 1.0), and the first threshold may be equal to, for example, 0.5, 0.85, 0.75, 0.65, or 0.81.

Specifically, for example, when a value of a signal type of in/out of phase flag of an audio frame (for example, the previous frame or the current frame) is "0", it indicates that a signal type of in/out of phase of a stereo signal of the audio frame is the near in phase signal; or when the value of the signal type of in/out of phase flag of the audio frame (for example, the previous frame or the current frame) is "1", it indicates that the signal type of in/out of phase of the stereo signal of the audio frame is the near out of phase signal; or vice versa.

For example, the determining the initial channel combination scheme for the current frame based on the signal type of in/out of phase of the stereo signal in the current frame and the channel combination scheme for the previous frame may include:

when the signal type of in/out of phase of the stereo signal in the current frame is the near in phase signal and the channel combination scheme for the previous frame is the correlated signal channel combination scheme, determining that the initial channel combination scheme for the current frame is the correlated signal channel combination scheme; or when the signal type of in/out of phase of the stereo signal in the current frame is the near out of phase signal and the channel combination scheme for the previous frame is the anticorrelated signal channel combination scheme, determining that the initial channel combination scheme for the current frame is the anticorrelated signal channel combination scheme; or when the signal type of in/out of phase of the stereo signal in the current frame is the near in phase signal and the channel combination scheme for the previous frame is the anticorrelated signal channel combination scheme, if signal-to-noise ratios of the left and right channel signals in the current frame are both less than a second threshold, determining that the initial channel combination scheme for the current frame is the correlated signal channel combination scheme; or if the signal-to-noise ratio of the left channel signal and/or the signal-to-noise ratio of the right channel signal in the current frame are/is greater than or equal to the second threshold, determining that the initial channel combination scheme for the current frame is the anticorrelated signal channel combination scheme; or when the signal type of in/out of phase of the stereo signal in the current frame is the near out of phase signal and the channel combination scheme for the previous frame is the correlated signal channel combination scheme, if the signal-to-noise ratios of the left and right channel signals in the current frame are both less than the second threshold, determining that the initial channel combination scheme for the current frame is the anticorrelated signal channel combination scheme; or if the signal-to-noise ratio of the left channel signal and/or the signal-to-noise ratio of the right channel signal in the current frame are/is greater than or equal to the second threshold, determining that the initial channel combination scheme for the current frame is the correlated signal channel combination scheme.

A value range of the second threshold may be, for example, [0.8, 1.2], and the second threshold may be equal to, for example, 0.8, 0.85, 0.9, 1, 1.1, or 1.18.

The performing channel combination scheme modification decision for the current frame based on the initial channel combination scheme for the current frame may include: determining the channel combination scheme for the current frame based on a channel combination ratio factor modification flag of the previous frame, the signal type of in/out of phase of the stereo signal in the current frame, and the initial channel combination scheme for the current frame.

The channel combination scheme flag of the current frame may be denoted as tdm_SM_flag, and a channel combination ratio factor modification flag of the current frame is denoted as tdm_SM_modi_flag. For example, when a value of the channel combination ratio factor modification flag is 0, it indicates that a channel combination ratio factor does not need to be modified; or when the value of the channel combination ratio factor modification flag is 1, it indicates that the channel combination ratio factor needs to be modified. Certainly, other different values may be used as the channel combination ratio factor modification flag to indicate whether the channel combination ratio factor needs to be modified.

In one embodiment, for example, performing channel combination scheme modification decision for the current frame based on a result of the initial channel combination scheme decision for the current frame may include:

if the channel combination ratio factor modification flag of the previous frame indicates that a channel combination ratio factor needs to be modified, using the anticorrelated signal channel combination scheme as the channel combination scheme for the current frame; or if the channel combination ratio factor modification flag of the previous frame indicates that the channel combination ratio factor does not need to be modified, determining whether the current frame meets a switching condition, and determining the channel combination scheme for the current frame based on a result of the determining whether the current frame meets the switching condition.

The determining the channel combination scheme for the current frame based on a result of the determining whether the current frame meets the switching condition may include:

when the channel combination scheme for the previous frame is different from the initial channel combination scheme for the current frame, the current frame meets the switching condition, the initial channel combination scheme for the current frame is the correlated signal channel combination scheme, and the channel combination scheme for the previous frame is the anticorrelated signal channel combination scheme, determining that the channel combination scheme for the current frame is the anticorrelated signal channel combination scheme; or when the channel combination scheme for the previous frame is different from the initial channel combination scheme for the current frame, the current frame meets the switching condition, the initial channel combination scheme for the current frame is the anticorrelated signal channel combination scheme, the channel combination scheme for the previous frame is the correlated signal channel combination scheme, and the channel combination ratio factor of the previous frame is less than a first ratio factor threshold, determining that the channel combination scheme for the current frame is the correlated signal channel combination scheme; or when the channel combination scheme for the previous frame is different from the initial channel combination scheme for the current frame, the current frame meets the switching condition, the initial channel combination scheme for the current frame is the anticorrelated signal channel combination scheme, the channel combination scheme for the previous frame is the correlated signal channel combination scheme, and the channel combination ratio factor of the previous frame is greater than or equal to the first ratio factor threshold, determining that the channel combination scheme for the current frame is the anticorrelated signal channel combination scheme; or when a channel combination scheme for the $(P-1)^{th}$-to-current frame is different from an initial channel combination scheme for the $P^{th}$-to-current frame, the $P^{th}$-to-current frame does not meet the switching condition, the current frame meets the switching condition, the signal type of in/out of phase of the stereo signal in the current frame is the near in phase signal, the initial channel combination scheme for the current frame is the correlated signal channel combination scheme, and the channel combination scheme for the previous frame is the anticorrelated signal channel combination scheme, determining that the channel combination scheme for the current frame is the correlated signal channel combination scheme; or when the channel combination scheme for the $(P-1)^{th}$-to-current frame is different from the initial channel combination scheme for the $P^{th}$-to-current frame, the $P^{th}$-to-current frame does not meet the switching condition, the current frame meets the switching condition, the signal type of in/out of phase of the stereo signal in the current frame is the near out of phase signal, the initial channel combination scheme for the current frame is the anticorrelated signal channel combination scheme, the channel combination scheme for the previous frame is the correlated signal channel combination scheme, and the channel combination ratio factor of the previous frame is less than a second ratio factor threshold, determining that the channel combination scheme for the current frame is the correlated signal channel combination scheme; or when the channel combination scheme for the $(P-1)^{th}$-to-current frame is different from the initial channel combination scheme for the $P^{th}$-to-current frame, the $P^{th}$-to-current frame does not meet the switching condition, the current frame meets the switching condition, the signal type of in/out of phase of the stereo signal in the current frame is the near out of phase signal, the initial channel combination scheme for the current frame is the anticorrelated signal channel combination scheme, the channel combination scheme for the previous frame is the correlated signal channel combination scheme, and the channel combination ratio factor of the previous frame is greater than or equal to the second ratio factor threshold, determining that the channel combination scheme for the current frame is the anticorrelated signal channel combination scheme.

Herein, P may be an integer greater than 1. For example, P may be equal to 2, 3, 4, 5, 6, or another value.

A value range of the first ratio factor threshold may be, for example, [0.4, 0.6], and the first ratio factor threshold may be equal to, for example, 0.4, 0.45, 0.5, 0.55, or 0.6.

A value range of the second ratio factor threshold may be, for example, [0.4, 0.6], and the second ratio factor threshold may be equal to, for example, 0.4, 0.46, 0.5, 0.56, or 0.6.

In one embodiment, the determining whether the current frame meets a switching condition may include: determining, based on a frame type of a primary channel signal in the previous frame and/or a frame type of a secondary channel signal in the previous frame, whether the current frame meets the switching condition.

In one embodiment, the determining whether the current frame meets a switching condition may include:

when a first condition, a second condition, and a third condition are all met, determining that the current frame meets the switching condition; or when the second condition, the third condition, a fourth condition, and a fifth condition are all met, determining that the current frame meets the switching condition; or when a sixth condition is met, determining that the current frame meets the switching condition.

The first condition is: A frame type of a primary channel signal in a previous frame of the previous frame is any one of the following: a VOICED_CLAS frame (a frame with a voiced characteristic that follows a voiced frame or a voiced onset frame), an ONSET frame (a voiced onset frame), a SIN_ONSET frame (an onset frame in which harmonic and noise are mixed), an INACTIVE_CLAS frame (a frame with an inactive characteristic), and AUDIO_CLAS (an audio frame), and the frame type of the primary channel signal in the previous frame is an UNVOICED_CLAS frame (a frame ended with one of the several characteristics: unvoiced, inactive, noise, or voiced) or a VOICED_TRANSITION frame (a frame with transition after a voiced sound, and the frame has a quite weak voiced characteristic); or a frame type of a secondary channel signal in the previous frame of the previous frame is any one of the following: a VOICED_CLAS frame, an ONSET frame, a SIN_ONSET frame, an INACTIVE_CLAS frame, and an AUDIO_CLAS frame, and the frame type of the secondary channel signal in the previous frame is an UNVOICED_CLAS frame or a VOICED_TRANSITION frame.

The second condition is: Neither of raw coding modes (raw coding modes) of the primary channel signal and the secondary channel signal in the previous frame is VOICED (a coding type corresponding to a voiced frame).

The third condition is: A quantity of consecutive frames before the previous frame that use the channel combination scheme used by the previous frame is greater than a preset frame quantity threshold. A value range of the frame quantity threshold may be, for example, [3, 10]. For example, the frame quantity threshold may be equal to 3, 4, 5, 6, 7, 8, 9, or another value.

The fourth condition is: The frame type of the primary channel signal in the previous frame is UNVOICED_CLAS, or the frame type of the secondary channel signal in the previous frame is UNVOICED_CLAS.

The fifth condition is: A long-term root mean square energy value of the left and right channel signals in the current frame is smaller than an energy threshold. A value range of the energy threshold may be, for example, [300, 500]. For example, the energy threshold may be equal to 300, 400, 410, 451, 482, 500, 415, or another value.

The sixth condition is: The frame type of the primary channel signal in the previous frame is a music signal, a ratio of energy of a lower frequency band to energy of a higher frequency band of the primary channel signal in the previous frame is greater than a first energy ratio threshold, and a ratio of energy of a lower frequency band to energy of a higher frequency band of the secondary channel signal in the previous frame is greater than a second energy ratio threshold.

A range of the first energy ratio threshold may be, for example, [4000, 6000]. For example, the first energy ratio threshold may be equal to 4000, 4500, 5000, 5105, 5200, 6000, 5800, or another value.

A range of the second energy ratio threshold may be, for example, [4000, 6000]. For example, the second energy ratio threshold may be equal to 4000, 4501, 5000, 5105, 5200, 6000, 5800, or another value.

It may be understood that, there may be various implementations of determining whether the current frame meets the switching condition, which are not limited to the manners given as examples above.

It may be understood that some implementations of determining the channel combination scheme for the current frame are provided in the foregoing example, but actual application may not be limited to the manners in the foregoing examples.

The following further uses examples to describe a scenario for the anticorrelated signal coding mode.

Figure 4:
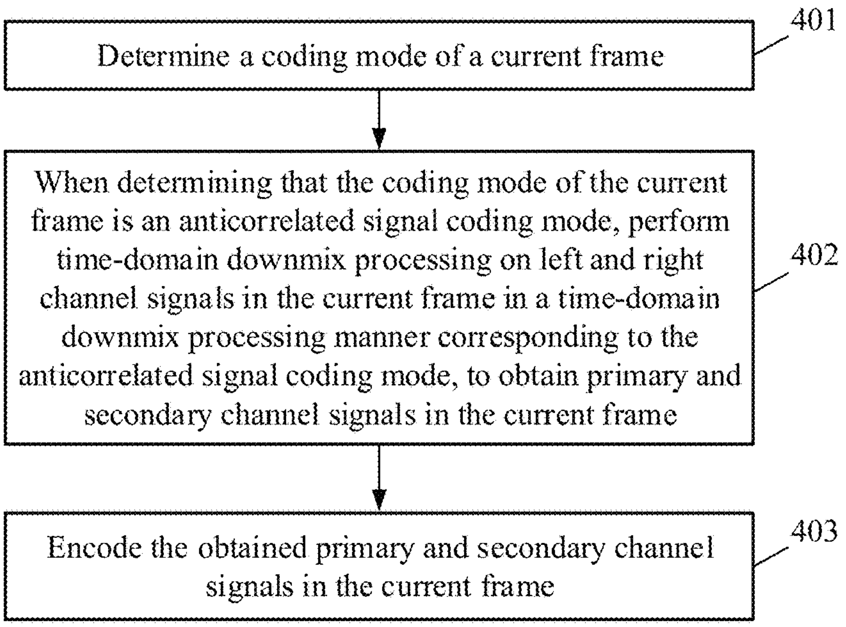
FIG. 4 is a schematic flowchart of another audio encoding method according to an embodiment of this application.

Referring to FIG. 4, an embodiment of this application provides an audio encoding method. Related operations of the audio encoding method may be implemented by an encoding apparatus, and the method may specifically include the following operations.

401. Determine a coding mode of a current frame.

402. When determining that the coding mode of the current frame is an anticorrelated signal coding mode, perform time-domain downmix processing on left and right channel signals in the current frame by using a time-domain downmix processing manner corresponding to the anticorrelated signal coding mode, to obtain primary and secondary channel signals in the current frame.

403. Encode the obtained primary and secondary channel signals in the current frame.

The time-domain downmix processing manner corresponding to the anticorrelated signal coding mode is a time-domain downmix processing manner corresponding to an anticorrelated signal channel combination scheme, and the anticorrelated signal channel combination scheme is a channel combination scheme corresponding to a near out of phase signal.

In one embodiment, the performing time-domain downmix processing on left and right channel signals in the current frame by using a time-domain downmix processing manner corresponding to the anticorrelated signal coding mode, to obtain primary and secondary channel signals in the current frame may include: performing time-domain downmix processing on the left and right channel signals in the current frame based on a channel combination ratio factor of the anticorrelated signal channel combination scheme for the current frame, to obtain the primary and secondary channel signals in the current frame; or performing time-domain downmix processing on the left and right channel signals in the current frame based on the channel combination ratio factor of the anticorrelated signal channel combination scheme for the current frame and a channel combination ratio factor of the anticorrelated signal channel combination scheme for a previous frame, to obtain the primary and secondary channel signals in the current frame.

It can be understood that a channel combination ratio factor of a channel combination scheme (for example, the anticorrelated signal channel combination scheme or a correlated signal channel combination scheme) for an audio frame (for example, the current frame or the previous frame)

may be a preset fixed value. Certainly, the channel combination ratio factor of the audio frame may also be determined based on the channel combination scheme for the audio frame.

In one embodiment, a corresponding downmix matrix may be constructed based on a channel combination ratio factor of an audio frame, and time-domain downmix processing is performed on the left and right channel signals in the current frame by using a downmix matrix corresponding to the channel combination scheme, to obtain the primary and secondary channel signals in the current frame.

For example, when time-domain downmix processing is performed on the left and right channel signals in the current frame based on the channel combination ratio factor of the anticorrelated signal channel combination scheme for the current frame, to obtain the primary and secondary channel signals in the current frame, $$\begin{bmatrix} Y(n) \\ X(n) \end{bmatrix} = M_{22} * \begin{bmatrix} X_L(n) \\ X_R(n) \end{bmatrix}$$

For another example, when time-domain downmix processing is performed on the left and right channel signals in the current frame based on the channel combination ratio factor of the anticorrelated signal channel combination scheme for the current frame and the channel combination ratio factor of the anticorrelated signal channel combination scheme for the previous frame, to obtain the primary and secondary channel signals in the current frame, $$\text{if } 0 \le n < N - \text{delay\_com}:$$

$$\begin{bmatrix} Y(n) \\ X(n) \end{bmatrix} = M_{12} * \begin{bmatrix} X_L(n) \\ X_R(n) \end{bmatrix};$$

$$\text{or if } N - \text{delay\_com} \le n < N:$$

$$\begin{bmatrix} Y(n) \\ X(n) \end{bmatrix} = M_{22} * \begin{bmatrix} X_L(n) \\ X_R(n) \end{bmatrix};$$

where delay_com indicates encoding delay compensation.

For another embodiment, when time-domain downmix processing is performed on the left and right channel signals in the current frame based on the channel combination ratio factor of the anticorrelated signal channel combination scheme for the current frame and the channel combination ratio factor of the anticorrelated signal channel combination scheme for the previous frame, to obtain the primary and secondary channel signals in the current frame, $$\text{if } 0 \le n < N - \text{delay\_com}:$$

$$\begin{bmatrix} Y(n) \\ X(n) \end{bmatrix} = M_{12} * \begin{bmatrix} X_L(n) \\ X_R(n) \end{bmatrix};$$

$$\text{if } N - \text{delay\_com} \le n < N - \text{delay\_com} + \text{NOVA\_1}:$$

$$\begin{bmatrix} Y(n) \\ X(n) \end{bmatrix} = \text{fade\_out}(n) * M_{12} * \begin{bmatrix} X_L(n) \\ X_R(n) \end{bmatrix} + \text{fade\_in}(n) * M_{22} * \begin{bmatrix} X_L(n) \\ X_R(n) \end{bmatrix};$$

$$\text{or if } N - \text{delay\_com} + \text{NOVA\_1} \le n < N:$$

$$\begin{bmatrix} Y(n) \\ X(n) \end{bmatrix} = M_{22} * \begin{bmatrix} X_L(n) \\ X_R(n) \end{bmatrix}$$

Herein, fade_in(n) indicates a fade-in factor. For example, $$\text{fade\_in}(n) = \frac{n - (N - \text{delay\_com})}{\text{NOVA\_1}}.$$

Certainly, fade_in (n) may alternatively be a fade-in factor of another function relationship based on n.

fade_out(n) indicates a fade-out factor. For example, $$\text{fade\_out}(n) = 1 - \frac{n - (N - \text{delay\_com})}{\text{NOVA\_1}}.$$

Certainly, fade_out(n) may alternatively be a fade-out factor of another function relationship based on n.

NOVA_1 indicates a transition processing length. A value of NOVA_1 may be set based on a specific scenario requirement. For example, NOVA_1 may be equal to 3/N or NOVA_1 may be another value less than N.

For another embodiment, when time-domain downmix processing is performed on the left and right channel signals in the current frame by using a time-domain downmix processing manner corresponding to the correlated signal coding mode, to obtain the primary and secondary channel signals in the current frame, $$\begin{bmatrix} Y(n) \\ X(n) \end{bmatrix} = M_{21} * \begin{bmatrix} X_L(n) \\ X_R(n) \end{bmatrix}$$

In the foregoing example, $X_L(n)$ indicates the left channel signal in the current frame. $X_R(n)$ indicates the right channel signal in the current frame. Y(n) indicates the primary channel signal that is in the current frame and that is obtained through the time-domain downmix processing; and X(n) indicates the secondary channel signal that is in the current frame and that is obtained through the time-domain downmix processing.

In the foregoing example, n indicates a sampling point number. For example, n=0, 1, . . . , N−1.

In the foregoing example, delay_com indicates encoding delay compensation.

$M_{11}$ indicates a downmix matrix corresponding to a correlated signal channel combination scheme for the previous frame, and $M_{11}$ is constructed based on a channel combination ratio factor corresponding to the correlated signal channel combination scheme for the previous frame.

$M_{12}$ indicates a downmix matrix corresponding to the anticorrelated signal channel combination scheme for the previous frame, and $M_{12}$ is constructed based on the channel combination ratio factor corresponding to the anticorrelated signal channel combination scheme for the previous frame.

$M_{22}$ indicates a downmix matrix corresponding to the anticorrelated signal channel combination scheme for the current frame, and $M_{22}$ is constructed based on the channel combination ratio factor corresponding to the anticorrelated signal channel combination scheme for the current frame.

$M_{21}$ indicates a downmix matrix corresponding to a correlated signal channel combination scheme for the current frame, and $M_{21}$ is constructed based on a channel combination ratio factor corresponding to the correlated signal channel combination scheme for the current frame.

$M_{21}$ may have a plurality of forms, for example:

$$M_{21} = \begin{bmatrix} \text{ratio} & 1 - \text{ratio} \\ 1 - \text{ratio} & -\text{ratio} \end{bmatrix},$$

-continued $$\text{or } M_{21} = \begin{bmatrix} 0.5 & 0.5 \\ 0.5 & -0.5 \end{bmatrix},$$

where ratio indicates the channel combination ratio factor corresponding to the correlated signal channel combination scheme for the current frame.

$M_{22}$ may have a plurality of forms, for example:

$$M_{22} = \begin{bmatrix} \alpha_1 & -\alpha_2 \\ -\alpha_2 & -\alpha_1 \end{bmatrix},$$
$$\text{or } M_{22} = \begin{bmatrix} -\alpha_1 & \alpha_2 \\ \alpha_2 & \alpha_1 \end{bmatrix},$$
$$\text{or } M_{22} = \begin{bmatrix} 0.5 & -0.5 \\ -0.5 & -0.5 \end{bmatrix},$$
$$\text{or } M_{22} = \begin{bmatrix} -0.5 & 0.5 \\ 0.5 & 0.5 \end{bmatrix},$$
$$\text{or } M_{22} = \begin{bmatrix} -0.5 & 0.5 \\ -0.5 & -0.5 \end{bmatrix},$$
$$\text{or } M_{22} = \begin{bmatrix} 0.5 & -0.5 \\ 0.5 & 0.5 \end{bmatrix},$$

where $\alpha_1$=ratio_SM, $\alpha_2$=1−ratio_SM, and ratio_SM indicates the channel combination ratio factor corresponding to the anticorrelated signal channel combination scheme for the current frame.

$M_{12}$ may have a plurality of forms, for example:

$$M_{12} = \begin{bmatrix} \alpha_{1\_pre} & -\alpha_{2\_pre} \\ -\alpha_{2\_pre} & -\alpha_{1\_pre} \end{bmatrix},$$
$$\text{or } M_{12} = \begin{bmatrix} -\alpha_{1\_pre} & \alpha_{2\_pre} \\ \alpha_{2\_pre} & \alpha_{1\_pre} \end{bmatrix},$$
$$\text{or } M_{12} = \begin{bmatrix} 0.5 & -0.5 \\ -0.5 & -0.5 \end{bmatrix},$$
$$\text{or } M_{12} = \begin{bmatrix} -0.5 & 05 \\ 0.5 & 05 \end{bmatrix},$$
$$\text{or } M_{12} = \begin{bmatrix} -0.5 & 0.5 \\ -0.5 & -0.5 \end{bmatrix},$$
$$\text{or } M_{12} = \begin{bmatrix} 0.5 & -05 \\ 0.5 & 0.5 \end{bmatrix},$$

where $\alpha_{1\_pre}$=tdm_last_ratio_SM, $\alpha_{2\_pre}$=1−tdm_last_ratio_SM, and tdm_last_ratio_SM indicates the channel combination ratio factor corresponding to the anticorrelated signal channel combination scheme for the previous frame.

The left and right channel signals in the current frame may be specifically original left and right channel signals in the current frame (the original left and right channel signals are left and right channel signals that have not undergone time-domain pre-processing, and may be, for example, left and right channel signals obtained through sampling), or may be left and right channel signals that have undergone time-domain pre-processing in the current frame, or may be left and right channel signals that have undergone delay alignment processing in the current frame.

In one embodiment, for example, $$\begin{bmatrix} X_L(n) \\ X_R(n) \end{bmatrix} = \begin{bmatrix} x_L(n) \\ x_R(n) \end{bmatrix},$$
$$\text{or } \begin{bmatrix} X_L(n) \\ X_R(n) \end{bmatrix} = \begin{bmatrix} x_{L\_HP}(n) \\ x_{R\_HP}(n) \end{bmatrix},$$
$$\text{or } \begin{bmatrix} X_L(n) \\ X_R(n) \end{bmatrix} = \begin{bmatrix} x'_L(n) \\ x'_R(n) \end{bmatrix},$$

where $$\begin{bmatrix} x_L(n) \\ x_R(n) \end{bmatrix}$$

indicates the original left and right channel signals in the current frame, $$\begin{bmatrix} x_{L\_HP}(n) \\ x_{R\_HP}(n) \end{bmatrix}$$

indicates the left and right channel signals that have undergone time-domain pre-processing in the current frame, and $$\begin{bmatrix} x'_L(n) \\ x'_R(n) \end{bmatrix}$$

indicates the left and right channel signals that have undergone delay alignment processing in the current frame.

Correspondingly, the following uses examples to describe a scenario for the anticorrelated signal decoding mode.

Figure 5:
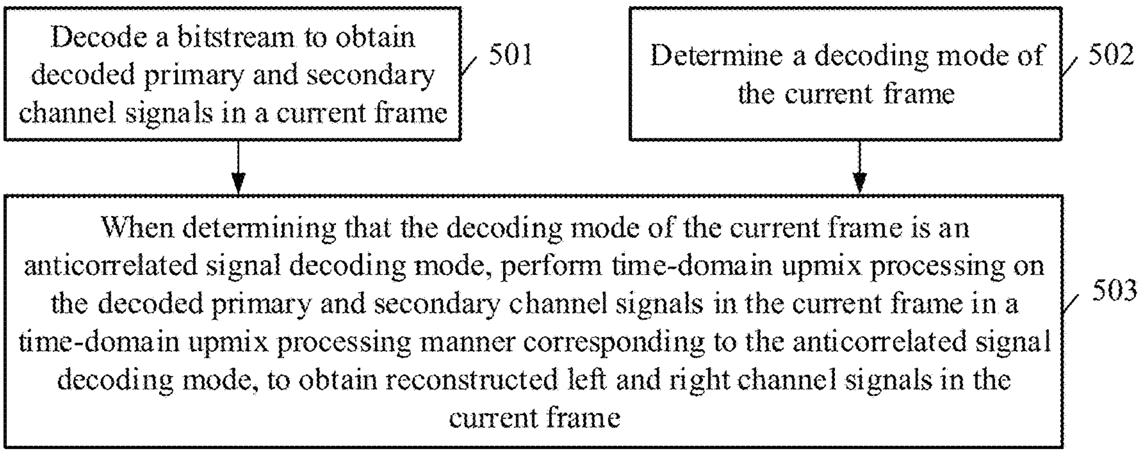
FIG. 5 is a schematic flowchart of an audio decoding method according to an embodiment of this application.

Referring to FIG. 5, an embodiment of this application further provides an audio decoding method. Related operations of the audio decoding method may be implemented by a decoding apparatus, and the method may specifically include the following operations.

501. Perform decoding based on a bitstream to obtain decoded primary and secondary channel signals in a current frame.

502. Determine a decoding mode of the current frame.

It may be understood that there is no necessary sequence for performing operation 501 and operation 502.

503. When determining that the decoding mode of the current frame is an anticorrelated signal decoding mode, perform time-domain upmix processing on the decoded primary and secondary channel signals in the current frame by using a time-domain upmix processing manner corresponding to the anticorrelated signal decoding mode, to obtain reconstructed left and right channel signals in the current frame.

The reconstructed left and right channel signals may be decoded left and right channel signals, or delay adjustment processing and/or time-domain post-processing may be performed on the reconstructed left and right channel signals to obtain the decoded left and right channel signals.

The time-domain upmix processing manner corresponding to the anticorrelated signal decoding mode is a time-domain upmix processing manner corresponding to an anticorrelated signal channel combination scheme, and the anticorrelated signal channel combination scheme is a channel combination scheme corresponding to a near out of phase signal.

The decoding mode of the current frame may be one of a plurality of decoding modes. For example, the decoding mode of the current frame may be one of the following decoding modes: a correlated signal decoding mode, an anticorrelated signal decoding mode, a correlated-to-anticorrelated signal decoding switching mode, and an anticorrelated-to-correlated signal decoding switching mode.

It may be understood that, in the foregoing solution, the decoding mode of the current frame needs to be determined, and this indicates that there are a plurality of possibilities for the decoding mode of the current frame. Compared with a conventional solution in which there is only one decoding mode, this solution with a plurality of possible decoding modes can be better compatible with and match a plurality of possible scenarios. In addition, because the channel combination scheme corresponding to the near out of phase signal is introduced, when a stereo signal in the current frame is a near out of phase signal, there are a more targeted channel combination scheme and decoding mode, and this helps improve decoding quality.

In one embodiment, the method may further include:

when determining that the decoding mode of the current frame is the correlated signal decoding mode, performing time-domain upmix processing on the decoded primary and secondary channel signals in the current frame by using a time-domain upmix processing manner corresponding to the correlated signal decoding mode, to obtain the reconstructed left and right channel signals in the current frame, where the time-domain upmix processing manner corresponding to the correlated signal decoding mode is a time-domain upmix processing manner corresponding to a correlated signal channel combination scheme, and the correlated signal channel combination scheme is a channel combination scheme corresponding to a near in phase signal.

In one embodiment, the method may further include: when determining that the decoding mode of the current frame is the correlated-to-anticorrelated signal decoding switching mode, performing time-domain upmix processing on the decoded primary and secondary channel signals in the current frame by using a time-domain upmix processing manner corresponding to the correlated-to-anticorrelated signal decoding switching mode, to obtain the reconstructed left and right channel signals in the current frame, where the time-domain upmix processing manner corresponding to the correlated-to-anticorrelated signal decoding switching mode is a time-domain upmix processing manner corresponding to a transition from the correlated signal channel combination scheme to the anticorrelated signal channel combination scheme.

In one embodiment, the method may further include: when determining that the decoding mode of the current frame is the anticorrelated-to-correlated signal decoding switching mode, performing time-domain upmix processing on the decoded primary and secondary channel signals in the current frame by using a time-domain upmix processing manner corresponding to the anticorrelated-to-correlated signal decoding switching mode, to obtain the reconstructed left and right channel signals in the current frame, where the time-domain upmix processing manner corresponding to the anticorrelated-to-correlated signal decoding switching mode is a time-domain upmix processing manner corresponding to a transition from the anticorrelated signal channel combination scheme to the correlated signal channel combination scheme.

It can be understood that time-domain upmix processing manners corresponding to different decoding modes are usually different. In addition, each decoding mode may correspond to one or more time-domain upmix processing manners.

In one embodiment, the performing time-domain upmix processing on the decoded primary and secondary channel signals in the current frame by using a time-domain upmix processing manner corresponding to the anticorrelated signal decoding mode, to obtain reconstructed left and right channel signals in the current frame includes:

performing time-domain upmix processing on the decoded primary and secondary channel signals in the current frame based on a channel combination ratio factor of the anticorrelated signal channel combination scheme for the current frame, to obtain the reconstructed left and right channel signals in the current frame; or performing time-domain upmix processing on the decoded primary and secondary channel signals in the current frame based on the channel combination ratio factor of the anticorrelated signal channel combination scheme for the current frame and a channel combination ratio factor of the anticorrelated signal channel combination scheme for a previous frame, to obtain the reconstructed left and right channel signals in the current frame.

In one embodiment, a corresponding upmix matrix may be constructed based on a channel combination ratio factor of an audio frame, and time-domain upmix processing is performed on the decoded primary and secondary channel signals in the current frame by using an upmix matrix corresponding to the channel combination scheme, to obtain the reconstructed left and right channel signals in the current frame.

For example, when time-domain upmix processing is performed on the decoded primary and secondary channel signals in the current frame based on the channel combination ratio factor of the anticorrelated signal channel combination scheme for the current frame, to obtain the reconstructed left and right channel signals in the current frame, $$\begin{bmatrix} \hat{x}'_L(n) \\ \hat{x}'_R(n) \end{bmatrix} = \hat{M}_{22} * \begin{bmatrix} \hat{Y}(n) \\ \hat{X}(n) \end{bmatrix}$$

In one embodiment, when time-domain upmix processing is performed on the decoded primary and secondary channel signals in the current frame based on the channel combination ratio factor of the anticorrelated signal channel combination scheme for the current frame and the channel combination ratio factor of the anticorrelated signal channel combination scheme for the previous frame, to obtain the reconstructed left and right channel signals in the current frame, $$\text{if } 0 \le n < N - \text{upmixing\_delay}:$$

$$\begin{bmatrix} \hat{x}'_L(n) \\ \hat{x}'_R(n) \end{bmatrix} = \hat{M}_{12} * \begin{bmatrix} \hat{Y}(n) \\ \hat{X}(n) \end{bmatrix}; \text{ or}$$

$$\text{if } N - \text{upmixing\_delay} \le n < N:$$

$$\begin{bmatrix} \hat{x}'_L(n) \\ \hat{x}'_R(n) \end{bmatrix} = \hat{M}_{22} * \begin{bmatrix} \hat{Y}(n) \\ \hat{X}(n) \end{bmatrix};$$

where delay_com indicates encoding delay compensation.

In one embodiment, when time-domain upmix processing is performed on the decoded primary and secondary channel signals in the current frame based on the channel combination ratio factor of the anticorrelated signal channel combination scheme for the current frame and the channel combination ratio factor of the anticorrelated signal channel combination scheme for the previous frame, to obtain the reconstructed left and right channel signals in the current frame, $$\text{if } 0 \le n < N - \text{upmixing\_delay}:$$

$$\begin{bmatrix} \hat{x}'_L(n) \\ \hat{x}'_R(n) \end{bmatrix} = \hat{M}_{12} * \begin{bmatrix} \hat{Y}(n) \\ \hat{X}(n) \end{bmatrix};$$

$$N - \text{upmixing\_delay} \le n < N - \text{upmixing\_delay} + \text{NOVA\_1}:$$

$$\begin{bmatrix} \hat{x}'_L(n) \\ \hat{x}'_R(n) \end{bmatrix} = \text{fade\_out}(n) * \hat{M}_{12} * \begin{bmatrix} \hat{Y}(n) \\ \hat{X}(n) \end{bmatrix} + \text{fade\_in}(n) * \hat{M}_{22} * \begin{bmatrix} \hat{Y}(n) \\ \hat{X}(n) \end{bmatrix}; \text{ or}$$

$$N - \text{upmixing\_delay} + NOVA\_1 \le n < N$$

$$\begin{bmatrix} \hat{x}'_L(n) \\ \hat{x}'_R(n) \end{bmatrix} = \hat{M}^*_{22} \begin{bmatrix} \hat{Y}(n) \\ \hat{X}(n) \end{bmatrix}$$

Herein, $\hat{x}_L'(n)$ indicates the decoded left channel signal in the current frame, $\hat{x}_R'(n)$ indicates the reconstructed right channel signal in the current frame, $\hat{Y}(n)$ indicates the decoded primary channel signal in the current frame, and $\hat{X}(n)$ indicates the decoded secondary channel signal in the current frame.

NOVA_1 indicates a transition processing length.

fade_in (n) indicates a fade-in factor. For example, $$\text{fade\_in}(n) = \frac{n - (N - \text{upmixing\_delay})}{\text{NOVA\_1}}$$

Certainly, fade_in(n) may alternatively be a fade-in factor of another function relationship based on n.

fade_out(n) indicates a fade-out factor. For example, $$\text{fade\_out}(n) = 1 - \frac{n - (N - \text{upmixing\_delay})}{\text{NOVA\_1}}$$

Certainly, fade_out(n) may alternatively be a fade-out factor of another function relationship based on n.

NOVA_1 indicates a transition processing length. A value of NOVA_1 may be set based on a specific scenario requirement. For example, NOVA_1 may be equal to 3/N or NOVA_1 may be another value less than N.

In one embodiment, when time-domain upmix processing is performed on the decoded primary and secondary channel signals in the current frame based on a channel combination ratio factor of the correlated signal channel combination scheme for the current frame, to obtain the reconstructed left and right channel signals in the current frame, $$\begin{bmatrix} \hat{x}'_L(n) \\ \hat{x}'_R(n) \end{bmatrix} = \hat{M}_{21} * \begin{bmatrix} \hat{Y}(n) \\ \hat{X}(n) \end{bmatrix}$$

In the foregoing example, $\hat{x}_L'(n)$ indicates the decoded left channel signal in the current frame. $\hat{x}_R'(n)$ indicates the reconstructed right channel signal in the current frame. $\hat{Y}(n)$ indicates the decoded primary channel signal in the current frame. $\hat{X}(n)$ indicates the decoded secondary channel signal in the current frame.

In the foregoing example, n indicates a sampling point number. For example, n=0, 1, . . . , N−1.

In the foregoing example, upmixing delay indicates decoding delay compensation.

$\hat{M}_{11}$ indicates an upmix matrix corresponding to a correlated signal channel combination scheme for the previous frame, and $\hat{M}_{11}$ is constructed based on a channel combination ratio factor corresponding to the correlated signal channel combination scheme for the previous frame.

$\hat{M}_{22}$ indicates an upmix matrix corresponding to the anticorrelated signal channel combination scheme for the current frame, and $\hat{M}_{22}$ is constructed based on the channel combination ratio factor corresponding to the anticorrelated signal channel combination scheme for the current frame.

$\hat{M}_{12}$ indicates an upmix matrix corresponding to the anticorrelated signal channel combination scheme for the previous frame, and $\hat{M}_{12}$ is constructed based on the channel combination ratio factor corresponding to the anticorrelated signal channel combination scheme for the previous frame.

$\hat{M}_{21}$ indicates an upmix matrix corresponding to the correlated signal channel combination scheme for the current frame, and $\hat{M}_{21}$ is constructed based on the channel combination ratio factor corresponding to the correlated signal channel combination scheme for the current frame.

$\hat{M}_{22}$ may have a plurality of forms, for example:

$$\hat{M}_{22} = \frac{1}{\alpha_1^2 + \alpha_2^2} * \begin{bmatrix} \alpha_1 & -\alpha_2 \\ -\alpha_2 & -\alpha_1 \end{bmatrix}, \text{ or}$$

$$\hat{M}_{22} = \frac{1}{\alpha_1^2 + \alpha_2^2} * \begin{bmatrix} -\alpha_1 & \alpha_2 \\ \alpha_2 & \alpha_1 \end{bmatrix}, \text{ or}$$

$$\hat{M}_{22} = \begin{bmatrix} 1 & -1 \\ -1 & -1 \end{bmatrix}, \text{ or}$$

$$\hat{M}_{22} = \begin{bmatrix} -1 & 1 \\ 1 & 1 \end{bmatrix}, \text{ or}$$

$$\hat{M}_{22} = \begin{bmatrix} -1 & -1 \\ 1 & -1 \end{bmatrix}, \text{ or}$$

$$\hat{M}_{22} = \begin{bmatrix} 1 & 1 \\ -1 & 1 \end{bmatrix},$$

where $\alpha_1$=ratio_SM, $\alpha_2$=1−ratio_SM, and ratio_SM indicates the channel combination ratio factor corresponding to the anticorrelated signal channel combination scheme for the current frame.

$\hat{M}_{12}$ may have a plurality of forms, for example:

$$\hat{M}_{12} = \frac{1}{\alpha_{1\_pre}^2 + \alpha_{2\_pre}^2} * \begin{bmatrix} \alpha_{1\_pre} & -\alpha_{2\_pre} \\ -\alpha_{2\_pre} & -\alpha_{1\_pre} \end{bmatrix}, \text{ or}$$

$$\hat{M}_{12} = \frac{1}{\alpha_{1\_pre}^2 + \alpha_{2\_pre}^2} * \begin{bmatrix} -\alpha_{1\_pre} & \alpha_{2\_pre} \\ \alpha_{2\_pre} & \alpha_{1\_pre} \end{bmatrix}, \text{ or}$$

$$\hat{M}_{12} = \begin{bmatrix} 1 & -1 \\ -1 & -1 \end{bmatrix}, \text{ or}$$

$$\hat{M}_{12} = \begin{bmatrix} -1 & 1 \\ 1 & 1 \end{bmatrix}, \text{ or}$$

$$\hat{M}_{12} = \begin{bmatrix} -1 & -1 \\ 1 & -1 \end{bmatrix}, \text{ or}$$

$$\hat{M}_{12} = \begin{bmatrix} 1 & 1 \\ -1 & 1 \end{bmatrix},$$

where $\alpha_{1\_pre}$=tdm_last_ratio_SM, and $\alpha_{2\_pre}$=1−tdm_last_ratio_SM; and tdm_last_ratio_SM indicates the channel combination ratio factor corresponding to the anticorrelated signal channel combination scheme for the previous frame.

$\hat{M}_{21}$ may have a plurality of forms, for example:

$$\hat{M}_{21} = \begin{bmatrix} 1 & 1 \\ 1 & -1 \end{bmatrix}, \text{ or}$$

$$\hat{M}_{21} = \frac{1}{\text{ratio}^2 + (1-\text{ratio})^2} * \begin{bmatrix} \text{ratio} & 1-\text{ratio} \\ 1-\text{ratio} & -\text{ratio} \end{bmatrix},$$

where ratio indicates the channel combination ratio factor corresponding to the correlated signal channel combination scheme for the current frame.

The following uses examples to describe scenarios for the correlated-to-anticorrelated signal coding switching mode and the anticorrelated-to-correlated signal coding switching mode. The time-domain downmix processing manners corresponding to the correlated-to-anticorrelated signal coding switching mode and the anticorrelated-to-correlated signal coding switching mode are, for example, segmented time-domain downmix processing manners.

Figure 6:
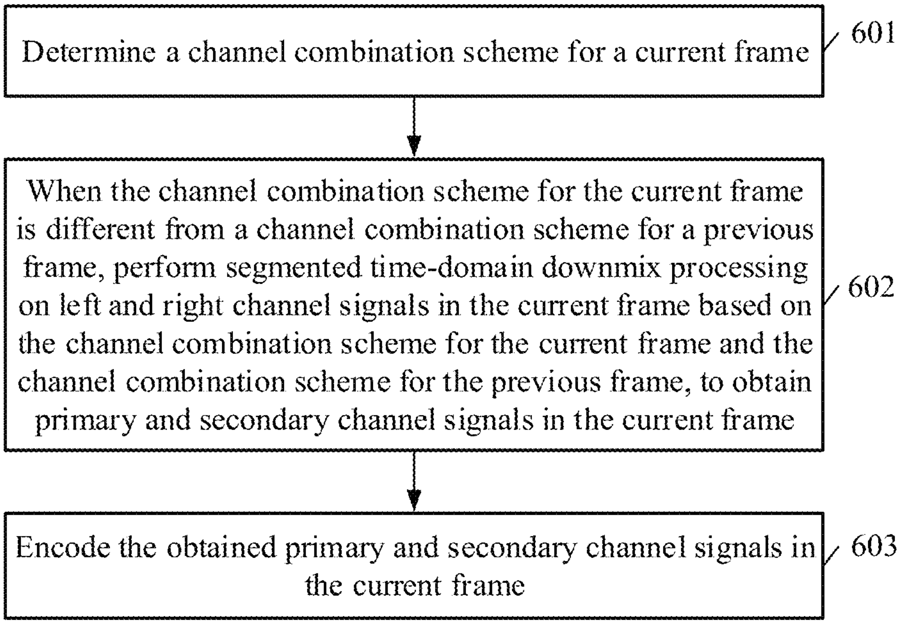
FIG. 6 is a schematic flowchart of another audio encoding method according to an embodiment of this application.

Referring to FIG. 6, an embodiment of this application provides an audio encoding method. Related steps of the audio encoding method may be implemented by an encoding apparatus, and the method may include the following operations.

601. Determine a channel combination scheme for a current frame.

602. When the channel combination scheme for the current frame is different from a channel combination scheme for a previous frame, perform segmented time-domain downmix processing on left and right channel signals in the current frame based on the channel combination scheme for the current frame and the channel combination scheme for the previous frame, to obtain primary and secondary channel signals in the current frame.

603. Encode the obtained primary and secondary channel signals in the current frame.

If the channel combination scheme for the current frame is different from the channel combination scheme for the previous frame, it may be determined that a coding mode of the current frame is a correlated-to-anticorrelated signal coding switching mode or an anticorrelated-to-correlated signal coding switching mode. If the coding mode of the current frame is the correlated-to-anticorrelated signal coding switching mode or the anticorrelated-to-correlated signal coding switching mode, for example, segmented time-domain downmix processing may be performed on the left and right channel signals in the current frame based on the channel combination scheme for the current frame and the channel combination scheme for the previous frame.

In one embodiment, for example, when the channel combination scheme for the previous frame is a correlated signal channel combination scheme, and the channel combination scheme for the current frame is an anticorrelated signal channel combination scheme, it may be determined that the coding mode of the current frame is the correlated-to-anticorrelated signal coding switching mode. For another example, when the channel combination scheme for the previous frame is the anticorrelated signal channel combination scheme, and the channel combination scheme for the current frame is the correlated signal channel combination scheme, it may be determined that the coding mode of the current frame is the anticorrelated-to-correlated signal coding switching mode. The rest can be deduced by analogy.

The segmented time-domain downmix processing may be understood as that the left and right channel signals in the current frame are divided into at least two segments, and a different time-domain downmix processing manner is used for each segment to perform time-domain downmix processing. It can be understood that compared with non-segmented time-domain downmix processing, the segmented time-domain downmix processing is more likely to obtain a smoother transition when a channel combination scheme for an adjacent frame changes.

It may be understood that, in the foregoing solution, the channel combination scheme for the current frame needs to be determined, and this indicates that there are a plurality of possibilities for the channel combination scheme for the current frame. Compared with a conventional solution in which there is only one channel combination scheme, this solution with a plurality of possible channel combination schemes can be better compatible with and match a plurality of possible scenarios. In addition, when the channel combination scheme for the current frame and the channel combination scheme for the previous frame are different, a mechanism of performing segmented time-domain downmix processing on the left and right channel signals in the current frame is introduced. The segmented time-domain downmix processing mechanism helps implement a smooth transition of the channel combination schemes, and further helps improve encoding quality.

In addition, because a channel combination scheme corresponding to a near out of phase signal is introduced, when a stereo signal in the current frame is a near out of phase signal, there are a more targeted channel combination scheme and coding mode, and this helps improve encoding quality.

For example, the channel combination scheme for the previous frame may be the correlated signal channel combination scheme or the anticorrelated signal channel combination scheme. The channel combination scheme for the current frame may be the correlated signal channel combination scheme or the anticorrelated signal channel combination scheme. Therefore, there are several possible cases in which the channel combination schemes for the current frame and the previous frame are different.

In one embodiment, for example, when the channel combination scheme for the previous frame is the correlated signal channel combination scheme, and the channel combination scheme for the current frame is the anticorrelated signal channel combination scheme, the left and right channel signals in the current frame include start segments of the left and right channel signals, middle segments of the left and right channel signals, and end segments of the left and right channel signals; and the primary and secondary channel signals in the current frame include start segments of the primary and secondary channel signals, middle segments of the primary and secondary channel signals, and end segments of the primary and secondary channel signals. In this case, the performing segmented time-domain downmix processing on left and right channel signals in the current frame based on the channel combination scheme for the current frame and the channel combination scheme for the previous frame, to obtain a primary channel signal and a secondary channel signal in the current frame may include:

performing, by using a channel combination ratio factor corresponding to the correlated signal channel combination scheme for the previous frame and a time-domain downmix processing manner corresponding to the correlated signal channel combination scheme for the previous frame, time-domain downmix processing on the start segments of the left and right channel signals in the current frame, to obtain the start segments of the primary and secondary channel signals in the current frame;

performing, by using a channel combination ratio factor corresponding to the anticorrelated signal channel combination scheme for the current frame and a time-domain downmix processing manner corresponding to the anticorrelated signal channel combination scheme for the current frame, time-domain downmix processing on the end segments of the left and right channel signals in the current frame, to obtain the end segments of the primary and secondary channel signals in the current frame; and performing, by using the channel combination ratio factor corresponding to the correlated signal channel combination scheme for the previous frame and the time-domain downmix processing manner corresponding to the correlated signal channel combination scheme for the previous frame, time-domain downmix processing on the middle segments of the left and right channel signals in the current frame, to obtain first middle segments of the primary and secondary channel signals; performing, by using the channel combination ratio factor corresponding to the anticorrelated signal channel combination scheme for the current frame and the time-domain downmix processing manner corresponding to the anticorrelated signal channel combination scheme for the current frame, time-domain downmix processing on the middle segments of the left and right channel signals in the current frame, to obtain second middle segments of the primary and secondary channel signals; and performing weighted summation processing on the first middle segments of the primary and secondary channel signals and the second middle segments of the primary and secondary channel signals, to obtain the middle segments of the primary and secondary channel signals in the current frame.

Lengths of the start segments of the left and right channel signals, the middle segments of the left and right channel signals, and the end segments of the left and right channel signals in the current frame may be set based on a requirement. The lengths of the start segments of the left and right channel signals, the middle segments of the left and right channel signals, and the end segments of the left and right channel signals in the current frame may be the same, or partially the same, or different from each other.

Lengths of the start segments of the primary and secondary channel signals, the middle segments of the primary and secondary channel signals, and the end segments of the primary and secondary channel signals in the current frame may be set based on a requirement. The lengths of the start segments of the primary and secondary channel signals, the middle segments of the primary and secondary channel signals, and the end segments of the primary and secondary channel signals in the current frame may be the same, or partially the same, or different from each other.

When weighted summation processing is performed on the first middle segments of the primary and secondary channel signals and the second middle segments of the primary and secondary channel signals, a weighting coefficient corresponding to the first middle segments of the primary and secondary channel signals may be equal to or unequal to a weighting coefficient corresponding to the second middle segments of the primary and secondary channel signals.

For example, when weighted summation processing is performed on the first middle segments of the primary and secondary channel signals and the second middle segments of the primary and secondary channel signals, the weighting coefficient corresponding to the first middle segments of the primary and secondary channel signals is a fade-out factor, and the weighting coefficient corresponding to the second middle segments of the primary and secondary channel signals is a fade-in factor.

In one embodiment, $$\begin{bmatrix} Y(n) \\ X(n) \end{bmatrix} = \begin{cases} \begin{bmatrix} Y_{11}(n) \\ X_{11}(n) \end{bmatrix}, & \text{if } 0 \le n < N_1 \\ \begin{bmatrix} Y_{21}(n) \\ X_{21}(n) \end{bmatrix}, & \text{if } N_1 \le n < N_2 \, ; \\ \begin{bmatrix} Y_{31}(n) \\ X_{31}(n) \end{bmatrix}, & \text{if } N_2 \le n < N \end{cases}$$

where $X_{11}(n)$ indicates the start segment of the primary channel signal in the current frame, $Y_{11}(n)$ indicates the start segment of the secondary channel signal in the current frame, $X_{31}(n)$ indicates the end segment of the primary channel signal in the current frame, $Y_{31}(n)$ indicates the end segment of the secondary channel signal in the current frame, $X_{21}(n)$ indicates the middle segment of the primary channel signal in the current frame, and $Y_{21}(n)$ indicates the middle segment of the secondary channel signal in the current frame;

X(n) indicates the primary channel signal in the current frame; and

Y(n) indicates the secondary channel signal in the current frame.

For example, $$\begin{bmatrix} Y_{21}(n) \\ X_{21}(n) \end{bmatrix} = \begin{bmatrix} Y_{211}(n) \\ X_{211}(n) \end{bmatrix} * \text{fade\_out}(n) + \begin{bmatrix} Y_{212}(n) \\ X_{212}(n) \end{bmatrix} * \text{fade\_in}(n).$$

For example, fade_in (n) indicates the fade-in factor, and fade_out(n) indicates the fade-out factor. For example, a sum of fade_in(n) and fade_out(n) is 1.

In one embodiment, for example, $$\text{fade\_in}(n) = \frac{n - N_1}{N_2 - N_1}; \text{ and}$$

$$\text{fade\_out}(n) = 1 - \frac{n - N_1}{N_2 - N_1}.$$

Certainly, fade_in(n) may alternatively be a fade-in factor of another function relationship based on n. Certainly, fade_out (n) may alternatively be a fade-out factor of another function relationship based on n.

Herein, n indicates a sampling point number. n=0, 1, . . . , N−1, and $0<N_1<N_2<N-1$.

For example, $N_1$ is equal to 100, 107, 120, 150, or another value.

For example, $N_2$ is equal to 180, 187, 200, 203, or another value.

Herein, $X_{211}(n)$ indicates the first middle segment of the primary channel signal in the current frame, and $Y_{211}(n)$ indicates the first middle segment of the secondary channel signal in the current frame. $X_{212}(n)$ indicates the second middle segment of the primary channel signal in the current frame, and $Y_{212}(n)$ indicates the second middle segment of the secondary channel signal in the current frame.

In one embodiment, $$\begin{bmatrix} Y_{212}(n) \\ X_{212}(n) \end{bmatrix} = M_{22} * \begin{bmatrix} X_L(n) \\ X_R(n) \end{bmatrix}, \text{ if } N_1 \le n < N_2;$$

$$\begin{bmatrix} Y_{211}(n) \\ X_{211}(n) \end{bmatrix} = M_{11} * \begin{bmatrix} X_L(n) \\ X_R(n) \end{bmatrix}, \text{ if } N_1 \le n < N_2;$$

$$\begin{bmatrix} Y_{11}(n) \\ X_{11}(n) \end{bmatrix} = M_{11} * \begin{bmatrix} X_L(n) \\ X_R(n) \end{bmatrix}, \text{ if } 0 \le n < N_1; \text{ and}$$

$$\begin{bmatrix} Y_{31}(n) \\ X_{31}(n) \end{bmatrix} = M_{22} * \begin{bmatrix} X_L(n) \\ X_R(n) \end{bmatrix}, \text{ if } N_2 \le n < N; \text{ where}$$

$X_L(n)$ indicates the left channel signal in the current frame, and $X_R(n)$ indicates the right channel signal in the current frame; and $\hat{M}_{11}$ indicates a downmix matrix corresponding to the correlated signal channel combination scheme for the previous frame, and $\hat{M}_{11}$ is constructed based on the channel combination ratio factor corresponding to the correlated signal channel combination scheme for the previous frame; and $\hat{M}_{22}$ indicates a downmix matrix corresponding to the anticorrelated signal channel combination scheme for the current frame, and $\hat{M}_{22}$ is constructed based on the channel combination ratio factor corresponding to the anticorrelated signal channel combination scheme for the current frame.

$M_{22}$ may have a plurality of possible forms, which are specifically, for example:

$$M_{22} = \begin{bmatrix} \alpha_1 & -\alpha_2 \\ -\alpha_2 & -\alpha_1 \end{bmatrix}, \text{ or}$$

$$M_{22} = \begin{bmatrix} -\alpha_1 & \alpha_2 \\ \alpha_2 & \alpha_1 \end{bmatrix}, \text{ or}$$

$$M_{22} = \begin{bmatrix} 0.5 & -0.5 \\ -0.5 & -0.5 \end{bmatrix}, \text{ or}$$

$$M_{22} = \begin{bmatrix} -0.5 & 0.5 \\ 0.5 & 0.5 \end{bmatrix}, \text{ or}$$

$$M_{22} = \begin{bmatrix} -0.5 & 0.5 \\ -0.5 & -0.5 \end{bmatrix}, \text{ or}$$

$$M_{22} = \begin{bmatrix} 0.5 & -0.5 \\ 0.5 & 0.5 \end{bmatrix},$$

where $\alpha_1$=ratio_SM, $\alpha_2$=1−ratio_SM, and ratio_SM indicates the channel combination ratio factor corresponding to the anticorrelated signal channel combination scheme for the current frame.

$\hat{M}_{11}$ may have a plurality of possible forms, which are specifically, for example:

$$M_{11} = \begin{bmatrix} 0.5 & 0.5 \\ 0.5 & -0.5 \end{bmatrix}, \text{ or}$$

$$M_{11} = \begin{bmatrix} \text{tdm\_last\_ratio} & 1 - \text{tdm\_last\_ratio} \\ 1 - \text{tdm\_last\_ratio} & -\text{tdm\_last\_ratio} \end{bmatrix},$$

where tdm_last_ratio indicates the channel combination ratio factor corresponding to the correlated signal channel combination scheme for the previous frame.

In one embodiment, for another example, when the channel combination scheme for the previous frame is the anticorrelated signal channel combination scheme, and the channel combination scheme for the current frame is the correlated signal channel combination scheme, the left and right channel signals in the current frame include start segments of the left and right channel signals, middle segments of the left and right channel signals, and end segments of the left and right channel signals; and the primary and secondary channel signals in the current frame include start segments of the primary and secondary channel signals, middle segments of the primary and secondary channel signals, and end segments of the primary and secondary channel signals. In this case, the performing segmented time-domain downmix processing on left and right channel signals in the current frame based on the channel combination scheme for the current frame and the channel combination scheme for the previous frame, to obtain a primary channel signal and a secondary channel signal in the current frame may include:

performing, by using a channel combination ratio factor corresponding to the anticorrelated signal channel combination scheme for the previous frame and a time-domain downmix processing manner corresponding to the anticorrelated signal channel combination scheme for the previous frame, time-domain downmix processing on the start segments of the left and right channel signals in the current frame, to obtain the start segments of the primary and secondary channel signals in the current frame;

performing, by using a channel combination ratio factor corresponding to the correlated signal channel combination scheme for the current frame and a time-domain downmix processing manner corresponding to the correlated signal channel combination scheme for the current frame, time-domain downmix processing on the end segments of the left and right channel signals in the current frame, to obtain the end segments of the primary and secondary channel signals in the current frame; and performing, by using the channel combination ratio factor corresponding to the anticorrelated signal channel combination scheme for the previous frame and the time-domain downmix processing manner corresponding to the anticorrelated signal channel combination scheme for the previous frame, time-domain downmix processing on the middle segments of the left and right channel signals in the current frame, to obtain third middle segments of the primary and secondary channel signals; performing, by using the channel combination ratio factor corresponding to the correlated signal channel combination scheme for the current frame and the time-domain downmix processing manner corresponding to the correlated signal channel combination scheme for the current frame, time-domain downmix processing on the middle segments of the left and right channel signals in the current frame, to obtain fourth middle segments of the primary and secondary channel signals; and performing weighted summation processing on the third middle segments of the primary and secondary channel signals and the fourth middle segments of the primary and secondary channel signals, to obtain the middle segments of the primary and secondary channel signals in the current frame.

When weighted summation processing is performed on the third middle segments of the primary and secondary channel signals and the fourth middle segments of the primary and secondary channel signals, a weighting coefficient corresponding to the third middle segments of the primary and secondary channel signals may be equal to or unequal to a weighting coefficient corresponding to the fourth middle segments of the primary and secondary channel signals.

For example, when weighted summation processing is performed on the third middle segments of the primary and secondary channel signals and the fourth middle segments of the primary and secondary channel signals, the weighting coefficient corresponding to the third middle segments of the primary and secondary channel signals is a fade-out factor, and the weighting coefficient corresponding to the fourth middle segments of the primary and secondary channel signals is a fade-in factor.

In one embodiment, $$\begin{bmatrix} Y(n) \\ X(n) \end{bmatrix} = \begin{cases} \begin{bmatrix} Y_{12}(n) \\ X_{12}(n) \end{bmatrix}, & \text{if } 0 \le n < N_3 \\ \begin{bmatrix} Y_{22}(n) \\ X_{22}(n) \end{bmatrix}, & \text{if } N_3 \le n < N_4; \\ \begin{bmatrix} Y_{32}(n) \\ X_{32}(n) \end{bmatrix}, & \text{if } N_4 \le n < N \end{cases}$$

where $X_{12}(n)$ indicates the start segment of the primary channel signal in the current frame, $Y_{12}(n)$ indicates the start segment of the secondary channel signal in the current frame, $X_{32}(n)$ indicates the end segment of the primary channel signal in the current frame, $Y_{32}(n)$ indicates the end segment of the secondary channel signal in the current frame, $X_{22}(n)$ indicates the middle segment of the primary channel signal in the current frame, and $Y_{22}(n)$ indicates the middle segment of the secondary channel signal in the current frame;

X(n) indicates the primary channel signal in the current frame; and

Y(n) indicates the secondary channel signal in the current frame.

For example, $$\begin{bmatrix} Y_{22}(n) \\ X_{22}(n) \end{bmatrix} = \begin{bmatrix} Y_{221}(n) \\ X_{221}(n) \end{bmatrix} * \text{fade\_out}(n) + \begin{bmatrix} Y_{222}(n) \\ X_{222}(n) \end{bmatrix} * \text{fade\_in}(n);$$

where fade_in(n) indicates the fade-in factor, fade_out(n) indicates the fade-out factor, and a sum of fade_in(n) and fade_out(n) is 1.

In one embodiment, for example, $$\text{fade\_in}(n) = \frac{n - N_3}{N_4 - N_3}; \text{ and}$$

$$\text{fade\_out}(n) = 1 - \frac{n - N_3}{N_4 - N_3}.$$

Certainly, fade_in(n) may alternatively be a fade-in factor of another function relationship based on n. Certainly, fade_out (n) may alternatively be a fade-out factor of another function relationship based on n.

Herein, n indicates a sampling point number. For example, n=0, 1, . . . , N−1.

Herein, $0<N_3<N_4<N-1$.

For example, $N_3$ is equal to 101, 107, 120, 150, or another value.

For example, $N_4$ is equal to 181, 187, 200, 205, or another value.

$X_{221}(n)$ indicates the third middle segment of the primary channel signal in the current frame, and $Y_{221}(n)$ indicates the third middle segment of the secondary channel signal in the current frame. $X_{222}(n)$ indicates the fourth middle segment of the primary channel signal in the current frame, and $Y_{222}(n)$ indicates the fourth middle segment of the secondary channel signal in the current frame.

In some possible implementations, $$\begin{bmatrix} Y_{222}(n) \\ X_{222}(n) \end{bmatrix} = M_{21} * \begin{bmatrix} X_L(n) \\ X_R(n) \end{bmatrix}, \text{ if } N_3 \le n < N_4;$$

$$\begin{bmatrix} Y_{221}(n) \\ X_{221}(n) \end{bmatrix} = M_{12} * \begin{bmatrix} X_L(n) \\ X_R(n) \end{bmatrix}, \text{ if } N_3 \le n < N_4;$$

$$\begin{bmatrix} Y_{12}(n) \\ X_{12}(n) \end{bmatrix} = M_{12} * \begin{bmatrix} X_L(n) \\ X_R(n) \end{bmatrix}, \text{ if } 0 \le n < N_3; \text{ and}$$

$$\begin{bmatrix} Y_{32}(n) \\ X_{32}(n) \end{bmatrix} = M_{21} * \begin{bmatrix} X_L(n) \\ X_R(n) \end{bmatrix}, \text{ if } N_4 \le n < N;$$

where $X_L(n)$ indicates the left channel signal in the current frame, and $X_R(n)$ indicates the right channel signal in the current frame.

$M_{12}$ indicates a downmix matrix corresponding to the anticorrelated signal channel combination scheme for the previous frame, and $M_{12}$ is constructed based on the channel combination ratio factor corresponding to the anticorrelated signal channel combination scheme for the previous frame. $M_{21}$ indicates a downmix matrix corresponding to the correlated signal channel combination scheme for the current frame, and $M_{21}$ is constructed based on the channel combination ratio factor corresponding to the correlated signal channel combination scheme for the current frame.

$M_{12}$ may have a plurality of possible forms, which are specifically, for example:

$$M_{12} = \begin{bmatrix} \alpha_{1\_pre} & -\alpha_{2\_pre} \\ -\alpha_{2\_pre} & -\alpha_{1\_pre} \end{bmatrix}, \text{ or}$$

$$M_{12} = \begin{bmatrix} -\alpha_{1\_pre} & \alpha_{2\_pre} \\ \alpha_{2\_pre} & \alpha_{1\_pre} \end{bmatrix}, \text{ or}$$

$$M_{12} = \begin{bmatrix} 0.5 & -0.5 \\ -0.5 & -0.5 \end{bmatrix}, \text{ or}$$

$$M_{12} = \begin{bmatrix} -0.5 & 05 \\ 0.5 & 05 \end{bmatrix}, \text{ or}$$

$$M_{12} = \begin{bmatrix} -0.5 & 0.5 \\ -0.5 & -0.5 \end{bmatrix}, \text{ or}$$

$$M_{12} = \begin{bmatrix} 0.5 & -05 \\ 0.5 & 0.5 \end{bmatrix},$$

where $\alpha_{1\_pre}$=tdm_last_ratio_SM, and $\alpha_{2\_pre}$=1−tdm_last_ratio_SM; and tdm_last_ratio_SM indicates the channel combination ratio factor corresponding to the anticorrelated signal channel combination scheme for the previous frame.

$M_{21}$ may have a plurality of possible forms, which are specifically, for example:

$$M_{21} = \begin{bmatrix} \text{ratio} & 1-\text{ratio} \\ 1-\text{ratio} & -\text{ratio} \end{bmatrix}, \text{ or}$$

$$M_{21} = \begin{bmatrix} 0.5 & 0.5 \\ 0.5 & -0.5 \end{bmatrix},$$

where ratio indicates the channel combination ratio factor corresponding to the correlated signal channel combination scheme for the current frame.

In one embodiment, the left and right channel signals in the current frame may be, for example, original left and right channel signals in the current frame, or may be left and right channel signals that have undergone time-domain pre-processing, or may be left and right channel signals that have undergone delay alignment processing.

In one embodiment, for example, $$\begin{bmatrix} X_L(n) \\ X_R(n) \end{bmatrix} = \begin{bmatrix} x_L(n) \\ x_R(n) \end{bmatrix}, \text{ or}$$

$$\begin{bmatrix} X_L(n) \\ X_R(n) \end{bmatrix} = \begin{bmatrix} x_{L\_HP}(n) \\ x_{R\_HP}(n) \end{bmatrix}, \text{ or}$$

$$\begin{bmatrix} X_L(n) \\ X_R(n) \end{bmatrix} = \begin{bmatrix} x'_L(n) \\ x'_R(n) \end{bmatrix},$$

where $x_L$(n) indicates the original left channel signal in the current frame (the original left channel signal is a left channel signal that has not undergone time-domain pre-processing), and $x_R$(n) indicates the original right channel signal in the current frame (the original right channel signal is a right channel signal that has not undergone time-domain pre-processing); and $x_{L\_HP}$(n) indicates the left channel signal that has undergone time-domain pre-processing in the current frame, and $x_{R\_HP}$(n) indicates the right channel signal that has undergone time-domain pre-processing in the current frame. $x_L$'(n) indicates the left channel signal that has undergone delay alignment processing in the current frame, and $x_R$'(n) indicates the right channel signal that has undergone delay alignment processing in the current frame.

It can be understood that, the segmented time-domain downmix processing manners in the foregoing examples may not be all possible implementations, and in an actual application, another segmented time-domain downmix processing manner may also be used.

Correspondingly, the following uses examples to describe scenarios for the correlated-to-anticorrelated signal decoding switching mode and the anticorrelated-to-correlated signal decoding switching mode. Time-domain downmix processing manners corresponding to the correlated-to-anticorrelated signal decoding switching mode and the anticorrelated-to-correlated signal decoding switching mode are, for example, segmented time-domain downmix processing manners.

Figure 7:
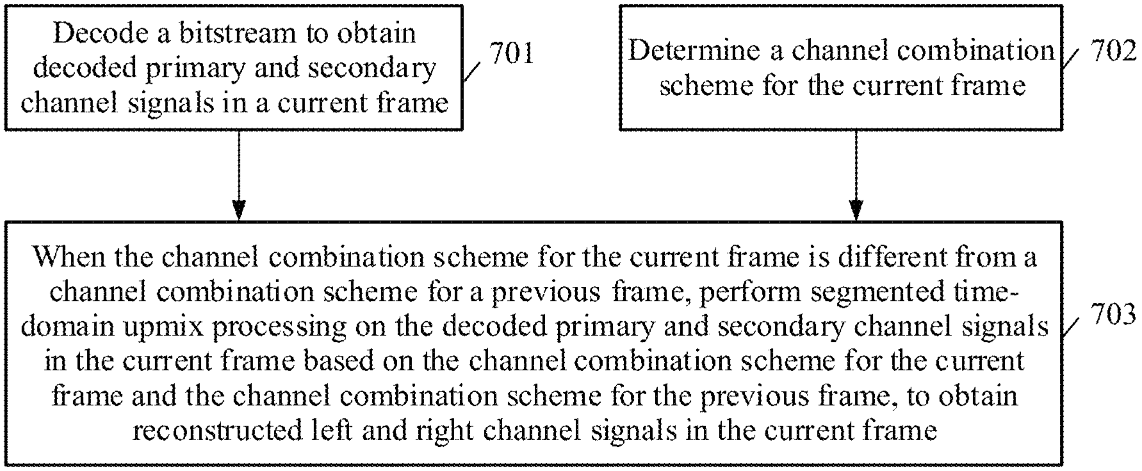
FIG. 7 is a schematic flowchart of another audio decoding method according to an embodiment of this application.

Referring to FIG. 7, an embodiment of this application provides an audio decoding method. Related steps of the audio decoding method may be implemented by a decoding apparatus, and the method may specifically include the following operations.

701. Perform decoding based on a bitstream to obtain decoded primary and secondary channel signals in a current frame.

702. Determine a channel combination scheme for the current frame.

It may be understood that there is no necessary sequence for performing operation 701 and operation 702.

703. When the channel combination scheme for the current frame is different from a channel combination scheme for a previous frame, perform segmented time-domain upmix processing on the decoded primary and secondary channel signals in the current frame based on the channel combination scheme for the current frame and the channel combination scheme for the previous frame, to obtain reconstructed left and right channel signals in the current frame.

The channel combination scheme for the current frame is one of a plurality of channel combination schemes.

For example, the plurality of channel combination schemes include an anticorrelated signal channel combination scheme and a correlated signal channel combination scheme. The correlated signal channel combination scheme is a channel combination scheme corresponding to a near in phase signal. The anticorrelated signal channel combination scheme is a channel combination scheme corresponding to a near out of phase signal. It may be understood that, the channel combination scheme corresponding to a near in phase signal is applicable to a near in phase signal, and the channel combination scheme corresponding to a near out of phase signal is applicable to a near out of phase signal.

The segmented time-domain upmix processing may be understood as that the left and right channel signals in the current frame are divided into at least two segments, and a different time-domain upmix processing manner is used for each segment to perform time-domain upmix processing. It can be understood that compared with non-segmented time-domain upmix processing, the segmented time-domain upmix processing is more likely to obtain a smoother transition when a channel combination scheme for an adjacent frame changes.

It may be understood that, in the foregoing solution, the channel combination scheme for the current frame needs to be determined, and this indicates that there are a plurality of possibilities for the channel combination scheme for the current frame. Compared with a conventional solution in which there is only one channel combination scheme, this solution with a plurality of possible channel combination schemes can be better compatible with and match a plurality of possible scenarios. In addition, when the channel combination scheme for the current frame and the channel combination scheme for the previous frame are different, a mechanism of performing segmented time-domain upmix processing on the left and right channel signals in the current frame is introduced. The segmented time-domain upmix processing mechanism helps implement a smooth transition of the channel combination schemes, and further helps improve encoding quality.

In addition, because the channel combination scheme corresponding to the near out of phase signal is introduced, when a stereo signal in the current frame is a near out of phase signal, there are a more targeted channel combination scheme and coding mode, and this helps improve encoding quality.

For example, the channel combination scheme for the previous frame may be the correlated signal channel combination scheme or the anticorrelated signal channel combination scheme. The channel combination scheme for the current frame may be the correlated signal channel combination scheme or the anticorrelated signal channel combination scheme. Therefore, there are several possible cases in which the channel combination schemes for the current frame and the previous frame are different.

In one embodiment, for example, the channel combination scheme for the previous frame is the correlated signal channel combination scheme, and the channel combination scheme for the current frame is the anticorrelated signal channel combination scheme. The reconstructed left and right channel signals in the current frame include start segments of the reconstructed left and right channel signals, middle segments of the reconstructed left and right channel signals, and end segments of the reconstructed left and right channel signals. The decoded primary and secondary channel signals in the current frame include start segments of the decoded primary and secondary channel signals, middle segments of the decoded primary and secondary channel signals, and end segments of the decoded primary and secondary channel signals. In this case, the performing segmented time-domain upmix processing on decoded primary and secondary channel signals in the current frame based on the channel combination scheme for the current frame and the channel combination scheme for the previous frame, to obtain reconstructed left and right channel signals in the current frame includes: performing, by using a channel combination ratio factor corresponding to the correlated signal channel combination scheme for the previous frame and a time-domain upmix processing manner corresponding to the correlated signal channel combination scheme for the previous frame, time-domain upmix processing on the start segments of the decoded primary and secondary channel signals in the current frame, to obtain the start segments of the reconstructed left and right channel signals in the current frame;

- performing, by using a channel combination ratio factor corresponding to the anticorrelated signal channel combination scheme for the current frame and a time-domain upmix processing manner corresponding to the anticorrelated signal channel combination scheme for the current frame, time-domain upmix processing on the end segments of the decoded primary and secondary channel signals in the current frame, to obtain the end segments of the reconstructed left and right channel signals in the current frame; and
- performing, by using the channel combination ratio factor corresponding to the correlated signal channel combination scheme for the previous frame and the time-domain upmix processing manner corresponding to the correlated signal channel combination scheme for the previous frame, time-domain upmix processing on the middle segments of the decoded primary and secondary channel signals in the current frame, to obtain first middle segments of the reconstructed left and right channel signals; performing, by using the channel combination ratio factor corresponding to the anticorrelated signal channel combination scheme for the current frame and the time-domain upmix processing manner corresponding to the anticorrelated signal channel combination scheme for the current frame, time-domain upmix processing on the middle segments of the decoded primary and secondary channel signals in the current frame, to obtain second middle segments of the reconstructed left and right channel signals; and performing weighted summation processing on the first middle segments of the reconstructed left and right channel signals and the second middle segments of the reconstructed left and right channel signals, to obtain the middle segments of the reconstructed left and right channel signals in the current frame.

Lengths of the start segments of the reconstructed left and right channel signals, the middle segments of the reconstructed left and right channel signals, and the end segments of the reconstructed left and right channel signals in the current frame may be set based on a requirement. The lengths of the start segments of the reconstructed left and right channel signals, the middle segments of the reconstructed left and right channel signals, and the end segments of the reconstructed left and right channel signals in the current frame may be the same, or partially the same, or different from each other.

Lengths of the start segments of the decoded primary and secondary channel signals, the middle segments of the decoded primary and secondary channel signals, and the end segments of the decoded primary and secondary channel signals in the current frame may be set based on a requirement. The lengths of the start segments of the decoded primary and secondary channel signals, the middle segments of the decoded primary and secondary channel signals, and the end segments of the decoded primary and secondary channel signals in the current frame may be the same, or partially the same, or different from each other.

The reconstructed left and right channel signals may be decoded left and right channel signals, or delay adjustment processing and/or time-domain post-processing may be performed on the reconstructed left and right channel signals to obtain the decoded left and right channel signals.

When weighted summation processing is performed on the first middle segments of the reconstructed left and right channel signals and the second middle segments of the reconstructed left and right channel signals, a weighting coefficient corresponding to the first middle segments of the reconstructed left and right channel signals may be equal to or unequal to a weighting coefficient corresponding to the second middle segments of the reconstructed left and right channel signals.

For example, when weighted summation processing is performed on the first middle segments of the reconstructed left and right channel signals and the second middle segments of the reconstructed left and right channel signals, the weighting coefficient corresponding to the first middle segments of the reconstructed left and right channel signals is a fade-out factor, and the weighting coefficient corresponding to the second middle segments of the reconstructed left and right channel signals is a fade-in factor.

In one embodiment, $$\begin{bmatrix} x'_L(n) \\ x'_R(n) \end{bmatrix} = \begin{cases} \begin{bmatrix} \hat{x}'_{L\_11}(n) \\ \hat{x}'_{R\_11}(n) \end{bmatrix}, & \text{if } 0 \le n < N_1 \\ \begin{bmatrix} \hat{x}'_{L\_21}(n) \\ \hat{x}'_{R\_21}(n) \end{bmatrix}, & \text{if } N_1 \le n < N_2; \\ \begin{bmatrix} \hat{x}'_{L\_31}(n) \\ \hat{x}'_{R\_31}(n) \end{bmatrix}, & \text{if } N_2 \le n < N \end{cases}$$

where $\hat{x}_{L\text{-}11}'(n)$ indicates the start segment of the reconstructed left channel signal in the current frame, and $\hat{x}_{R\text{-}11}'(n)$ indicates the start segment of the reconstructed right channel signal in the current frame. $\hat{x}_{L\text{-}31}'(n)$ indicates the end segment of the reconstructed left channel signal in the current frame, and $\hat{x}_{R\text{-}31}'(n)$ indicates the end segment of the reconstructed right channel signal in the current frame. $\hat{x}_{L\text{-}21}'(n)$ indicates the middle segment of the reconstructed left channel signal in the current frame, and $\hat{x}_{R\text{-}21}'(n)$ indicates the middle segment of the reconstructed right channel signal in the current frame;

$\hat{x}_L'(n)$ indicates the reconstructed left channel signal in the current frame; and $\hat{x}_R'(n)$ indicates the reconstructed right channel signal in the current frame.

For example, $$\begin{bmatrix} \hat{x}'_{L\_21}(n) \\ \hat{x}'_{R\_21}(n) \end{bmatrix} = \begin{bmatrix} \hat{x}'_{L\_211}(n) \\ \hat{x}'_{R\_211}(n) \end{bmatrix} * \text{fade\_out}(n) + \begin{bmatrix} \hat{x}'_{L\_212}(n) \\ \hat{x}'_{R\_212}(n) \end{bmatrix} * \text{fade\_in}(n).$$

For example, fade_in (n) indicates the fade-in factor, and fade_out(n) indicates the fade-out factor. For example, a sum of fade_in (n) and fade_out(n) is 1.

In one embodiment, for example, $$\text{fade\_in}(n) = \frac{n - N_1}{N_2 - N_1}; \text{ and}$$

$$\text{fade\_out}(n) = 1 - \frac{n - N_1}{N_2 - N_1}.$$

Certainly, fade_in (n) may alternatively be a fade-in factor of another function relationship based on n. Certainly, fade_out (n) may alternatively be a fade-out factor of another function relationship based on n.

Herein, n indicates a sampling point number, and n=0, 1, . . . , N−1. Herein, $0<N_1<N_2<N-1$.

$\hat{x}_{L\text{-}211}'(n)$ indicates the first middle segment of the reconstructed left channel signal in the current frame, and $\hat{x}_{R\text{-}211}'(n)$ indicates the first middle segment of the reconstructed right channel signal in the current frame. $\hat{x}_{L\text{-}212}'(n)$ indicates the second middle segment of the reconstructed left channel signal in the current frame, and $\hat{x}_{R\text{-}212}'(n)$ indicates the second middle segment of the reconstructed right channel signal in the current frame.

In one embodiment, $$\begin{bmatrix} \hat{x}'_{L\_212}(n) \\ \hat{x}_{R\_212}(n) \end{bmatrix} = \hat{M}_{22} * \begin{bmatrix} \hat{Y}(n) \\ \hat{X}(n) \end{bmatrix}, \text{ if } N_1 \le n < N_2;$$

$$\begin{bmatrix} \hat{x}'_{L\_211}(n) \\ \hat{x}_{R\_211}(n) \end{bmatrix} = \hat{M}_{11} * \begin{bmatrix} \hat{Y}(n) \\ \hat{X}(n) \end{bmatrix}, \text{ if } N_1 \le n < N_2;$$

$$\begin{bmatrix} \hat{x}'_{L\_11}(n) \\ \hat{x}'_{R\_11}(n) \end{bmatrix} = \hat{M}_{11} * \begin{bmatrix} \hat{Y}(n) \\ \hat{X}(n) \end{bmatrix}, \text{ if } 0 \le n < N_1; \text{ and}$$

$$\begin{bmatrix} \hat{x}'_{L\_31}(n) \\ \hat{x}'_{R\_31}(n) \end{bmatrix} = \hat{M}_{22} * \begin{bmatrix} \hat{Y}(n) \\ \hat{X}(n) \end{bmatrix}, \text{ if } N_2 \le n < N;$$

where $\hat{X}(n)$ indicates the decoded primary channel signal in the current frame, and $\hat{Y}(n)$ indicates the decoded secondary channel signal in the current frame; and $\hat{M}_{11}$ indicates an upmix matrix corresponding to the correlated signal channel combination scheme for the previous frame, and $\hat{M}_{11}$ is constructed based on the channel combination ratio factor corresponding to the correlated signal channel combination scheme for the previous frame; and $\hat{M}_{22}$ indicates an upmix matrix corresponding to the anticorrelated signal channel combination scheme for the current frame, and $\hat{M}_{22}$ is constructed based on the channel combination ratio factor corresponding to the anticorrelated signal channel combination scheme for the current frame.

$\hat{M}_{11}$ may have a plurality of possible forms, which are, for example:

$$\hat{M}_{22} = \frac{1}{\alpha_1^2 + \alpha_2^2} * \begin{bmatrix} \alpha_1 & -\alpha_2 \\ -\alpha_2 & -\alpha_1 \end{bmatrix}, \text{ or}$$

$$\hat{M}_{22} = \frac{1}{\alpha_1^2 + \alpha_2^2} * \begin{bmatrix} -\alpha_1 & \alpha_2 \\ \alpha_2 & \alpha_1 \end{bmatrix}, \text{ or}$$

$$\hat{M}_{22} = \begin{bmatrix} 1 & -1 \\ -1 & -1 \end{bmatrix}, \text{ or}$$

$$\hat{M}_{22} = \begin{bmatrix} -1 & 1 \\ 1 & 1 \end{bmatrix}, \text{ or}$$

$$\hat{M}_{22} = \begin{bmatrix} -1 & -1 \\ 1 & -1 \end{bmatrix}, \text{ or}$$

$$\hat{M}_{22} = \begin{bmatrix} 1 & 1 \\ -1 & 1 \end{bmatrix},$$

where $\alpha_1$=ratio_SM, $\alpha_2$=1−ratio_SM, and ratio_SM indicates the channel combination ratio factor corresponding to the anticorrelated signal channel combination scheme for the current frame.

$\hat{M}_{22}$ may have a plurality of possible forms, which are, for example:

$$\hat{M}_{11} = \begin{bmatrix} 1 & 1 \\ 1 & -1 \end{bmatrix}, \text{ or}$$

$$\hat{M}_{11} = \frac{1}{\text{tdm\_last\_ratio}^2 + (1 - \text{tdm\_last\_ratio})^2} * \begin{bmatrix} \text{tdm\_last\_ratio} & 1 - \text{tdm\_last\_ratio} \\ 1 - \text{tdm\_last\_ratio} & -\text{tdm\_last\_ratio} \end{bmatrix}$$

Herein, tdm_last_ratio indicates the channel combination ratio factor corresponding to the correlated signal channel combination scheme for the previous frame.

In one embodiment, for another example, the channel combination scheme for the previous frame is the anticorrelated signal channel combination scheme, and the channel combination scheme for the current frame is the correlated signal channel combination scheme. The reconstructed left and right channel signals in the current frame include start segments of the reconstructed left and right channel signals, middle segments of the reconstructed left and right channel signals, and end segments of the reconstructed left and right channel signals. The decoded primary and secondary channel signals in the current frame include start segments of the decoded primary and secondary channel signals, middle segments of the decoded primary and secondary channel signals, and end segments of the decoded primary and secondary channel signals. In this case, the performing segmented time-domain upmix processing on decoded primary and secondary channel signals in the current frame based on the channel combination scheme for the current frame and the channel combination scheme for the previous frame, to obtain reconstructed left and right channel signals in the current frame includes:

performing, by using a channel combination ratio factor corresponding to the anticorrelated signal channel combination scheme for the previous frame and a time-domain upmix processing manner corresponding to the anticorrelated signal channel combination scheme for the previous frame, time-domain upmix processing on the start segments of the decoded primary and secondary channel signals in the current frame, to obtain the start segments of the reconstructed left and right channel signals in the current frame;

performing, by using a channel combination ratio factor corresponding to the correlated signal channel combination scheme for the current frame and a time-domain upmix processing manner corresponding to the correlated signal channel combination scheme for the current frame, time-domain upmix processing on the end segments of the decoded primary and secondary channel signals in the current frame, to obtain the end segments of the reconstructed left and right channel signals in the current frame; and performing, by using the channel combination ratio factor corresponding to the anticorrelated signal channel combination scheme for the previous frame and the time-domain upmix processing manner corresponding to the anticorrelated signal channel combination scheme for the previous frame, time-domain upmix processing on the middle segments of the decoded primary and secondary channel signals in the current frame, to obtain third middle segments of the reconstructed left and right channel signals; performing, by using the channel combination ratio factor corresponding to the correlated signal channel combination scheme for the current frame and the time-domain upmix processing manner corresponding to the correlated signal channel combination scheme for the current frame, time-domain upmix processing on the middle segments of the decoded primary and secondary channel signals in the current frame, to obtain fourth middle segments of the reconstructed left and right channel signals; and performing weighted summation processing on the third middle segments of the reconstructed left and right channel signals and the fourth middle segments of the reconstructed left and right channel signals, to obtain the middle segments of the reconstructed left and right channel signals in the current frame.

When weighted summation processing is performed on the third middle segments of the reconstructed left and right channel signals and the fourth middle segments of the reconstructed left and right channel signals, a weighting coefficient corresponding to the third middle segments of the reconstructed left and right channel signals may be equal to or unequal to a weighting coefficient corresponding to the fourth middle segments of the reconstructed left and right channel signals.

For example, when weighted summation processing is performed on the third middle segments of the reconstructed left and right channel signals and the fourth middle segments of the reconstructed left and right channel signals, the weighting coefficient corresponding to the third middle segments of the reconstructed left and right channel signals is a fade-out factor, and the weighting coefficient corresponding to the fourth middle segments of the reconstructed left and right channel signals is a fade-in factor.

In one embodiment, $$\begin{bmatrix} \hat{x}'_L(n) \\ \hat{x}'_R(n) \end{bmatrix} = \begin{cases} \begin{bmatrix} \hat{x}'_{L-12}(n) \\ \hat{x}'_{R-12}(n) \end{bmatrix}, & \text{if } 0 \le n < N_3 \\ \begin{bmatrix} \hat{x}'_{L-22}(n) \\ \hat{x}'_{R-22}(n) \end{bmatrix}, & \text{if } N_3 \le n < N_4 \\ \begin{bmatrix} \hat{x}'_{L-32}(n) \\ \hat{x}'_{R-32}(n) \end{bmatrix}, & \text{if } N_4 \le n < N \end{cases};$$

where $\hat{x}_{L-12}'(n)$ indicates the start segment of the reconstructed left channel signal in the current frame, $\hat{x}_{R-12}'(n)$ indicates the start segment of the reconstructed right channel signal in the current frame, $\hat{x}_{L-32}'(n)$ indicates the end segment of the reconstructed left channel signal in the current frame, $\hat{x}_{R-32}'(n)$ indicates the end segment of the reconstructed right channel signal in the current frame, $\hat{x}_{L-22}'(n)$ indicates the middle segment of the reconstructed left channel signal in the current frame, and $\hat{x}_{R-22}'(n)$ indicates the middle segment of the reconstructed right channel signal in the current frame;

$\hat{x}_L'(n)$ indicates the reconstructed left channel signal in the current frame; and $\hat{x}_R'(n)$ indicates the reconstructed right channel signal in the current frame.

For example, $$\begin{bmatrix} \hat{x}'_{L-22}(n) \\ \hat{x}'_{R-22}(n) \end{bmatrix} = \begin{bmatrix} \hat{x}'_{L-221}(n) \\ \hat{x}'_{R-221}(n) \end{bmatrix} * \text{fade\_out}(n) + \begin{bmatrix} \hat{x}'_{L-222}(n) \\ \hat{x}'_{R-222}(n) \end{bmatrix} * \text{fade\_in}(n).$$

fade_in (n) indicates the fade-in factor, fade_out(n) indicates the fade-out factor, and a sum of fade_in (n) and fade_out(n) is 1.

In one embodiment, for example, $$\text{fade\_in}(n) = \frac{n - N_3}{N_4 - N_3}; \text{ and } \text{fade\_out}(n) = 1 - \frac{n - N_3}{N_4 - N_3}.$$

Certainly, fade_in (n) may alternatively be a fade-in factor of another function relationship based on n. Certainly, fade_out (n) may alternatively be a fade-out factor of another function relationship based on n.

Herein, n indicates a sampling point number. For example, n=0, 1, . . . , N−1.

Herein, $0<N_3<N_4<N-1$.

For example, $N_3$ is equal to 101, 107, 120, 150, or another value.

For example, $N_4$ is equal to 181, 187, 200, 205, or another value.

$\hat{x}_{L-221}'(n)$ indicates the third middle segment of the reconstructed left channel signal in the current frame, and $\hat{x}_{R-221}'(n)$ indicates the third middle segment of the reconstructed right channel signal in the current frame. $\hat{x}_{L-222}'(n)$ indicates the fourth middle segment of the reconstructed left channel signal in the current frame, and $\hat{x}_{R-222}'(n)$ indicates the fourth middle segment of the reconstructed right channel signal in the current frame.

In one embodiment, $$\begin{bmatrix} \hat{x}'_{L-222}(n) \\ \hat{x}'_{R-222}(n) \end{bmatrix} = \hat{M}_{21} * \begin{bmatrix} \hat{Y}(n) \\ \hat{X}(n) \end{bmatrix}, \text{ if } N_3 \le n < N_4;$$

$$\begin{bmatrix} \hat{x}'_{L-221}(n) \\ \hat{x}'_{R-221}(n) \end{bmatrix} = \hat{M}_{12} * \begin{bmatrix} \hat{Y}(n) \\ \hat{X}(n) \end{bmatrix}, \text{ if } N_3 \le n < N_4;$$

$$\begin{bmatrix} \hat{x}'_{L-12}(n) \\ \hat{x}'_{R-12}(n) \end{bmatrix} = \hat{M}_{12} * \begin{bmatrix} \hat{Y}(n) \\ \hat{X}(n) \end{bmatrix}, \text{ if } 0 \le n < N_3; \text{ and}$$

$$\begin{bmatrix} \hat{x}'_{L-32}(n) \\ \hat{x}'_{R-32}(n) \end{bmatrix} = \hat{M}_{21} * \begin{bmatrix} \hat{Y}(n) \\ \hat{X}(n) \end{bmatrix}, \text{ if } N_4 \le n < N;$$

where $\hat{X}(n)$ indicates the decoded primary channel signal in the current frame, and $\hat{Y}(n)$ indicates the decoded secondary channel signal in the current frame.

$\hat{M}_{12}$ indicates an upmix matrix corresponding to the anticorrelated signal channel combination scheme for the previous frame, and $\hat{M}_{12}$ is constructed based on the channel combination ratio factor corresponding to the anticorrelated signal channel combination scheme for the previous frame. $\hat{M}_{21}$ indicates an upmix matrix corresponding to the correlated signal channel combination scheme for the current frame, and $\hat{M}_{21}$ is constructed based on the channel combination ratio factor corresponding to the correlated signal channel combination scheme for the current frame.

$\hat{M}_{12}$ may have a plurality of possible forms, which are, for example:

$$\hat{M}_{12} = \frac{1}{\alpha_{1\_pre}^2 + \alpha_{2\_pre}^2} * \begin{bmatrix} \alpha_{1\_pre} & -\alpha_{2\_pre} \\ -\alpha_{2\_pre} & -\alpha_{1\_pre} \end{bmatrix}, \text{ or}$$

$$\hat{M}_{12} = \frac{1}{\alpha_{1\_pre}^2 + \alpha_{2\_pre}^2} * \begin{bmatrix} -\alpha_{1\_pre} & \alpha_{2\_pre} \\ \alpha_{2\_pre} & \alpha_{1\_pre} \end{bmatrix}, \text{ or}$$

$$\hat{M}_{12} = \begin{bmatrix} 1 & -1 \\ -1 & -1 \end{bmatrix}, \text{ or}$$

$$\hat{M}_{12} = \begin{bmatrix} -1 & 1 \\ 1 & 1 \end{bmatrix}, \text{ or}$$

$$\hat{M}_{12} = \begin{bmatrix} -1 & -1 \\ 1 & -1 \end{bmatrix}, \text{ or}$$

$$\hat{M}_{12} = \begin{bmatrix} 1 & 1 \\ -1 & 1 \end{bmatrix},$$

where $\alpha_{1\_pre}$=tdm_last_ratio_SM, and $\alpha_{2\_pre}$=1−tdm_last_ratio_SM; and tdm_last_ratio_SM indicates the channel combination ratio factor corresponding to the anticorrelated signal channel combination scheme for the previous frame.

$\hat{M}_{21}$ may have a plurality of possible forms, which are specifically, for example:

$$\hat{M}_{21} = \begin{bmatrix} 1 & 1 \\ 1 & -1 \end{bmatrix}, \text{ or}$$

$$\hat{M}_{21} = \frac{1}{\text{ratio}^2 + (1-\text{ratio})^2} * \begin{bmatrix} \text{ratio} & 1-\text{ratio} \\ 1-\text{ratio} & -\text{ratio} \end{bmatrix},$$

where ratio indicates the channel combination ratio factor corresponding to the correlated signal channel combination scheme for the current frame.

In this embodiment of this application, a stereo parameter (for example, a channel combination ratio factor and/or an inter-channel time difference) of the current frame may be a fixed value, or may be determined based on the channel combination scheme (for example, the correlated signal channel combination scheme or the anticorrelated signal channel combination scheme) for the current frame.

Figure 8:
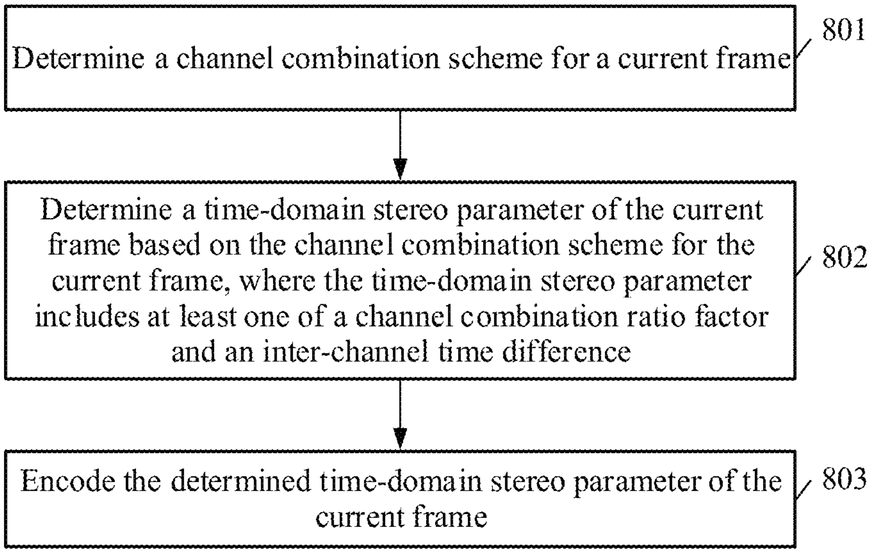
FIG. 8 is a schematic flowchart of a time-domain stereo parameter determining method according to an embodiment of this application.

Referring to FIG. 8, the following uses examples to describe a time-domain stereo parameter determining method. Related steps of the time-domain stereo parameter determining method may be implemented by an encoding apparatus, and the method may specifically include the following operations.

801. Determine a channel combination scheme for a current frame.

802. Determine a time-domain stereo parameter of the current frame based on the channel combination scheme for the current frame, where the time-domain stereo parameter includes at least one of a channel combination ratio factor and an inter-channel time difference.

The channel combination scheme for the current frame is one of a plurality of channel combination schemes.

For example, the plurality of channel combination schemes include an anticorrelated signal channel combination scheme and a correlated signal channel combination scheme.

The correlated signal channel combination scheme is a channel combination scheme corresponding to a near in phase signal. The anticorrelated signal channel combination scheme is a channel combination scheme corresponding to a near out of phase signal. It may be understood that, the channel combination scheme corresponding to a near in phase signal is applicable to a near in phase signal, and the channel combination scheme corresponding to a near out of phase signal is applicable to a near out of phase signal.

When it is determined that the channel combination scheme for the current frame is the correlated signal channel combination scheme, the time-domain stereo parameter of the current frame is a time-domain stereo parameter corresponding to the correlated signal channel combination scheme for the current frame; or when it is determined that the channel combination scheme for the current frame is the anticorrelated signal channel combination scheme, the time-domain stereo parameter of the current frame is a time-domain stereo parameter corresponding to the anticorrelated signal channel combination scheme for the current frame.

It may be understood that, in the foregoing solution, the channel combination scheme for the current frame needs to be determined, and this indicates that there are a plurality of possibilities for the channel combination scheme for the current frame. Compared with a conventional solution in which there is only one channel combination scheme, this solution with a plurality of possible channel combination schemes can be better compatible with and match a plurality of possible scenarios. Because the time-domain stereo parameter of the current frame is determined based on the channel combination scheme for the current frame, the time-domain stereo parameter can be better compatible with and match the plurality of possible scenarios, and encoding and decoding quality can be further improved.

In one embodiment, a channel combination ratio factor corresponding to the anticorrelated signal channel combination scheme for the current frame and a channel combination ratio factor corresponding to the correlated signal channel combination scheme for the current frame may be separately calculated first. Then, when it is determined that the channel combination scheme for the current frame is the correlated signal channel combination scheme, it is determined that the time-domain stereo parameter of the current frame is the time-domain stereo parameter corresponding to the correlated signal channel combination scheme for the current frame; or when it is determined that the channel combination scheme for the current frame is the anticorrelated signal channel combination scheme, it is determined that the time-domain stereo parameter of the current frame is the time-domain stereo parameter corresponding to the anticorrelated signal channel combination scheme for the current frame. Alternatively, the time-domain stereo parameter corresponding to the correlated signal channel combination scheme for the current frame may be first calculated, and when it is determined that the channel combination scheme for the current frame is the correlated signal channel combination scheme, it is determined that the time-domain stereo parameter of the current frame is the time-domain stereo parameter corresponding to the correlated signal channel combination scheme for the current frame, or when it is determined that the channel combination scheme for the current frame is the anticorrelated signal channel combination scheme, the time-domain stereo parameter corresponding to the anticorrelated signal channel combination scheme for the current frame is calculated, and the time-domain stereo parameter corresponding to the anticorrelated signal channel combination scheme for the current frame is determined as the time-domain stereo parameter of the current frame.

Alternatively, the channel combination scheme for the current frame may be first determined. When it is determined that the channel combination scheme for the current frame is the correlated signal channel combination scheme, the time-domain stereo parameter corresponding to the correlated signal channel combination scheme for the current frame is calculated, and the time-domain stereo parameter of the current frame is the time-domain stereo parameter corresponding to the correlated signal channel combination scheme for the current frame; or when it is determined that the channel combination scheme for the current frame is the anticorrelated signal channel combination scheme, the time-domain stereo parameter corresponding to the anticorrelated signal channel combination scheme for the current frame is calculated, and the time-domain stereo parameter of the current frame is the time-domain stereo parameter corresponding to the anticorrelated signal channel combination scheme for the current frame.

In one embodiment, the determining a time-domain stereo parameter of the current frame based on the channel combination scheme for the current frame may include: determining, based on the channel combination scheme for the current frame, an initial value of the channel combination ratio factor corresponding to the channel combination scheme for the current frame. When the initial value of the channel combination ratio factor corresponding to the channel combination scheme (the correlated signal channel combination scheme or the anticorrelated signal channel combination scheme) for the current frame does not need to be modified, the channel combination ratio factor corresponding to the channel combination scheme for the current frame is equal to the initial value of the channel combination ratio factor corresponding to the channel combination scheme for the current frame. When the initial value of the channel combination ratio factor corresponding to the channel combination scheme (the correlated signal channel combination scheme or the anticorrelated signal channel combination scheme) for the current frame needs to be modified, the initial value of the channel combination ratio factor corresponding to the channel combination scheme for the current frame is modified, to obtain a modified value of the channel combination ratio factor corresponding to the channel combination scheme for the current frame, and the channel combination ratio factor corresponding to the channel combination scheme for the current frame is equal to the modified value of the channel combination ratio factor corresponding to the channel combination scheme for the current frame.

For example, the determining a time-domain stereo parameter of the current frame based on the channel combination scheme for the current frame may include: calculating frame energy of a left channel signal in the current frame based on the left channel signal in the current frame; calculating frame energy of a right channel signal in the current frame based on the right channel signal in the current frame; and calculating the initial value of the channel combination ratio factor corresponding to the correlated signal channel combination scheme for the current frame based on the frame energy of the left channel signal in the current frame and the frame energy of the right channel signal in the current frame.

When the initial value of the channel combination ratio factor corresponding to the correlated signal channel combination scheme for the current frame does not need to be modified, the channel combination ratio factor corresponding to the correlated signal channel combination scheme for the current frame is equal to the initial value of the channel combination ratio factor corresponding to the correlated signal channel combination scheme for the current frame, and an encoded index of the channel combination ratio factor corresponding to the correlated signal channel combination scheme for the current frame is equal to an encoded index of the initial value of the channel combination ratio factor corresponding to the correlated signal channel combination scheme for the current frame.

When the initial value of the channel combination ratio factor corresponding to the correlated signal channel combination scheme for the current frame needs to be modified, the initial value of the channel combination ratio factor corresponding to the correlated signal channel combination scheme for the current frame and an encoded index of the initial value are modified, to obtain a modified value of the channel combination ratio factor corresponding to the correlated signal channel combination scheme for the current frame and an encoded index of the modified value. The channel combination ratio factor corresponding to the correlated signal channel combination scheme for the current frame is equal to the modified value of the channel combination ratio factor corresponding to the correlated signal channel combination scheme for the current frame, and an encoded index of the channel combination ratio factor corresponding to the correlated signal channel combination scheme for the current frame is equal to the encoded index of the modified value of the channel combination ratio factor corresponding to the correlated signal channel combination scheme for the current frame.

In one embodiment, for example, when the initial value of the channel combination ratio factor corresponding to the correlated signal channel combination scheme for the current frame and the encoded index of the initial value are modified, $$\text{ratio\_}idx\text{\_mod}=0.5*(tdm\text{\_last\_ratio\_}idx+16);\text{ and}$$

$$\text{ratio\_mod}_{\_qua}=\text{ratio\_tabl[ratio\_}idx\text{\_mod]};\text{ where}$$

tdm_last_ratio_idx indicates an encoded index of a channel combination ratio factor corresponding to a correlated signal channel combination scheme for a previous frame; ratio_idx_mod indicates the encoded index corresponding to the modified value of the channel combination ratio factor corresponding to the correlated signal channel combination scheme for the current frame; and $\text{ratio\_mod}_{qua}$ indicates the modified value of the channel combination ratio factor corresponding to the correlated signal channel combination scheme for the current frame.

In one embodiment, the determining a time-domain stereo parameter of the current frame based on the channel combination scheme for the current frame includes: obtaining a reference channel signal in the current frame based on the left channel signal and the right channel signal in the current frame; calculating an amplitude correlation parameter between the left channel signal and the reference channel signal in the current frame; calculating an amplitude correlation parameter between the right channel signal and the reference channel signal in the current frame; calculating an amplitude correlation difference parameter between the left and right channel signals in the current frame based on the amplitude correlation parameter between the left channel signal and the reference channel signal in the current frame and the amplitude correlation parameter between the right channel signal and the reference channel signal in the current frame; and calculating, based on the amplitude correlation difference parameter between the left and right channel signals in the current frame, the channel combination ratio factor corresponding to the anticorrelated signal channel combination scheme for the current frame.

The calculating, based on the amplitude correlation difference parameter between the left and right channel signals in the current frame, the channel combination ratio factor corresponding to the anticorrelated signal channel combination scheme for the current frame may include, for example: calculating, based on the amplitude correlation difference parameter between the left and right channel signals in the current frame, an initial value of the channel combination ratio factor corresponding to the anticorrelated signal channel combination scheme for the current frame; and modifying the initial value of the channel combination ratio factor corresponding to the anticorrelated signal channel combination scheme for the current frame, to obtain the channel combination ratio factor corresponding to the anticorrelated signal channel combination scheme for the current frame. It may be understood that, when the initial value of the channel combination ratio factor corresponding to the anticorrelated signal channel combination scheme for the current frame does not need to be modified, the channel combination ratio factor corresponding to the anticorrelated signal channel combination scheme for the current frame is equal to the initial value of the channel combination ratio factor corresponding to the anticorrelated signal channel combination scheme for the current frame.

In one embodiment, $$\text{corr\_LM} = \frac{\sum_{n=0}^{N-1} |x'_L(n)| * |\text{mono\_i}(n)|}{\sum_{n=0}^{N-1} |\text{mono\_i}(n)| * |\text{mono\_i}(n)|}; \text{ and}$$

$$\text{corr\_RM} = \frac{\sum_{n=0}^{N-1} |x'_R(n)| * |\text{mono\_i}(n)|}{\sum_{n=0}^{N-1} |\text{mono\_i}(n)| * |\text{mono\_i}(n)|}; \text{ where}$$

$$\text{mono\_i}(n) = \frac{x'_L(n) - x'_R(n)}{2};$$

mono_i(n) indicates the reference channel signal in the current frame; and $\hat{x}_L$'(n) indicates a left channel signal that has undergone delay alignment processing in the current frame, $\hat{x}_R$'(n) indicates a right channel signal that has undergone delay alignment processing in the current frame, corr_LM indicates the amplitude correlation parameter between the left channel signal and the reference channel signal in the current frame, and corr_RM indicates the amplitude correlation parameter between the right channel signal and the reference channel signal in the current frame.

In one embodiment, the calculating an amplitude correlation difference parameter between the left and right channel signals in the current frame based on the amplitude correlation parameter between the left channel signal and the reference channel signal in the current frame and the amplitude correlation parameter between the right channel signal and the reference channel signal in the current frame includes: calculating a long-term smoothed amplitude correlation parameter between the left channel signal and the reference channel signal in the current frame based on the amplitude correlation parameter between the left channel signal that has undergone delay alignment processing and the reference channel signal in the current frame; calculating a long-term smoothed amplitude correlation parameter between the right channel signal and the reference channel signal in the current frame based on the amplitude correlation parameter between the right channel signal that has undergone delay alignment processing and the reference channel signal in the current frame; and calculating the amplitude correlation difference parameter between the left and right channels in the current frame based on the long-term smoothed amplitude correlation parameter between the left channel signal and the reference channel signal in the current frame and the long-term smoothed amplitude correlation parameter between the right channel signal and the reference channel signal in the current frame.

There may be various smoothing manners, for example, $$tdm\_lt\_\text{corr}\_LM\_SM_{cur} = \alpha * tdm\_lt\_\text{corr}\_LM\_SM_{pre} + (1-\alpha)\text{corr}\_LM; \text{ where}$$

$tdm\_lt\_rms\_L\_SM_{cur} = (1-A)*tdm\_lt\_rms\_L\_SM_{pre} + A*rms\_L$, A indicates an update factor of long-term smoothed frame energy of the left channel signal in the current frame, $tdm\_lt\_rms\_L\_SM_{cur}$ indicates the long-term smoothed frame energy of the left channel signal in the current frame, rms_L indicates frame energy of the left channel signal in the current frame, $tdm\_lt\_corr\_LM\_SM_{cur}$ indicates the long-term smoothed amplitude correlation parameter between the left channel signal and the reference channel signal in the current frame, $tdm\_lt\_corr\_LM\_SM_{pre}$ indicates a long-term smoothed amplitude correlation parameter between a left channel signal and a reference channel signal in a previous frame, and a indicates a left channel smoothing factor.

For example, $$tdm\_lt\_\text{corr}\_RM\_SM_{cur} = \beta * tdm\_lt\_\text{corr}\_RM\_SM_{pre} + (1-\beta)\_\text{corr}\_LM; \text{ where}$$

$tdm\_lt\_rms\_R\_SM_{cur} = (1-B)*tdm\_lt\_rms\_R\_SM_{pre} + B*rms\_R$, B indicates an update factor of long-term smoothed frame energy of the right channel signal in the current frame, $tdm\_lt\_rms\_R\_SM_{pre}$ indicates the long-term smoothed frame energy of the right channel signal in the current frame, rms_R indicates frame energy of the right channel signal in the current frame, $tdm\_lt\_corr\_RM\_SM_{cur}$ indicates the long-term smoothed amplitude correlation parameter between the right channel signal and the reference channel signal in the current frame, $tdm\_lt\_corr\_RM\_SM_{pre}$ indicates a long-term smoothed amplitude correlation parameter between a right channel signal and the reference channel signal in the previous frame, and indicates a right channel smoothing factor.

In one embodiment, $$diff\_lt\_corr = tdm\_lt\_corr\_LM\_SM - tdm\_lt\_corr\_RM\_SM;\ \text{where}$$

tdm_lt_corr_LM_SM indicates the long-term smoothed amplitude correlation parameter between the left channel signal and the reference channel signal in the current frame, tdm_lt_corr_RM_SM indicates the long-term smoothed amplitude correlation parameter between the right channel signal and the reference channel signal in the current frame, and diff_lt_corr indicates the amplitude correlation difference parameter between the left and right channel signals in the current frame.

In one embodiment, the calculating, based on the amplitude correlation difference parameter between the left and right channel signals in the current frame, the channel combination ratio factor corresponding to the anticorrelated signal channel combination scheme for the current frame includes: performing mapping processing on the amplitude correlation difference parameter between the left and right channel signals in the current frame, to enable a value range of an amplitude correlation difference parameter that is between the left and right channel signals in the current frame and that has undergone the mapping processing to be [MAP_MIN,MAP_MAX]; and converting the amplitude correlation difference parameter that is between the left and right channel signals and that has undergone the mapping processing into the channel combination ratio factor.

In one embodiment, the performing mapping processing on the amplitude correlation difference parameter between the left and right channels in the current frame includes: performing amplitude limiting on the amplitude correlation difference parameter between the left and right channel signals in the current frame; and performing mapping processing on an amplitude-limited amplitude correlation difference parameter between the left and right channel signals in the current frame.

There may be various amplitude limiting manners, which are specifically, for example:

$$diff\_lt\_corr\_limit = \begin{cases} RATIO\_MAX, & \text{if } diff\_lt\_corr > RATIO\_MAX \\ diff\_lt\_corr, & \text{other} \\ RATIO\_MIN, & \text{if } diff\_lt\_corr < RATIO\_MIN \end{cases},$$

where

RATIO_MAX indicates a maximum value of the amplitude-limited amplitude correlation difference parameter between the left and right channel signals in the current frame, RATIO_MIN indicates a minimum value of the amplitude-limited amplitude correlation difference parameter between the left and right channel signals in the current frame, and RATIO_MAX>RATIO_MIN.

There may be various mapping processing manners, which are specifically, for example:

$$diff\_lt\_corr\_map = \begin{cases} A_1 * diff\_lt\_corr\_limi + B_1, & \text{if } diff\_lt\_corr\_limit > RATIO\_HIGH \\ A_2 * diff\_lt\_corr\_limi + B_2, & \text{if } diff\_lt\_corr\_limit < RATIO\_LOW \\ A_3 * diff\_lt\_corr\_limi + B_3, & \text{if } RATIO\_LOW \le diff\_lt\_corr\_limit \le RATIO\_HIGH \end{cases};\ \text{where}$$

-continued $$A_1 = \frac{MAP\_MAX - MAP\_HIGH}{RATIO\_MAX - RATIO\_HIGH};$$

$$B_1 = MAP\_MAX - RATIO\_MAX * A_1 \text{ or } B_1 = MAP\_HIGH - RATIO\_HIGH * A_1;$$

$$A_2 = \frac{MAP\_LOW - MAP\_MIN}{RATIO\_LOW - RATIO\_MIN};$$

$$B_2 = MAP\_LOW - RATIO\_LOW * A_2 \text{ or } B_2 = MAP\_MIN - RATIO\_MIN * A_2;$$

$$A_3 = \frac{MAP\_HIGH - MAP\_LOW}{RATIO\_HIGH - RATIO\_LOW};$$

$$B_3 = MAP\_HIGH - RATIO\_HIGH * A_3 \text{ or } B_3 = MAP\_LOW - RATIO\_LOW * A_3;$$

diff_lt_corr_map indicates the amplitude correlation difference parameter that is between the left and right channel signals in the current frame and that has undergone the mapping processing;

MAP_MAX indicates a maximum value of the amplitude correlation difference parameter that is between the left and right channel signals in the current frame and that has undergone the mapping processing, MAP_HIGH indicates a high threshold of the amplitude correlation difference parameter that is between the left and right channel signals in the current frame and that has undergone the mapping processing, MAP_LOW indicates a low threshold of the amplitude correlation difference parameter that is between the left and right channel signals in the current frame and that has undergone the mapping processing, and MAP_MIN indicates a minimum value of the amplitude correlation difference parameter that is between the left and right channel signals in the current frame and that has undergone the mapping processing;

$$MAP\_MAX > MAP\_HIGH > MAP\_LOW > MAP\_MIN;$$

RATIO_MAX indicates the maximum value of the amplitude-limited amplitude correlation difference parameter between the left and right channel signals in the current frame, RATIO_HIGH indicates the high threshold of the amplitude-limited amplitude correlation difference parameter that is between the left and right channel signals in the current frame, RATIO_LOW indicates the low threshold of the amplitude-limited amplitude correlation difference parameter that is between the left and right channel signals in the current frame, and RATIO_MIN indicates the minimum value of the amplitude-limited amplitude correlation difference parameter that is between the left and right channel signals in the current frame; and $$RATIO\_MAX > RATIO\_HIGH > RATIO\_LOW > RATIO\_MIN.$$

For another example, $$diff\_lt\_corr\_map = \begin{cases} 1.08 * diff\_lt\_corr\_limi + 0.38, & \text{if } diff\_lt\_corr\_limit > 0.5 * RATIO\_MAX \\ 0.64 * diff\_lt\_corr\_limi + 1.28, & \text{if } diff\_lt\_corr\_limit < -0.5 * RATIO\_MAX \\ 0.26 * diff\_lt\_corr\_limi + 0.995, & \text{other} \end{cases};$$

where diff_lt_corr_limit indicates the amplitude-limited amplitude correlation difference parameter between the left and right channel signals in the current frame, and diff_lt_corr_map indicates the amplitude correlation difference parameter that is between the left and right channel signals in the current frame and that has undergone the mapping processing;

$$\text{diff\_lt\_corr\_limit} = \begin{cases} \text{RATIO\_MAX}, & \text{if diff\_lt\_corr} > \text{RATIO\_MAX} \\ \text{diff\_lt\_corr}, & \text{other} \\ -\text{RATIO\_MAX}, & \text{if diff\_lt\_corr} < -\text{RATIO\_MAX} \end{cases};$$

and

RATIO_MAX indicates a maximum amplitude of the amplitude correlation difference parameter between the left and right channel signals in the current frame, and −RATIO_MAX indicates a minimum amplitude of the amplitude correlation difference parameter between the left and right channel signals in the current frame.

In one embodiment, $$\text{ratio\_SM} = \frac{1 - \cos\left(\frac{\pi}{2} * \text{diff\_lt\_corr\_map}\right)}{2},$$

where diff_lt_corr_map indicates the amplitude correlation difference parameter that is between the left and right channel signals in the current frame and that has undergone the mapping processing; and ratio_SM indicates the channel combination ratio factor corresponding to the anticorrelated signal channel combination scheme for the current frame, or ratio_SM indicates the initial value of the channel combination ratio factor corresponding to the anticorrelated signal channel combination scheme for the current frame.

In one embodiment, in a scenario in which a channel combination ratio factor needs to be modified, modification may be performed before or after the channel combination ratio factor is encoded. Specifically, for example, the initial value of the channel combination ratio factor (for example, the channel combination ratio factor corresponding to the anticorrelated signal channel combination scheme or the channel combination ratio factor corresponding to the correlated signal channel combination scheme) for the current frame may be obtained through calculation first, then the initial value of the channel combination ratio factor is encoded, to obtain an initial encoded index of the channel combination ratio factor of the current frame, and the obtained initial encoded index of the channel combination ratio factor of the current frame is modified, to obtain the encoded index of the channel combination ratio factor of the current frame (obtaining the encoded index of the channel combination ratio factor of the current frame is equivalent to obtaining the channel combination ratio factor of the current frame). Alternatively, the initial value of the channel combination ratio factor of the current frame may be obtained through calculation first, then the initial value of the channel combination ratio factor of the current frame that is obtained through calculation is modified, to obtain the channel combination ratio factor of the current frame, and the obtained channel combination ratio factor of the current frame is encoded, to obtain the encoded index of the channel combination ratio factor of the current frame.

There are various manners of modifying the initial value of the channel combination ratio factor corresponding to the anticorrelated signal channel combination scheme for the current frame. For example, when the initial value of the channel combination ratio factor corresponding to the anticorrelated signal channel combination scheme for the current frame needs to be modified to obtain the channel combination ratio factor corresponding to the anticorrelated signal channel combination scheme for the current frame, the initial value of the channel combination ratio factor corresponding to the anticorrelated signal channel combination scheme for the current frame may be modified based on a channel combination ratio factor of the previous frame and the initial value of the channel combination ratio factor corresponding to the anticorrelated signal channel combination scheme for the current frame; or the initial value of the channel combination ratio factor corresponding to the anticorrelated signal channel combination scheme for the current frame may be modified based on the initial value of the channel combination ratio factor corresponding to the anticorrelated signal channel combination scheme for the current frame.

For example, first, whether the initial value of the channel combination ratio factor corresponding to the anticorrelated signal channel combination scheme for the current frame needs to be modified is determined based on the long-term smoothed frame energy of the left channel signal in the current frame, the long-term smoothed frame energy of the right channel signal in the current frame, an inter-frame energy difference of the left channel signal in the current frame, a buffered encoding parameter of the previous frame in a history buffer (for example, an inter-frame correlation of a primary channel signal and an inter-frame correlation of a secondary channel signal), channel combination scheme flags of the current frame and the previous frame, a channel combination ratio factor corresponding to an anticorrelated signal channel combination scheme for the previous frame, and the initial value of the channel combination ratio factor corresponding to the anticorrelated signal channel combination scheme for the current frame. If yes, the channel combination ratio factor corresponding to the anticorrelated signal channel combination scheme for the previous frame is used as the channel combination ratio factor corresponding to the anticorrelated signal channel combination scheme for the current frame; otherwise, the initial value of the channel combination ratio factor corresponding to the anticorrelated signal channel combination scheme for the current frame is used as the channel combination ratio factor corresponding to the anticorrelated signal channel combination scheme for the current frame.

Certainly, a specific implementation of modifying the initial value of the channel combination ratio factor corresponding to the anticorrelated signal channel combination scheme for the current frame to obtain the channel combination ratio factor corresponding to the anticorrelated signal channel combination scheme for the current frame is not limited to the foregoing examples.

803. Encode the determined time-domain stereo parameter of the current frame.

In one embodiment, quantization encoding is performed on the determined channel combination ratio factor corresponding to the anticorrelated signal channel combination scheme for the current frame, and $$\text{ratio\_init\_}SM_{qua}=\text{ratio\_tabl\_}SM[\text{ratio\_}idx\text{\_init\_}SM];$$

where ratio_tabl_SM indicates a codebook for performing scalar quantization on the channel combination ratio factor corresponding to the anticorrelated signal channel combination scheme for the current frame; ratio_idx_init_SM indicates an initial encoded index of the channel combination ratio factor corresponding to the anticorrelated signal channel combination scheme for the current frame; and $ratio\_init\_SM_{qua}$ indicates a quantization-encoded initial value of the channel combination ratio factor corresponding to the anticorrelated signal channel combination scheme for the current frame.

In one embodiment, $$ratio\_idx\_SM = ratio\_idx\_SM, \text{ and}$$

$$ratio\_SM = ratio\_tabl[ratio\_idx\_SM], \text{ where}$$

ratio_SM indicates the channel combination ratio factor corresponding to the anticorrelated signal channel combination scheme for the current frame, and ratio_idx_SM indicates an encoded index of the channel combination ratio factor corresponding to the anticorrelated signal channel combination scheme for the current frame; or $$ratio\_idx\_SM = \phi * ratio\_idx\_init\_SM + (1-\phi) * tdm\_last\_ratio\_idx\_SM, \text{ and}$$

$$ratio\_SM = ratio\_tabl[ratio\_idx\_SM], \text{ where}$$

ratio_idx_init_SM indicates the initial encoded index corresponding to the anticorrelated signal channel combination scheme for the current frame; tdm_last_ratio_idx_SM indicates a final encoded index of the channel combination ratio factor corresponding to the anticorrelated signal channel combination scheme for the previous frame; $\phi$ is a modification factor of the channel combination ratio factor corresponding to the anticorrelated signal channel combination scheme; and ratio_SM indicates the channel combination ratio factor corresponding to the anticorrelated signal channel combination scheme for the current frame.

In one embodiment, when the initial value of the channel combination ratio factor corresponding to the anticorrelated signal channel combination scheme for the current frame needs to be modified to obtain the channel combination ratio factor corresponding to the anticorrelated signal channel combination scheme for the current frame, quantization encoding may be first performed on the initial value of the channel combination ratio factor corresponding to the anticorrelated signal channel combination scheme for the current frame, to obtain the initial encoded index of the channel combination ratio factor corresponding to the anticorrelated signal channel combination scheme for the current frame; and then the initial encoded index of the channel combination ratio factor corresponding to the anticorrelated signal channel combination scheme for the current frame may be modified based on an encoded index of a channel combination ratio factor of the previous frame and the initial encoded index of the channel combination ratio factor corresponding to the anticorrelated signal channel combination scheme for the current frame; or the initial encoded index of the channel combination ratio factor corresponding to the anticorrelated signal channel combination scheme for the current frame may be modified based on the initial encoded index of the channel combination ratio factor corresponding to the anticorrelated signal channel combination scheme for the current frame.

For example, quantization encoding may be first performed on the initial value of the channel combination ratio factor corresponding to the anticorrelated signal channel combination scheme for the current frame, to obtain the initial encoded index corresponding to the anticorrelated signal channel combination scheme for the current frame. Then, when the initial value of the channel combination ratio factor corresponding to the anticorrelated signal channel combination scheme for the current frame needs to be modified, the encoded index of the channel combination ratio factor corresponding to the anticorrelated signal channel combination scheme for the previous frame is used as the encoded index of the channel combination ratio factor corresponding to the anticorrelated signal channel combination scheme for the current frame; otherwise, the initial encoded index of the channel combination ratio factor corresponding to the anticorrelated signal channel combination scheme for the current frame is used as the encoded index of the channel combination ratio factor corresponding to the anticorrelated signal channel combination scheme for the current frame. Finally, a quantization-encoded value corresponding to the encoded index of the channel combination ratio factor corresponding to the anticorrelated signal channel combination scheme for the current frame is used as the channel combination ratio factor corresponding to the anticorrelated signal channel combination scheme for the current frame.

In addition, when the time-domain stereo parameter includes an inter-channel time difference, the determining a time-domain stereo parameter of the current frame based on the channel combination scheme for the current frame may include: calculating the inter-channel time difference of the current frame when the channel combination scheme for the current frame is the correlated signal channel combination scheme. In addition, the inter-channel time difference of the current frame that is obtained through calculation may be written into a bitstream. A default inter-channel time difference (for example, 0) is used as the inter-channel time difference of the current frame when the channel combination scheme for the current frame is the anticorrelated signal channel combination scheme. In addition, the default inter-channel time difference may not be written into the bitstream, and a decoding apparatus also uses the default inter-channel time difference.

The following further provides a time-domain stereo parameter encoding method by using an example. The method may include, for example: determining a channel combination scheme for a current frame; determining a time-domain stereo parameter of the current frame based on the channel combination scheme for the current frame; and encoding the determined time-domain stereo parameter of the current frame, where the time-domain stereo parameter includes at least one of a channel combination ratio factor and an inter-channel time difference.

Correspondingly, a decoding apparatus may obtain the time-domain stereo parameter of the current frame from a bitstream, and further perform related decoding based on the time-domain stereo parameter of the current frame that is obtained from the bitstream.

The following provides descriptions by using examples with reference to a more specific application scenario.

FIG. 9-A is a schematic flowchart of an audio encoding method according to an embodiment of this application. The audio encoding method provided in this embodiment of this application may be implemented by an encoding apparatus, and the method may specifically include the following operations.

901. Perform time-domain pre-processing on original left and right channel signals in a current frame.

For example, if a sampling rate of a stereo audio signal is 16 KHz, one frame of signals is 20 ms, a frame length is denoted as N, and when N=320, it indicates that the frame length is 320 sampling points. A stereo signal in the current frame includes a left channel signal in the current frame and a right channel signal in the current frame. The original left channel signal in the current frame is denoted as $x_L(n)$, the original right channel signal in the current frame is denoted as $x_R(n)$, n is a sampling point number, and n=0, 1, . . . , N−1.

In one embodiment, the performing time-domain pre-processing on original left and right channel signals in a current frame may include: performing high-pass filtering processing on the original left and right channel signals in the current frame to obtain left and right channel signals that have undergone time-domain pre-processing in the current frame, where the left channel signal that has undergone time-domain pre-processing in the current frame is denoted as $x_{L\_HP}(n)$, and the right channel signal that has undergone time-domain pre-processing in the current frame is denoted as $x_{R\_HP}(n)$. Herein, n is a sampling point number, and n=0, 1, . . . , N−1. A filter used in the high-pass filtering processing may be, for example, an infinite impulse response (IIR) filter whose cut-off frequency is 20 Hz, or may be another type of filter.

In one embodiment, a transfer function of a high-pass filter whose sampling rate is 16 KHz and that corresponds to a cut-off frequency of 20 Hz may be:

$$H_{20\,Hz}(z)=\frac{b_0+b_1z^{-1}+b_2z^{-2}}{1+a_1z^{-1}+a_2z^{-2}};$$

where $b_0$=0.994461788958195, $b_1$=−1.988923577916390, $b_2$=0.994461788958195, $a_1$=1.988892905899653, $a_2$=−0.988954249933127, and z is a transform factor of Z transform.

A transfer function of a corresponding time-domain filter may be expressed as:

$$x_{L\_HP}(n)=b_0*x_L(n)+b_1*x_L(n-1)+b_2*x_L(n-2)-a_1*x_{L\_HP}(n-1)-a_2*x_{L\_HP}(n-2),\text{ and}$$

$$x_{R\_HP}(n)=b_0*x_R(n)+b_1*x_R(n-1)+b_2*x_R(n-2)-a_1*x_{R\_HP}(n-1)-a_2*x_{R\_HP}(n-2).$$

902. Perform delay alignment processing on the left and right channel signals that have undergone time-domain pre-processing in the current frame, to obtain left and right channel signals that have undergone delay alignment processing in the current frame.

A signal that has undergone delay alignment processing may be briefly referred to as a "delay-aligned signal". For example, the left channel signal that has undergone delay alignment processing may be briefly referred to as a "delay-aligned left channel signal", the right channel signal that has undergone delay alignment processing may be briefly referred to as a "delay-aligned right channel signal", and so on.

In one embodiment, an inter-channel delay parameter may be extracted based on the pre-processed left and right channel signals in the current frame and then encoded, and delay alignment processing is performed on the left and right channel signals based on the encoded inter-channel delay parameter, to obtain the left and right channel signals that have undergone delay alignment processing in the current frame. The left channel signal that has undergone delay alignment processing in the current frame is denoted as $\hat{x}_L'(n)$, and the right channel signal that has undergone delay alignment processing in the current frame is denoted as $\hat{x}_R'(n)$, where n is a sampling point number, and n=0, 1, . . . , N−1.

In one embodiment, for example, the encoding apparatus may calculate a time-domain cross-correlation function of the left and right channels based on the pre-processed left and right channel signals in the current frame; search for a maximum value (or another value) of the time-domain cross-correlation function of the left and right channels, to determine a time difference between the left and right channel signals; perform quantization encoding on the determined time difference between the left and right channels; and use a signal of one channel selected from the left and right channels as a reference, and perform delay adjustment for a signal of the other channel based on the quantization-encoded time difference between the left and right channels, to obtain the left and right channel signals that have undergone delay alignment processing in the current frame.

It should be noted that there are many specific implementation methods of delay alignment processing, and a specific delay alignment processing method is not limited in this embodiment.

903. Perform time-domain analysis for the left and right channel signals that have undergone delay alignment processing in the current frame.

In one embodiment, the time-domain analysis may include transient detection and the like. The transient detection may be energy detection performed on the left and right channel signals that have undergone delay alignment processing in the current frame (specifically, it may be detected whether the current frame has a sudden energy change). For example, energy of the left channel signal that has undergone delay alignment processing in the current frame is expressed as $E_{cur\_L}$, and energy of a left channel signal that has undergone delay alignment in a previous frame is expressed as $E_{pre\_L}$. In this case, transient detection may be performed based on an absolute value of a difference between $E_{pre\_L}$ and $E_{cur\_L}$, to obtain a transient detection result of the left channel signal that has undergone delay alignment processing in the current frame. Likewise, transient detection may be performed, by using the same method, on the right channel signal that has undergone delay alignment processing in the current frame. The time-domain analysis may further include time-domain analysis in another conventional manner other than transient detection, for example, may include frequency band expansion pre-processing.

It may be understood that operation 903 may be performed at any time after operation 902 and before a primary channel signal and a secondary channel signal in the current frame are encoded.

904. Perform channel combination scheme decision for the current frame based on the left and right channel signals that have undergone delay alignment processing in the current frame, to determine a channel combination scheme for the current frame.

Two possible channel combination schemes are described in this embodiment as examples, and are respectively referred to as a correlated signal channel combination scheme and an anticorrelated signal channel combination scheme in the following description. In this embodiment, the correlated signal channel combination scheme corresponds to a case in which the left and right channel signals in the current frame (obtained after delay alignment) are a near in phase signal, and the anticorrelated signal channel combination scheme corresponds to a case in which the left and right channel signals in the current frame (obtained after delay alignment) are a near out of phase signal. Certainly, in addition to the "correlated signal channel combination scheme" and the "anticorrelated signal channel combination scheme", other names may also be used to represent the two possible channel combination schemes in actual application.

In some solutions of this embodiment, channel combination scheme decision may be classified into initial channel combination scheme decision and channel combination scheme modification decision. It can be understood that channel combination scheme decision is performed for the current frame to determine the channel combination scheme for the current frame. For some examples of implementations of determining the channel combination scheme for the current frame, refer to related description in the foregoing embodiment. Details are not described herein again.

905. Calculate and encode a channel combination ratio factor corresponding to the correlated signal channel combination scheme for the current frame based on the left and right channel signals that have undergone delay alignment processing in the current frame and a channel combination scheme flag of the current frame, to obtain an initial value of the channel combination ratio factor corresponding to the correlated signal channel combination scheme for the current frame and an encoded index of the initial value.

In one embodiment, for example, frame energy of the left and right channel signals in the current frame is calculated first based on the left and right channel signals that have undergone delay alignment processing in the current frame, where the frame energy rms_L of the left channel signal in the current frame meets:

$$\text{rms\_L} = \frac{1}{N}\sum_{n=0}^{N-1} x_L'(n) * x_L'(n);$$

and the frame energy rms_R of the right channel signal in the current frame meets:

$$\text{rms\_R} = \frac{1}{N}\sum_{n=0}^{N-1} x_R'(n) * x_R'(n);$$

where $\hat{x}_L'(n)$ indicates the left channel signal that has undergone delay alignment processing in the current frame, and $\hat{x}_R'(n)$ indicates the right channel signal that has undergone delay alignment processing in the current frame.

Then, the channel combination ratio factor corresponding to the correlated signal channel combination scheme for the current frame is calculated based on the frame energy of the left channel and the frame energy of the right channel in the current frame. The channel combination ratio factor ratio_init corresponding to the correlated signal channel combination scheme for the current frame that is obtained through calculation meets:

$$\text{ratio\_init} = \frac{\text{rms\_R}}{\text{rms\_L} + \text{rms\_R}}$$

Then, quantization encoding is performed on the channel combination ratio factor ratio_init corresponding to the correlated signal channel combination scheme for the current frame that is obtained through calculation, to obtain a corresponding encoded index ratio_idx_init and a quantization-encoded channel combination ratio factor $\text{ratio\_init}_{qua}$ corresponding to the correlated signal channel combination scheme for the current frame:

$$\text{ratio\_init}_{qua} = \text{ratio\_}tab[\text{ratio\_}idx\text{\_init}]$$

Herein, ratio_tabl is a codebook for scalar quantization. Quantization encoding may be performed by using any conventional scalar quantization method, for example, uniform scalar quantization or non-uniform scalar quantization. A quantity of bits used for encoding is, for example, 5 bits. A specific scalar quantization method is not described herein again.

The quantization-encoded channel combination ratio factor $\text{ratio\_init}_{qua}$ corresponding to the correlated signal channel combination scheme for the current frame is the obtained initial value of the channel combination ratio factor corresponding to the correlated signal channel combination scheme for the current frame, and the encoded index ratio_idx_init is the encoded index corresponding to the initial value of the channel combination ratio factor corresponding to the correlated signal channel combination scheme for the current frame.

In addition, the encoded index corresponding to the initial value of the channel combination ratio factor corresponding to the correlated signal channel combination scheme for the current frame may be further modified based on a value of the channel combination scheme flag tdm_SM_flag of the current frame.

For example, quantization encoding is 5-bit scalar quantization. When tdm_SM_flag=1, the encoded index ratio_idx_init corresponding to the initial value of the channel combination ratio factor corresponding to the correlated signal channel combination scheme for the current frame is modified to a preset value (for example, 15 or another value); and the initial value of the channel combination ratio factor corresponding to the correlated signal channel combination scheme for the current frame may be modified to $\text{ratio\_init}_{qua}=\text{ratio\_tabl}[15]$.

It should be noted that, in addition to the foregoing calculation method, any method for calculating a channel combination ratio factor corresponding to a channel combination scheme in the conventional time-domain stereo encoding technology may be used to calculate the channel combination ratio factor corresponding to the correlated signal channel combination scheme for the current frame. Alternatively, the initial value of the channel combination ratio factor corresponding to the correlated signal channel combination scheme for the current frame may be directly set to a fixed value (for example, 0.5 or another value).

906. Determine, based on a channel combination ratio factor modification flag, whether the channel combination ratio factor needs to be modified.

If yes, the channel combination ratio factor corresponding to the correlated signal channel combination scheme for the current frame and the encoded index of the channel combination ratio factor are modified, to obtain a modified value of the channel combination ratio factor corresponding to the correlated signal channel combination scheme for the current frame and an encoded index of the modified value.

The channel combination ratio factor modification flag of the current frame is denoted as tdm_SM_modi_flag. For example, when a value of the channel combination ratio factor modification flag is 0, it indicates that the channel combination ratio factor does not need to be modified; or when the value of the channel combination ratio factor modification flag is 1, it indicates that the channel combination ratio factor needs to be modified. Certainly, other different values may be used as the channel combination ratio factor modification flag to indicate whether the channel combination ratio factor needs to be modified.

For example, the determining, based on a channel combination ratio factor modification flag, whether the channel combination ratio factor needs to be modified may specifically include: For example, if the channel combination ratio factor modification flag tdm_SM_modi_flag=1, it is determined that the channel combination ratio factor needs to be modified. For another example, if the channel combination ratio factor modification flag tdm_SM_modi_flag=0, it is determined that the channel combination ratio factor does not need to be modified.

The modifying the channel combination ratio factor corresponding to the correlated signal channel combination scheme for the current frame and the encoded index of the channel combination ratio factor may specifically include:

for example, the encoded index corresponding to the modified value of the channel combination ratio factor corresponding to the correlated signal channel combination scheme for the current frame meets: ratio_idx_mod=0.5*(tdm_last_ratio_idx+16), where tdm_last_ratio_idx is an encoded index of a channel combination ratio factor corresponding to a correlated signal channel combination scheme for the previous frame.

The modified value $ratio\_mod_{qua}$ of the channel combination ratio factor corresponding to the correlated signal channel combination scheme for the current frame meets: $ratio\_mod_{qua}$=ratio_tabl[ratio_idx_mod].

907. Determine the channel combination ratio factor ratio corresponding to the correlated signal channel combination scheme for the current frame and the encoded index ratio_idx based on the initial value of the channel combination ratio factor corresponding to the correlated signal channel combination scheme for the current frame and the encoded index of the initial value, the modified value of the channel combination ratio factor corresponding to the correlated signal channel combination scheme for the current frame and the encoded index of the modified value, and the channel combination ratio factor modification flag.

In one embodiment, for example, the determined channel combination ratio factor ratio corresponding to the correlated signal channel combination scheme meets:

$$ratio = \begin{cases} ratio\_init_{qua}, & \text{if } tdm\_SM\_modi\_flag = 0 \\ ratio\_mod_{qua}, & \text{if } tdm\_SM\_modi\_flag = 1 \end{cases},$$

where $ratio\_init_{qua}$ indicates the initial value of the channel combination ratio factor corresponding to the correlated signal channel combination scheme for the current frame; $ratio\_mod_{qua}$ indicates the modified value of the channel combination ratio factor corresponding to the correlated signal channel combination scheme for the current frame; and tdm_SM_modi_flag indicates the channel combination ratio factor modification flag of the current frame.

The determined encoded index ratio_idx corresponding to the channel combination ratio factor corresponding to the correlated signal channel combination scheme meets:

$$ratio\_idx = \begin{cases} ratio\_idx\_init, & \text{if } tdm\_SM\_modi\_flag = 0 \\ ratio\_idx\_mod, & \text{if } tdm\_SM\_modi\_flag = 1 \end{cases},$$

where ratio_idx_init indicates the encoded index corresponding to the initial value of the channel combination ratio factor corresponding to the correlated signal channel combination scheme for the current frame, and ratio_idx_mod indicates the encoded index corresponding to the modified value of the channel combination ratio factor corresponding to the correlated signal channel combination scheme for the current frame.

908. Determine whether the channel combination scheme flag of the current frame corresponds to the anticorrelated signal channel combination scheme, and if yes, calculate and encode a channel combination ratio factor corresponding to the anticorrelated signal channel combination scheme for the current frame, to obtain the channel combination ratio factor corresponding to the anticorrelated signal channel combination scheme and an encoded index.

First, it may be determined whether a history buffer used for calculating the channel combination ratio factor corresponding to the anticorrelated signal channel combination scheme for the current frame needs to be reset.

For example, if the channel combination scheme flag tdm_SM_flag of the current frame is equal to 1 (for example, that tdm_SM_flag is equal to 1 indicates that the channel combination scheme flag of the current frame corresponds to the anticorrelated signal channel combination scheme), and a channel combination scheme flag tdm_last_SM_flag of the previous frame is equal to 0 (for example, that tdm_last_SM_flag is equal to 0 indicates that the channel combination scheme flag of the previous frame corresponds to the correlated signal channel combination scheme), it indicates that the history buffer used for calculating the channel combination ratio factor corresponding to the anticorrelated signal channel combination scheme for the current frame needs to be reset.

It should be noted that, a history buffer reset flag tdm_SM_reset_flag may be determined in processes of initial channel combination scheme decision and channel combination scheme modification decision, and then a value of the history buffer reset flag is determined, so as to determine whether the history buffer used for calculating the channel combination ratio factor corresponding to the anticorrelated signal channel combination scheme for the current frame needs to be reset. For example, when tdm_SM_reset_flag is 1, it indicates that the channel combination scheme flag of the current frame corresponds to the anticorrelated signal channel combination scheme, and the channel combination scheme flag of the previous frame corresponds to the correlated signal channel combination scheme. For example, when the history buffer reset flag tdm_SM_reset_flag is equal to 1, it indicates that the history buffer used for calculating the channel combination ratio factor corresponding to the anticorrelated signal channel combination scheme for the current frame needs to be reset. There are many specific resetting methods. All parameters in the history buffer used for calculating the channel combination ratio factor corresponding to the anticorrelated signal channel combination scheme for the current frame may be reset based on preset initial values. Alternatively, some parameters in the history buffer used for calculating the channel combination ratio factor corresponding to the anticorrelated signal channel combination scheme for the current frame may be reset based on preset initial values. Alternatively, some parameters in the history buffer used for calculating the channel combination ratio factor corresponding to the anticorrelated signal channel combination scheme for the current frame may be reset based on preset initial values, and the other parameters are reset based on corresponding parameters in a history buffer used for calculating the channel combination ratio factor corresponding to the correlated signal channel combination scheme for the current frame.

Then, it is further determined whether the channel combination scheme flag tdm_SM_flag of the current frame corresponds to the anticorrelated signal channel combination scheme. The anticorrelated signal channel combination scheme is a channel combination scheme that is more suitable for performing time-domain downmixing on a near out of phase stereo signal. In this embodiment, when the channel combination scheme flag of the current frame tdm_SM_flag=1, it indicates that the channel combination scheme flag of the current frame corresponds to the anticorrelated signal channel combination scheme. When the channel combination scheme flag of the current frame tdm_SM_flag=0, it indicates that the channel combination scheme flag of the current frame corresponds to the correlated signal channel combination scheme.

The determining whether the channel combination scheme flag of the current frame corresponds to the anticorrelated signal channel combination scheme may specifically include:

determining whether a value of the channel combination scheme flag of the current frame is 1; and if the channel combination scheme flag of the current frame tdm_SM_flag=1, it indicates that the channel combination scheme flag of the current frame corresponds to the anticorrelated signal channel combination scheme, where in this case, the channel combination ratio factor corresponding to the anticorrelated signal channel combination scheme for the current frame may be calculated and encoded.

Referring to FIG. 9-B, the calculating and encoding the channel combination ratio factor corresponding to the anticorrelated signal channel combination scheme for the current frame may include, for example, the following operations 9081 to 9085.

9081. Perform signal energy analysis for the left and right channel signals that have undergone delay alignment processing in the current frame.

The frame energy of the left channel signal in the current frame, the frame energy of the right channel signal in the current frame, long-term smoothed frame energy of the left channel in the current frame, long-term smoothed frame energy of the right channel in the current frame, an inter-frame energy difference of the left channel in the current frame, and an inter-frame energy difference of the right channel in the current frame are separately obtained.

In one embodiment, the frame energy rms_L of the left channel signal in the current frame meets:

$$\text{rms\_L} = \frac{1}{N}\sum_{n=0}^{N-1} x'_L(n) * x'_L(n);$$

and the frame energy rms_R of the right channel signal in the current frame meets:

$$\text{rms\_R} = \frac{1}{N}\sum_{n=0}^{N-1} x'_R(n) * x'_R(n);$$

where $\hat{x}_L'(n)$ indicates the left channel signal that has undergone delay alignment processing in the current frame, and $\hat{x}_R'(n)$ indicates the right channel signal that has undergone delay alignment processing in the current frame.

In one embodiment, the long-term smoothed frame energy $tdm\_lt\_rms\_L\_SM_{cur}$ of the left channel in the current frame meets:

$$tdm\_lt\_rms\_L\_SM_{cur}=(1-A)*tdm\_lt\_rms\_L\_SM_{pre}+A*rms\_L, \text{ where}$$

$tdm\_lt\_rms\_L\_SM_{pre}$ indicates long-term smoothed frame energy of a left channel in the previous frame, A indicates an update factor of the long-term smoothed frame energy of the left channel, A may be, for example, a real number from 0 to 1, and A may be, for example, equal to 0.4.

In one embodiment, the long-term smoothed frame energy $tdm\_lt\_rms\_R\_SM_{cur}$ of the right channel in the current frame meets:

$$tdm\_lt\_rms\_R\_SM_{cur}=(1-B)*tdm\_lt\_rms\_R\_SM_{pre}+B*rms\_R, \text{ where}$$

$tdm\_lt\_rms\_R\_SM_{pre}$ indicates long-term smoothed frame energy of a right channel in the previous frame, B indicates an update factor of the long-term smoothed frame energy of the right channel, B may be, for example, a real number from 0 to 1, and B may be, for example, the same as or different from the update factor of the long-term smoothed frame energy of the left channel; for example, B may also be equal to 0.4.

In one embodiment, the inter-frame energy difference ener_L_dt of the left channel in the current frame meets:

$$ener\_L\_dt=tdm\_lt\_rms\_L\_SM_{cur}-tdm\_lt\_rms\_L\_SM_{pre}$$

For example, the inter-frame energy difference ener_R_dt of the right channel in the current frame meets:

$$ener\_R\_dt=tdm\_lt\_rms\_R\_SM_{cur}-tdm\_lt\_rms\_R\_SM_{pre}$$

9082. Determine a reference channel signal in the current frame based on the left and right channel signals that have undergone delay alignment processing in the current frame. The reference channel signal may also be referred to as a mono signal. If the reference channel signal is referred to as the mono signal, for all descriptions and parameter names related to the reference channel, the reference channel signal may be replaced with the mono signal.

In one embodiment, the reference channel signal mono_i (n) meets:

$$\text{mono\_i}(n) = \frac{x'_L(n) - x'_R(n)}{2},$$

where $\hat{x}_L'(n)$ is the left channel signal that has undergone delay alignment processing in the current frame, and $\hat{x}_R'(n)$ is the right channel signal that has undergone delay alignment processing in the current frame.

9083. Separately calculate an amplitude correlation parameter between the left channel signal that has undergone delay alignment processing and the reference channel signal in the current frame and an amplitude correlation parameter between the right channel signal that has undergone delay alignment processing and the reference channel signal in the current frame.

For example, the amplitude correlation parameter corr_LM between the left channel signal that has undergone delay alignment processing and the reference channel signal in the current frame meets, for example:

$$\text{corr\_LM} = \frac{\sum_{n=0}^{N-1} |x_L'(n)| * |\text{mono\_i}(n)|}{\sum_{n=0}^{N-1} |\text{mono\_i}(n)| * |\text{mono\_i}(n)|}$$

In one embodiment, the amplitude correlation parameter corr_RM between the right channel signal that has undergone delay alignment processing and the reference channel signal in the current frame meets, for example:

$$\text{corr\_RM} = \frac{\sum_{n=0}^{N-1} |x_R'(n)| * |\text{mono\_i}(n)|}{\sum_{n=0}^{N-1} |\text{mono\_i}(n)| * |\text{mono\_i}(n)|}$$

Herein, $\hat{x}_L'(n)$ indicates the left channel signal that has undergone delay alignment processing in the current frame, $\hat{x}_R'(n)$ indicates the right channel signal that has undergone delay alignment processing in the current frame, mono_i(n) indicates the reference channel signal in the current frame, and |•| indicates adopting an absolute value.

9084. Calculate an amplitude correlation difference parameter diff_lt_corr between the left and right channels in the current frame based on the amplitude correlation parameter between the left channel signal that has undergone delay alignment processing and the reference channel signal in the current frame and the amplitude correlation parameter between the right channel signal that has undergone delay alignment processing and the reference channel signal in the current frame.

It may be understood that operation 9081 may be performed before operation 9082 and operation 9083, or may be performed after operation 9082 and operation 9083 and before operation 9084.

Referring to FIG. 9-C, for example, the calculating the amplitude correlation difference parameter diff_lt_corr between the left and right channels in the current frame may specifically include the following operations 90841 and 90842.

90841. Calculate a long-term smoothed amplitude correlation parameter between the left channel signal and the reference channel signal in the current frame and a long-term smoothed amplitude correlation parameter between the right channel signal and the reference channel signal in the current frame based on the amplitude correlation parameter between the left channel signal that has undergone delay alignment processing and the reference channel signal in the current frame and the amplitude correlation parameter between the right channel signal that has undergone delay alignment processing and the reference channel signal in the current frame.

In one embodiment, a method for calculating the long-term smoothed amplitude correlation parameter between the left channel signal and the reference channel signal in the current frame and the long-term smoothed amplitude correlation parameter between the right channel signal and the reference channel signal in the current frame may include: The long-term smoothed amplitude correlation parameter tdm_lt_corr_LM_SM between the left channel signal and the reference channel signal in the current frame meets:

$$tdm\_lt\_\text{corr}\_LM\_SM_{cur}=\alpha * tdm\_lt\_\text{corr}\_LM\_SM_{pre}+(1-\alpha)\text{corr}\_LM.$$

Herein, $\text{tdm\_lt\_corr\_LM\_SM}_{cur}$ indicates the long-term smoothed amplitude correlation parameter between the left channel signal and the reference channel signal in the current frame, $\text{tdm\_lt\_corr\_LM\_SM}_{pre}$ indicates a long-term smoothed amplitude correlation parameter between a left channel signal and α reference channel signal in the previous frame, α indicates a left channel smoothing factor, and α may be a preset real number from 0 to 1, for example, 0.2, 0.5, or 0.8. Alternatively, a value of a may be obtained through adaptive calculation.

For example, the long-term smoothed amplitude correlation parameter tdm_lt_corr_RM_SM between the right channel signal and the reference channel signal in the current frame meets:

$$tdm\_lt\_\text{corr}\_RM\_SM_{cur}=\beta * tdm\_lt\_\text{corr}\_RM\_SM_{pre}+(1-\beta)\text{corr}\_LM.$$

Herein, $\text{tdm\_lt\_corr\_RM\_SM}_{cur}$ indicates the long-term smoothed amplitude correlation parameter between the right channel signal and the reference channel signal in the current frame, $\text{tdm\_lt\_corr\_RM\_SM}_{pre}$ indicates a long-term smoothed amplitude correlation parameter between a right channel signal and the reference channel signal in the previous frame, β indicates a right channel smoothing factor, and β may be a preset real number from 0 to 1. β may be the same as or different from the value of the left channel smoothing factor α, and β may be equal to, for example, 0.2, 0.5, or 0.8. Alternatively, a value of β may be obtained through adaptive calculation.

Another method for calculating the long-term smoothed amplitude correlation parameter between the left channel signal and the reference channel signal in the current frame and the long-term smoothed amplitude correlation parameter between the right channel signal and the reference channel signal in the current frame may include:

first, modifying the amplitude correlation parameter corr_LM between the left channel signal that has undergone delay alignment processing and the reference channel signal in the current frame, to obtain a modified amplitude correlation parameter corr_LM_mod between the left channel signal and the reference channel signal in the current frame; and modifying the amplitude correlation parameter corr_RM between the right channel signal that has undergone delay alignment processing and the reference channel signal in the current frame, to obtain a modified amplitude correlation parameter corr_RM_mod between the right channel signal and the reference channel signal in the current frame;

then, determining a long-term smoothed amplitude correlation difference parameter diff_lt_corr_LM_tmp between the left channel signal and the reference channel signal in the current frame and a long-term smoothed amplitude correlation difference parameter diff_lt_corr_RM_tmP between the right channel signal and the reference channel signal in the current frame based on the modified amplitude correlation parameter corr_LM_mod between the left channel signal and the reference channel signal in the current frame, the modified amplitude correlation parameter corr_RM_mod between the right channel signal and the reference channel signal in the current frame, the long-term smoothed amplitude correlation parameter $tdm\_lt\_corr\_LM\_SM_{pre}$ between the left channel signal and the reference channel signal in the previous frame, and the long-term smoothed amplitude correlation parameter $tdm\_lt\_corr\_RM\_SM_{pre}$ between the right channel signal and the reference channel signal in the previous frame;

then, obtaining an initial value diff_lt_corr_SM of the amplitude correlation difference parameter between the left and right channels in the current frame based on the long-term smoothed amplitude correlation difference parameter diff_lt_corr_LM_tmp between the left channel signal and the reference channel signal in the current frame and the long-term smoothed amplitude correlation difference parameter diff_lt_corr_RM_tmP between the right channel signal and the reference channel signal in the previous frame; and determining an inter-frame variation parameter d_lt_corr of an amplitude correlation difference between the left and right channels in the current frame based on the obtained initial value diff_lt_corr_SM of the amplitude correlation difference parameter between the left and right channels in the current frame and an amplitude correlation difference parameter tdm_last_diff_lt_corr_SM between the left and right channels in the previous frame; and finally, based on the frame energy of the left channel signal in the current frame, the frame energy of the right channel signal in the current frame, the long-term smoothed frame energy of the left channel in the current frame, the long-term smoothed frame energy of the right channel in the current frame, the inter-frame energy difference of the left channel in the current frame, and the inter-frame energy difference of the right channel in the current frame that are obtained through the signal energy analysis, and the inter-frame variation parameter of the amplitude correlation difference between the left and right channels in the current frame, adaptively selecting different left channel smoothing factors and right channel smoothing factors, and calculating the long-term smoothed amplitude correlation parameter tdm_lt_corr_LM_SM between the left channel signal and the reference channel signal in the current frame and the long-term smoothed amplitude correlation parameter tdm_lt_corr_RM_SM between the right channel signal and the reference channel signal in the current frame.

In addition to the two methods given as examples above, there may be many methods for calculating the long-term smoothed amplitude correlation parameter between the left channel signal and the reference channel signal in the current frame and the long-term smoothed amplitude correlation parameter between the right channel signal and the reference channel signal in the current frame. This is not limited in this application.

90842. Calculate the amplitude correlation difference parameter diff_lt_corr between the left and right channels in the current frame based on the long-term smoothed amplitude correlation parameter between the left channel signal and the reference channel signal in the current frame and the long-term smoothed amplitude correlation parameter between the right channel signal and the reference channel signal in the current frame.

In one embodiment, the amplitude correlation difference parameter diff_lt_corr between the left and right channels in the current frame meets:

$$diff\_lt\_corr = tdm\_lt\_corr\_LM\_SM - tdm\_lt\_corr\_RM\_SM,$$ where tdm_lt_corr_LM_SM indicates the long-term smoothed amplitude correlation parameter between the left channel signal and the reference channel signal in the current frame, and tdm_lt_corr_RM_SM indicates the long-term smoothed amplitude correlation parameter between the right channel signal and the reference channel signal in the current frame.

9085. Convert the amplitude correlation difference parameter diff_lt_corr between the left and right channels in the current frame into a channel combination ratio factor and perform encoding and quantization, so as to determine the channel combination ratio factor corresponding to the anti-correlated signal channel combination scheme for the current frame and the encoded index of the channel combination ratio factor.

Referring to FIG. 9-D, a possible method for converting the amplitude correlation difference parameter between the left and right channels in the current frame into the channel combination ratio factor may specifically include operations 90851 to 90853.

90851. Perform mapping processing on the amplitude correlation difference parameter between the left and right channels, to enable a value range of an amplitude correlation difference parameter that is between the left and right channels and that has undergone the mapping processing to be [MAP_MIN,MAP_MAX].

A method for performing mapping processing on the amplitude correlation difference parameter between the left and right channels may include the following operations.

First, amplitude limiting is performed on the amplitude correlation difference parameter between the left and right channels. For example, an amplitude-limited amplitude correlation difference parameter diff_lt_corr_limit between the left and right channels meets:

$$diff\_lt\_corr\_limit = \begin{cases} RATIO\_MAX, & \text{if } diff\_lt\_corr > RATIO\_MAX \\ diff\_lt\_corr, & \text{other} \\ RATIO\_MIN, & \text{if } diff\_lt\_corr < RATIO\_MIN \end{cases}$$

Herein, RATIO_MAX indicates a maximum value of the amplitude-limited amplitude correlation difference parameter between the left and right channels, and RATIO_MIN indicates a minimum value of the amplitude-limited amplitude correlation difference parameter between the left and right channels. For example, RATIO_MAX is a preset empirical value, and RATIO_MAX may be 1.5, 3.0, or another value; and RATIO_MIN is a preset empirical value, and RATIO_MIN may be −1.5, −3.0, or another value, where RATIO_MAX>RATIO_MIN.

Then, mapping processing is performed on the amplitude-limited amplitude correlation difference parameter between the left and right channels. The amplitude correlation difference parameter diff_lt_corr_map that is between the left and right channels and that has undergone the mapping processing meets:

$$\text{diff\_lt\_corr\_map} = \begin{cases} A_1 * \text{diff\_lt\_corr\_limi} + B_1, & \text{if diff\_lt\_corr\_limit} > \text{RATIO\_HIGH} \\ A_2 * \text{diff\_lt\_corr\_limi} + B_2, & \text{if diff\_lt\_corr\_limit} < \text{RATIO\_LOW} \\ A_3 * \text{diff\_lt\_corr\_limi} + B_3, & \text{if RATIO\_LOW} \le \text{diff\_lt\_corr\_limit} \le \text{RATIO\_HIGH} \end{cases}; \text{ where}$$

$$A_1 = \frac{\text{MAP\_MAX} - \text{MAP\_HIGH}}{\text{RATIO\_MAX} - \text{RATIO\_HIGH}};$$

$$B_1 = \text{MAP\_MAX} - \text{RATIO\_MAX} * A_1 \text{ or } B_1 = \text{MAP\_HIGH} - \text{RATIO\_HIGH} * A_1;$$

$$A_2 = \frac{\text{MAP\_LOW} - \text{MAP\_MIN}}{\text{RATIO\_LOW} - \text{RATIO\_MIN}};$$

$$B_2 = \text{MAP\_LOW} - \text{RATIO\_LOW} * A_2 \text{ or } B_2 = \text{MAP\_MIN} - \text{RATIO\_MIN} * A_2;$$

$$A_3 = \frac{\text{MAP\_HIGH} - \text{MAP\_LOW}}{\text{RATIO\_HIGH} - \text{RATIO\_LOW}}; \text{ and}$$

$$B_3 = \text{MAP\_HIGH} - \text{RATIO\_HIGH} * A_3 \text{ or } B_3 = \text{MAP\_LOW} - \text{RATIO\_LOW} * A_3.$$

Herein, MAP_MAX indicates a maximum value of the amplitude correlation difference parameter that is between the left and right channels and that has undergone the mapping processing, MAP_HIGH indicates a high threshold of the amplitude correlation difference parameter that is between the left and right channels and that has undergone the mapping processing, MAP_LOW indicates a low threshold of the amplitude correlation difference parameter that is between the left and right channels and that has undergone the mapping processing, and MAP_MIN indicates a minimum value of the amplitude correlation difference parameter that is between the left and right channels and that has undergone the mapping processing; where

MAP_MAX>MAP_HIGH>MAP_LOW>MAP_MIN.

For example, in some embodiments of this application, MAP_MAX may be 2.0, MAP_HIGH may be 1.2, MAP_LOW may be 0.8, and MAP_MIN may be 0.0. Certainly, in actual application, the values are not limited to such an example.

RATIO_MAX indicates the maximum value of the amplitude-limited amplitude correlation difference parameter between the left and right channels, RATIO_HIGH indicates a high threshold of the amplitude-limited amplitude correlation difference parameter between the left and right channels, RATIO_LOW indicates a low threshold of the amplitude-limited amplitude correlation difference parameter between the left and right channels, and RATIO_MIN indicates the minimum value of the amplitude-limited amplitude correlation difference parameter between the left and right channels; where

RATIO_MAX>RATIO_HIGH>RATIO_LOW>RATIO_MIN.

For example, in some embodiments of this application, RATIO_MAX is 1.5, RATIO_HIGH is 0.75, RATIO_LOW is −0.75, and RATIO_MIN is −1.5. Certainly, in actual application, the values are not limited to such an example.

Another method in some embodiments of this application is as follows: The amplitude correlation difference parameter diff_lt_corr_map that is between the left and right channels and that has undergone the mapping processing meets:

Herein, diff_lt_corr_limit indicates the amplitude-limited amplitude correlation difference parameter between the left and right channels; where $$\text{diff\_lt\_corr\_limit} = \begin{cases} \text{RATIO\_MAX}, & \text{if diff\_lt\_corr} > \text{RATIO\_MAX} \\ \text{diff\_lt\_corr}, & \text{other} \\ -\text{RATIO\_MAX}, & \text{if diff\_lt\_corr} < -\text{RATIO\_MAX} \end{cases}$$

Herein, RATIO_MAX indicates a maximum amplitude of the amplitude correlation difference parameter between the left and right channels, and −RATIO_MAX indicates a minimum amplitude of the amplitude correlation difference parameter between the left and right channels. RATIO_MAX may be a preset empirical value, and RATIO_MAX may be, for example, 1.5, 3.0, or another real number greater than 0.

90852. Convert the amplitude correlation difference parameter that is between the left and right channels and that has undergone the mapping processing into a channel combination ratio factor.

The channel combination ratio factor ratio_SM meets:

$$\text{ratio\_SM} = \frac{1 - \cos\left(\frac{\pi}{2} * \text{diff\_lt\_corr\_map}\right)}{2},$$

where cos(•) indicates a cosine operation.

In addition to the foregoing method, another method may be used to convert the amplitude correlation difference parameter between the left and right channels into the channel combination ratio factor, for example:

whether the channel combination ratio factor corresponding to the anticorrelated signal channel combination scheme needs to be updated is determined based on the long-term smoothed frame energy of the left channel in the current frame, the long-term smoothed frame $$\text{diff\_lt\_corr\_map} = \begin{cases} 1.08 * \text{diff\_lt\_corr\_limi} + 0.38, & \text{if diff\_lt\_corr\_limit} > 0.5 * \text{RATIO\_MAX} \\ 0.64 * \text{diff\_lt\_corr\_limi} + 1.28, & \text{if diff\_lt\_corr\_limit} < -0.5 * \text{RATIO\_MAX} \\ 0.26 * \text{diff\_lt\_corr\_limi} + 0.995, & \text{other} \end{cases}$$

energy of the right channel in the current frame, and the inter-frame energy difference of the left channel in the current frame that are obtained through the signal energy analysis, a buffered encoding parameter of the previous frame in a history buffer of an encoder (for example, an inter-frame correlation parameter of a primary channel signal and an inter-frame correlation parameter of a secondary channel signal), channel combination scheme flags of the current frame and the previous frame, and channel combination ratio factors corresponding to the anticorrelated signal channel combination schemes for the current frame and the previous frame.

If the channel combination ratio factor corresponding to the anticorrelated signal channel combination scheme needs to be updated, the amplitude correlation difference parameter between the left and right channels is converted into the channel combination ratio factor by using the method in the foregoing example; otherwise, the channel combination ratio factor corresponding to the anticorrelated signal channel combination scheme for the previous frame and an encoded index of the channel combination ratio factor are directly used as the channel combination ratio factor corresponding to the anticorrelated signal channel combination scheme for the current frame and the encoded index of the channel combination ratio factor.

90853. Perform quantization encoding on the channel combination ratio factor obtained after conversion, and determine the channel combination ratio factor corresponding to the anticorrelated signal channel combination scheme for the current frame.

Specifically, for example, quantization encoding is performed on the channel combination ratio factor obtained after conversion, to obtain an initial encoded index ratio_idx_init_SM corresponding to the anticorrelated signal channel combination scheme for the current frame and a quantization-encoded initial value ratio_init_$SM_{qua}$ of the channel combination ratio factor corresponding to the anticorrelated signal channel combination scheme for the current frame; where $$ratio\_init\_SM_{qua}=ratio\_tabl\_SM[ratio\_idx\_init\_SM],$$

and ratio_tabl_SM indicates a codebook for performing scalar quantization on the channel combination ratio factor corresponding to the anticorrelated signal channel combination scheme.

Quantization encoding may be performed by using any scalar quantization method in conventional technologies, for example, uniform scalar quantization or non-uniform scalar quantization. A quantity of bits used for encoding may be 5 bits. A specific method is not described herein. The codebook for performing scalar quantization on the channel combination ratio factor corresponding to the anticorrelated signal channel combination scheme may be the same as or different from a codebook for performing scalar quantization on the channel combination ratio factor corresponding to the correlated signal channel combination scheme. When the codebooks are the same, only one codebook used for performing scalar quantization on the channel combination ratio factor needs to be stored.

In this case, the quantization-encoded initial value ratio_init_$SM_{qua}$ of the channel combination ratio factor corresponding to the anticorrelated signal channel combination scheme for the current frame is:

$$ratio\_init\_SM_{qua}=ratio\_tabl[ratio\_idx\_init\_SM].$$

For example, a method is: directly using the quantization-encoded initial value of the channel combination ratio factor corresponding to the anticorrelated signal channel combination scheme for the current frame as the channel combination ratio factor corresponding to the anticorrelated signal channel combination scheme for the current frame, and directly using the initial encoded index of the channel combination ratio factor corresponding to the anticorrelated signal channel combination scheme for the current frame as the encoded index of the channel combination ratio factor corresponding to the anticorrelated signal channel combination scheme for the current frame.

The encoded index ratio_idx_SM of the channel combination ratio factor corresponding to the anticorrelated signal channel combination scheme for the current frame meets: ratio_idx_SM=ratio_idx_init_SM.

The channel combination ratio factor corresponding to the anticorrelated signal channel combination scheme for the current frame meets:

$$ratio\_SM=ratio\_tabl[ratio\_idx\_SM]$$

Another method may be: modifying the quantization-encoded initial value of the channel combination ratio factor corresponding to the anticorrelated signal channel combination scheme for the current frame and the initial encoded index corresponding to the anticorrelated signal channel combination scheme for the current frame based on the encoded index of the channel combination ratio factor corresponding to the anticorrelated signal channel combination scheme for the previous frame or the channel combination ratio factor corresponding to the anticorrelated signal channel combination scheme for the previous frame; using a modified encoded index of the channel combination ratio factor corresponding to the anticorrelated signal channel combination scheme for the current frame as the encoded index of the channel combination ratio factor corresponding to the anticorrelated signal channel combination scheme for the current frame; and using a modified channel combination ratio factor corresponding to the anticorrelated signal channel combination scheme as the channel combination ratio factor corresponding to the anticorrelated signal channel combination scheme for the current frame.

The encoded index ratio_idx_SM of the channel combination ratio factor corresponding to the anticorrelated signal channel combination scheme for the current frame meets: ratio_idx_SM=$\phi$*ratio_idx_init_SM+(1−$\phi$)*tdm_last_ratio_idx_SM.

Herein, ratio_idx_init_SM indicates the initial encoded index corresponding to the anticorrelated signal channel combination scheme for the current frame; tdm_last_ratio_idx_SM is the encoded index of the channel combination ratio factor corresponding to the anticorrelated signal channel combination scheme for the previous frame; and $\phi$ is a modification factor of the channel combination ratio factor corresponding to the anticorrelated signal channel combination scheme. A value of $\phi$ may be an empirical value, and $\phi$ may be equal to, for example, 0.8.

The channel combination ratio factor corresponding to the anticorrelated signal channel combination scheme for the current frame meets:

$$ratio\_SM=ratio\_tabl[ratio\_idx\_SM]$$

Another method is: using the unquantized channel combination ratio factor corresponding to the anticorrelated signal channel combination scheme as the channel combination ratio factor corresponding to the anticorrelated signal channel combination scheme for the current frame. In other words, the channel combination ratio factor ratio_SM corresponding to the anticorrelated signal channel combination scheme for the current frame meets:

$$ratio\_SM = \frac{1-\cos\left(\frac{\pi}{2} * diff\_lt\_corr\_map\right)}{2}$$

In addition, the fourth method is: modifying the unquantized channel combination ratio factor corresponding to the anticorrelated signal channel combination scheme for the current frame based on the channel combination ratio factor corresponding to the anticorrelated signal channel combination scheme for the previous frame; using a modified channel combination ratio factor corresponding to the anticorrelated signal channel combination scheme as the channel combination ratio factor corresponding to the anticorrelated signal channel combination scheme for the current frame; and performing quantization encoding on the channel combination ratio factor corresponding to the anticorrelated signal channel combination scheme for the current frame, to obtain the encoded index of the channel combination ratio factor corresponding to the anticorrelated signal channel combination scheme for the current frame.

In addition to the foregoing methods, there may be many methods for converting the amplitude correlation difference parameter between the left and right channels into the channel combination ratio factor and performing encoding and quantization. Similarly, there are many different methods for determining the channel combination ratio factor corresponding to the anticorrelated signal channel combination scheme for the current frame and the encoded index of the channel combination ratio factor. This is not limited in this application.

909. Perform coding mode decision based on the channel combination scheme flag of the previous frame and the channel combination scheme flag of the current frame, to determine a coding mode of the current frame.

The channel combination scheme flag of the current frame is denoted as tdm_SM_flag the channel combination scheme flag of the previous frame is denoted as tdm_last_SM_flag, and a joint flag of the channel combination scheme flag of the previous frame and the channel combination scheme flag of the current frame may be denoted as (tdm_last_SM_flag, tdm_SM_flag). The coding mode decision may be performed based on the joint flag. Details are given in the following example.

It is assumed that the correlated signal channel combination scheme is represented by 0 and the anticorrelated signal channel combination scheme is represented by 1. In this case, the joint flag of the channel combination scheme flags of the previous frame and the current frame has the following four cases: (01), (11), (10), and (00), and the coding mode of the current frame is determined as: a correlated signal coding mode, an anticorrelated signal coding mode, a correlated-to-anticorrelated signal coding switching mode, and an anticorrelated-to-correlated signal coding switching mode. For example, if the joint flag of the channel combination scheme flags of the previous frame and the current frame is (00), it indicates that the coding mode of the current frame is the correlated signal coding mode; if the joint flag of the channel combination scheme flags of the previous frame and the current frame is (11), it indicates that the coding mode of the current frame is the anticorrelated signal coding mode; if the joint flag of the channel combination scheme flags of the previous frame and the current frame is (01), it indicates that the coding mode of the current frame is the correlated-to-anticorrelated signal coding switching mode; or if the joint flag of the channel combination scheme flags of the previous frame and the current frame is (10), it indicates that the coding mode of the current frame is the anticorrelated-to-correlated signal coding switching mode.

910. After obtaining the coding mode stereo tdm coder type of the current frame, the encoding apparatus performs time-domain downmix processing on the left and right channel signals in the current frame based on a time-domain downmix processing method corresponding to the coding mode of the current frame, to obtain the primary channel signal and the secondary channel signal in the current frame.

The coding mode of the current frame is one of a plurality of coding modes. For example, the plurality of coding modes may include a correlated-to-anticorrelated signal coding switching mode, an anticorrelated-to-correlated signal coding switching mode, a correlated signal coding mode, and an anticorrelated signal coding mode. For implementations of time-domain downmix processing in different coding modes, refer to related descriptions of examples in the foregoing embodiment. Details are not described herein again.

911. The encoding apparatus separately encodes the primary channel signal and the secondary channel signal to obtain an encoded primary channel signal and an encoded secondary channel signal.

In one embodiment, bit allocation may be first performed for encoding of the primary channel signal and encoding of the secondary channel signal based on parameter information obtained in encoding of a primary channel signal and/or a secondary channel signal in the previous frame and a total quantity of bits for encoding the primary channel signal and the secondary channel signal. Then, the primary channel signal and the secondary channel signal are separately encoded based on a result of the bit allocation, to obtain an encoded index of primary channel encoding and an encoded index of secondary channel encoding. Primary channel encoding and secondary channel encoding may be implemented by using any mono audio encoding technology, which is not further described herein.

912. The encoding apparatus selects a corresponding encoded index of a channel combination ratio factor based on the channel combination scheme flag and writes the encoded index into a bitstream, and writes the encoded primary channel signal, the encoded secondary channel signal, and the channel combination scheme flag of the current frame into the bitstream.

In one embodiment, for example, if the channel combination scheme flag tdm_SM_flag of the current frame corresponds to the correlated signal channel combination scheme, the encoded index ratio_idx of the channel combination ratio factor corresponding to the correlated signal channel combination scheme for the current frame is written into the bitstream; or if the channel combination scheme flag tdm_SM_flag of the current frame corresponds to the anticorrelated signal channel combination scheme, the encoded index ratio_idx_SM of the channel combination ratio factor corresponding to the anticorrelated signal channel combination scheme for the current frame is written into the bitstream. For example, if tdm_SM_flag=0, the encoded index ratio_idx of the channel combination ratio factor corresponding to the correlated signal channel combination scheme for the current frame is written into the bitstream; or if tdm_SM_flag=1, the encoded index ratio_idx_SM of the channel combination ratio factor corresponding to the anticorrelated signal channel combination scheme for the current frame is written into the bitstream.

In addition, the encoded primary channel signal, the encoded secondary channel signal, and the channel combination scheme flag of the current frame are written into the bitstream. It may be understood that there is no sequence for performing the bitstream writing operation.

Correspondingly, the following describes a time-domain stereo decoding scenario by using an example.

Referring to FIG. 10, the following further provides an audio decoding method. Related operations of the audio decoding method may be specifically implemented by a decoding apparatus, and the method may specifically include the following operations.

1001. Perform decoding based on a bitstream to obtain decoded primary and secondary channel signals in a current frame.

1002. Perform decoding based on the bitstream to obtain a time-domain stereo parameter of the current frame.

The time-domain stereo parameter of the current frame includes a channel combination ratio factor of the current frame (the bitstream includes an encoded index of the channel combination ratio factor of the current frame, and decoding may be performed based on the encoded index of the channel combination ratio factor of the current frame to obtain the channel combination ratio factor of the current frame), and may further include an inter-channel time difference of the current frame (for example, the bitstream includes an encoded index of the inter-channel time difference of the current frame, and decoding may be performed based on the encoded index of the inter-channel time difference of the current frame, to obtain the inter-channel time difference of the current frame; or the bitstream includes an encoded index of an absolute value of the inter-channel time difference of the current frame, and decoding may be performed based on the encoded index of the absolute value of the inter-channel time difference of the current frame, to obtain the absolute value of the inter-channel time difference of the current frame), and the like.

1003. Obtain, based on the bitstream, a channel combination scheme flag of the current frame that is included in the bitstream, and determine a channel combination scheme for the current frame.

1004. Determine a decoding mode of the current frame based on the channel combination scheme for the current frame and a channel combination scheme for a previous frame.

For determining the decoding mode of the current frame based on the channel combination scheme for the current frame and the channel combination scheme for the previous frame, refer to the method for determining the coding mode of the current frame in operation 909. The decoding mode of the current frame is one of a plurality of decoding modes. For example, the plurality of decoding modes may include a correlated-to-anticorrelated signal decoding switching mode, an anticorrelated-to-correlated signal decoding switching mode, a correlated signal decoding mode, and an anticorrelated signal decoding mode. The coding modes and the decoding modes are in a one-to-one correspondence.

For example, if a joint flag of the channel combination scheme flags of the previous frame and the current frame is (00), it indicates that the decoding mode of the current frame is the correlated signal decoding mode; if the joint flag of the channel combination scheme flags of the previous frame and the current frame is (11), it indicates that the decoding mode of the current frame is the anticorrelated signal decoding mode; if the joint flag of the channel combination scheme flags of the previous frame and the current frame is (01), it indicates that the decoding mode of the current frame is the correlated-to-anticorrelated signal decoding switching mode; or if the joint flag of the channel combination scheme flags of the previous frame and the current frame is (10), it indicates that the decoding mode of the current frame is the anticorrelated-to-correlated signal decoding switching mode.

It may be understood that there is no necessary sequence for performing operation 1001, operation 1002, and operations 1003 and 1004.

1005. Perform time-domain upmix processing on the decoded primary and secondary channel signals in the current frame by using a time-domain upmix processing manner corresponding to the determined decoding mode of the current frame, to obtain reconstructed left and right channel signals in the current frame.

For related implementations of time-domain upmix processing in different decoding modes, refer to related descriptions of examples in the foregoing embodiment. Details are not described herein again.

An upmix matrix used for time-domain upmix processing is constructed based on the obtained channel combination ratio factor of the current frame.

The reconstructed left and right channel signals in the current frame may be used as decoded left and right channel signals in the current frame.

Alternatively, further, delay adjustment may be performed for the reconstructed left and right channel signals in the current frame based on the inter-channel time difference of the current frame to obtain reconstructed left and right channel signals that have undergone delay adjustment in the current frame, and the reconstructed left and right channel signals that have undergone delay adjustment in the current frame may be used as the decoded left and right channel signals in the current frame. Alternatively, further, time-domain post-processing may be performed for the reconstructed left and right channel signals that have undergone delay adjustment in the current frame, and reconstructed left and right channel signals that have undergone time-domain post-processing in the current frame may be used as the decoded left and right channel signals in the current frame.

The foregoing describes in detail the methods in the embodiments of this application. The following describes apparatuses in the embodiments of this application.

Referring to FIG. 11-A, an embodiment of this application further provides an apparatus 1100. The apparatus 1100 may include:

- a processor 1110 and a memory 1120 that are coupled to each other, where the processor 1110 may be configured to perform some or all operations of any method provided in the embodiments of this application.

The memory 1120 includes but is not limited to a random access memory (RAM), a read-only memory (ROM), an erasable programmable read only memory (EPROM), or a compact disc read-only memory (CD-ROM). The memory 1102 is configured to store a related instruction and related data.

Certainly, the apparatus 1100 may further include a transceiver 1130 configured to receive and send data.

The processor 1110 may be one or more central processing units (CPU). When the processor 1110 is one CPU, the CPU may be a single-core CPU, or may be a multi-core CPU. The processor 1110 may be specifically a digital signal processor.

In an implementation process, operations in the foregoing methods can be implemented by using a hardware integrated logical circuit in the processor 1110, or by using instructions in a form of software. The processor 1110 may be a general purpose processor, a digital signal processor, an application-specific integrated circuit, a field programmable gate array or another programmable logic device, a discrete gate or a transistor logic device, or a discrete hardware component. The processor 1110 may implement or perform the methods, the operations, and the logical block diagrams disclosed in the embodiments of the present disclosure. The general purpose processor may be a microprocessor, or the processor may be any conventional processor or the like. Operations of the methods disclosed with reference to the embodiments of the present disclosure may be directly performed and accomplished by using a hardware decoding processor, or may be performed and accomplished by using a combination of hardware and software modules in the decoding processor.

The software module may be located in a mature storage medium in the art, such as a random access memory, a flash memory, a read-only memory, a programmable read-only memory, an electrically erasable programmable memory, or a register. The storage medium is located in the memory 1120. For example, the processor 1110 may read information in the memory 1120, and complete the operations in the foregoing methods in combination with hardware of the processor 1110.

Further, the apparatus 1100 may further include a transceiver 1130. The transceiver 1130 may be, for example, configured to receive and send related data (for example, an instruction, a channel signal, or a bitstream).

For example, the apparatus 1100 may perform some or all operations of a corresponding method in any embodiment shown in FIG. 2 to FIG. 9-D.

In one embodiment, for example, when the apparatus 1100 performs related operations of the foregoing encoding, the apparatus 1100 may be referred to as an encoding apparatus (or an audio encoding apparatus). When the apparatus 1100 performs related operations of the foregoing decoding, the apparatus 1100 may be referred to as a decoding apparatus (or an audio decoding apparatus).

Referring to FIG. 11-B, when the apparatus 1100 is an encoding apparatus, for example, the apparatus 1100 may further include: a microphone 1140, an analog-to-digital converter 1150, and the like.

For example, the microphone 1140 may be configured to perform sampling to obtain an analog audio signal.

For example, the analog-to-digital converter 1150 may be configured to convert an analog audio signal to a digital audio signal.

Referring to FIG. 11-C, when the apparatus 1100 is an encoding apparatus, for example, the apparatus 1100 may further include: a speaker 1160, a digital-to-analog converter 1170, and the like.

For example, the digital-to-analog converter 1170 may be configured to convert a digital audio signal into an analog audio signal.

For example, the speaker 1160 may be configured to play an analog audio signal.

In addition, referring to FIG. 12-A, an embodiment of this application provides an apparatus 1200, including several functional units configured to implement any method provided in the embodiments of this application.

For example, when the apparatus 1200 performs the corresponding method in the embodiment shown in FIG. 2, the apparatus 1200 may include:

a first determining unit 1210, configured to: determine a channel combination scheme for a current frame, and determine a coding mode of the current frame based on a channel combination scheme for a previous frame and the channel combination scheme for the current frame; and an encoding unit 1220, configured to perform time-domain downmix processing on left and right channel signals in the current frame based on time-domain downmix processing corresponding to the coding mode of the current frame, to obtain primary and secondary channel signals in the current frame.

In addition, referring to FIG. 12-B, the apparatus 1200 may further include a second determining unit 1230, configured to determine a time-domain stereo parameter of the current frame. The encoding unit 1220 may be further configured to encode the time-domain stereo parameter of the current frame.

In one embodiment, referring to FIG. 12-C, when the apparatus 1200 performs the corresponding method in the embodiment shown in FIG. 3, the apparatus 1200 may include:

a third determining unit 1240, configured to: determine a channel combination scheme for a current frame based on a channel combination scheme flag of the current frame that is in a bitstream; and determine a decoding mode of the current frame based on a channel combination scheme for a previous frame and the channel combination scheme for the current frame; and a decoding unit 1250, configured to: perform decoding based on the bitstream, to obtain decoded primary and secondary channel signals in the current frame; and perform time-domain upmix processing on the decoded primary and secondary channel signals in the current frame based on time-domain upmix processing corresponding to the decoding mode of the current frame, to obtain reconstructed left and right channel signals in the current frame.

A case in which the apparatus performs another method is deduced by analogy.

An embodiment of this application provides a computer readable storage medium. The computer readable storage medium stores program code, and the program code includes instructions for performing some or all operations in any method provided in the embodiments of this application.

An embodiment of this application provides a computer program product. When the computer program product is run on a computer, the computer is enabled to perform some or all operations in any method provided in the embodiments of this application.

In the foregoing embodiments, the description of all embodiments has respective focuses. For a part that is not described in detail in an embodiment, refer to related description in another embodiment.

In the several embodiments provided in this application, it should be understood that the disclosed apparatus may be implemented in another manner. For example, the described apparatus embodiment is merely an example. For example, the unit division is merely logical function division or may be other division in actual implementation. For example, a plurality of units or components may be combined or integrated into another system, or some features may be ignored or not performed. In addition, the displayed or described mutual indirect couplings or direct couplings or communication connections may be implemented by using some interfaces. The indirect couplings or communication connections between the apparatuses or units may be implemented in electronic or other forms.

The units described as separate parts may or may not be physically separate, and components displayed as units may or may not be physical units. To be specific, the components may be located in one position, or may be distributed onto a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or a part of the operations of the methods described in the embodiments of the present disclosure. The foregoing storage medium includes any medium that can store program code, such as a USB flash drive, a read-only memory (ROM, Read-Only Memory), a random access memory (RAM, Random Access Memory), a removable hard disk, a magnetic disk, or an optical disc.

What is claimed is:

1. An audio encoding method, comprising:

determining a channel combination scheme for a current frame;

performing, based on the channel combination scheme for the current frame and a channel combination scheme for a previous frame, segmented time-domain mix processing on a left and a right channel signals in the current frame to obtain a primary channel signal and a secondary channel signal in the current frame when the channel combination scheme for the current frame is different from the channel combination scheme for the previous frame;

encoding the obtained primary channel signal and secondary channel signal in the current frame;

wherein the channel combination scheme for the current frame is one of a plurality of channel combination schemes, the plurality of channel combination schemes including an anticorrelated signal channel combination scheme corresponding to a near out of phase signal; and the performing segmented time-domain mix processing comprises:

performing, by using a first channel combination ratio factor corresponding to the previous frame, time-domain mix processing on start segments of the left and right channel signals in the current frame, to obtain start segments of the primary and secondary channel signals in the current frame;

performing, by using the first channel combination ratio factor, time-domain mix processing on middle segments of the left and right channel signals in the current frame, to obtain first temporal middle segments of the primary and secondary channel signals in the current frame;

performing, by using a second channel combination ratio factor corresponding to the current frame, time-domain mix processing on the middle segments of the left and right channel signals in the current frame, to obtain second temporal middle segments of the primary and secondary channel signals in the current frame; and obtaining middle segments of the primary and secondary channel signals in the current frame based on the first temporal middle segments and the second temporal middle segments.

2. The method according to claim 1, wherein the left and right channel signals in the current frame at least comprise the start segments of the left and right channel signals, and end segments of the left and right channel signals, and the primary and secondary channel signals in the current frame at least comprise the start segments of the primary and secondary channel signals, and end segments of the primary and secondary channel signals;

wherein the performing, based on the channel combination scheme for the current frame and the channel combination scheme for the previous frame, segmented time-domain mix processing on left and right channel signals in the current frame to obtain a primary channel signal and a secondary channel signal in the current frame comprises:

performing, based on the start segments of the left and right channel signals and the end segments of the left and right channel signals, segmented time-domain mix processing to obtain the start segments of the primary and secondary channel signals and the end segments of the primary and secondary channel signals, respectively.

3. The method according to claim 2, wherein when the channel combination scheme for the previous frame is a correlated signal channel combination scheme, and the channel combination scheme for the current frame is the anticorrelated signal channel combination scheme, the performing, based on the start segments of the left and right channel signals and the end segments of the left and right channel signals, segmented time-domain mix processing to obtain the start segments of the primary and secondary channel signals and the end segments of the primary and secondary channel signals, respectively, comprises:

performing, by using a channel combination ratio factor corresponding to the anticorrelated signal channel combination scheme for the current frame and a time-domain mix processing manner corresponding to the anticorrelated signal channel combination scheme for the current frame, time-domain mix processing on the end segments of the left and right channel signals in the current frame, to obtain the end segments of the primary and secondary channel signals in the current frame.

4. The method according to claim 2, wherein when the channel combination scheme for the previous frame is the anticorrelated signal channel combination scheme, and the channel combination scheme for the current frame is a correlated signal channel combination scheme, the performing, based on the start segments of the left and right channel signals and the end segments of the left and right channel signals, segmented time-domain mix processing to obtain the start segments of the primary and secondary channel signals and the end segments of the primary and secondary channel signals, respectively, comprises:

performing, by using a channel combination ratio factor corresponding to the anticorrelated signal channel combination scheme for the previous frame and a time-domain mix processing manner corresponding to the anticorrelated signal channel combination scheme for the previous frame, time-domain mix processing on the start segments of the left and right channel signals in the current frame, to obtain the start segments of the primary and secondary channel signals in the current frame; and performing, by using a channel combination ratio factor corresponding to the correlated signal channel combination scheme for the current frame and a time-domain mix processing manner corresponding to the correlated signal channel combination scheme for the current frame, time-domain mix processing on the end segments of the left and right channel signals in the current frame, to obtain the end segments of the primary and secondary channel signals in the current frame.

5. A time-domain stereo encoding apparatus, comprising:

a memory for storing processor-executable instructions; and a processor operatively coupled to the memory, the processor being configured to execute the processor-executable instructions to perform operations, the operations including:

determining a channel combination scheme for a current frame;

performing, based on the channel combination scheme for the current frame and a channel combination scheme for a previous frame, segmented time-domain mix processing on a left and a right channel signals in the current frame to obtain a primary channel signal and a secondary channel signal in the current frame when the channel combination scheme for the current frame is different from the channel combination scheme for the previous frame;

encoding the obtained primary channel signal and secondary channel signal in the current frame;

wherein the channel combination scheme for the current frame is one of a plurality of channel combination schemes, the plurality of channel combination schemes including an anticorrelated signal channel combination scheme corresponding to a near out of phase signal; and the performing segmented time-domain mix processing comprises:

performing, by using a first channel combination ratio factor corresponding to the previous frame, time-domain mix processing on start segments of the left and right channel signals in the current frame, to obtain start segments of the primary and secondary channel signals in the current frame;

performing, by using the first channel combination ratio factor, time-domain mix processing on middle segments of the left and right channel signals in the current frame, to obtain first temporal middle segments of the primary and secondary channel signals in the current frame;

performing, by using a second channel combination ratio factor corresponding to the current frame, time-domain mix processing on the middle segments of the left and right channel signals in the current frame, to obtain second temporal middle segments of the primary and secondary channel signals in the current frame; and obtaining middle segments of the primary and secondary channel signals in the current frame based on the first temporal middle segments and the second temporal middle segments.

6. The apparatus according to claim 5, wherein the left and right channel signals in the current frame at least comprise the start segments of the left and right channel signals, and end segments of the left and right channel signals, and the primary and secondary channel signals in the current frame at least comprise the start segments of the primary and secondary channel signals, and end segments of the primary and secondary channel signals;

wherein the performing, based on the channel combination scheme for the current frame and the channel combination scheme for the previous frame, segmented time-domain mix processing on left and right channel signals in the current frame to obtain a primary channel signal and a secondary channel signal in the current frame comprises:

performing, based on the start segments of the left and right channel signals and the end segments of the left and right channel signals, segmented time-domain mix processing to obtain the start segments of the primary and secondary channel signals and the end segments of the primary and secondary channel signals, respectively.

7. The apparatus according to claim 6, wherein when the channel combination scheme for the previous frame is a correlated signal channel combination scheme, and the channel combination scheme for the current frame is an anticorrelated signal channel combination scheme, the processor performs, based on the start segments of the left and right channel signals and the end segments of the left and right channel signals, segmented time-domain mix processing to obtain the start segments of the primary and secondary channel signals and the end segments of the primary and secondary channel signals, respectively, further comprises:

performing, by using a channel combination ratio factor corresponding to the anticorrelated signal channel combination scheme for the current frame and a time-domain mix processing manner corresponding to the anticorrelated signal channel combination scheme for the current frame, time-domain mix processing on the end segments of the left and right channel signals in the current frame, to obtain the end segments of the primary and secondary channel signals in the current frame.

8. The apparatus according to claim 6, wherein when the channel combination scheme for the previous frame is an anticorrelated signal channel combination scheme, and the channel combination scheme for the current frame is a correlated signal channel combination scheme, the processor performs, based on the start segments of the left and right channel signals and the end segments of the left and right channel signals, segmented time-domain mix processing to obtain the start segments of the primary and secondary channel signals and the end segments of the primary and secondary channel signals, respectively, comprises:

performing, by using a channel combination ratio factor corresponding to the anticorrelated signal channel combination scheme for the previous frame and a time-domain mix processing manner corresponding to the anticorrelated signal channel combination scheme for the previous frame, time-domain mix processing on the start segments of the left and right channel signals in the current frame, to obtain the start segments of the primary and secondary channel signals in the current frame; and performing, by using a channel combination ratio factor corresponding to the correlated signal channel combination scheme for the current frame and a time-domain mix processing manner corresponding to the correlated signal channel combination scheme for the current frame, time-domain mix processing on the end segments of the left and right channel signals in the current frame, to obtain the end segments of the primary and secondary channel signals in the current frame.

9. A non-transitory computer-readable storage medium storing computer instructions, that when executed by one or more processors, cause the one or more processors to perform operations of:

determining a channel combination scheme for a current frame;

performing, based on the channel combination scheme for the current frame and a channel combination scheme for a previous frame, segmented time-domain mix processing on a left and a right channel signals in the current frame to obtain a primary channel signal and a secondary channel signal in the current frame when the channel combination scheme for the current frame is different from the channel combination scheme for the previous frame;

encoding the obtained primary channel signal and secondary channel signal in the current frame;

wherein the channel combination scheme for the current frame is one of a plurality of channel combination schemes, the plurality of channel combination schemes including an anticorrelated signal channel combination scheme corresponding to a near out of phase signal; and the performing segmented time-domain mix processing comprises:

performing, by using a first channel combination ratio factor corresponding to the previous frame, time-domain mix processing on start segments of the left and right channel signals in the current frame, to obtain start segments of the primary and secondary channel signals in the current frame;

performing, by using the first channel combination ratio factor, time-domain mix processing on middle segments of the left and right channel signals in the current frame, to obtain first temporal middle segments of the primary and secondary channel signals in the current frame;

performing, by using a second channel combination ratio factor corresponding to the current frame, time-domain mix processing on the middle segments of the left and right channel signals in the current frame, to obtain second temporal middle segments of the primary and secondary channel signals in the current frame; and obtaining middle segments of the primary and secondary channel signals in the current frame based on the first temporal middle segments and the second temporal middle segments.

10. The non-transitory computer-readable storage medium according to claim 9, wherein the left and right channel signals in the current frame at least comprise the start segments of the left and right channel signals, and end segments of the left and right channel signals, and the primary and secondary channel signals in the current frame at least comprise the start segments of the primary and secondary channel signals, and end segments of the primary and secondary channel signals;

wherein the performing, based on the channel combination scheme for the current frame and the channel combination scheme for the previous frame, segmented time-domain mix processing on left and right channel signals in the current frame to obtain a primary channel signal and a secondary channel signal in the current frame comprises:

performing, based on the start segments of the left and right channel signals and the end segments of the left and right channel signals, segmented time-domain mix processing to obtain the start segments of the primary and secondary channel signals and the end segments of the primary and secondary channel signals, respectively.

11. The non-transitory computer-readable storage medium according to claim 10, wherein when the channel combination scheme for the previous frame is a correlated signal channel combination scheme, and the channel combination scheme for the current frame is an anticorrelated signal channel combination scheme, the performing, based on the start segments of the left and right channel signals and the end segments of the left and right channel signals, segmented time-domain mix processing to obtain the start segments of the primary and secondary channel signals and the end segments of the primary and secondary channel signals, respectively, further comprises:

performing, by using a channel combination ratio factor corresponding to the anticorrelated signal channel combination scheme for the current frame and a time-domain mix processing manner corresponding to the anticorrelated signal channel combination scheme for the current frame, time-domain mix processing on the end segments of the left and right channel signals in the current frame, to obtain the end segments of the primary and secondary channel signals in the current frame.

12. The non-transitory computer-readable storage medium according to claim 10, wherein when the channel combination scheme for the previous frame is an anticorrelated signal channel combination scheme, and the channel combination scheme for the current frame is a correlated signal channel combination scheme, the performing, based on the start segments of the left and right channel signals and the end segments of the left and right channel signals, segmented time-domain mix processing to obtain the start segments of the primary and secondary channel signals and the end segments of the primary and secondary channel signals, respectively, comprises:

performing, by using a channel combination ratio factor corresponding to the anticorrelated signal channel combination scheme for the previous frame and a time-domain mix processing manner corresponding to the anticorrelated signal channel combination scheme for the previous frame, time-domain mix processing on the start segments of the left and right channel signals in the current frame, to obtain the start segments of the primary and secondary channel signals in the current frame; and performing, by using a channel combination ratio factor corresponding to the correlated signal channel combination scheme for the current frame and a time-domain mix processing manner corresponding to the correlated signal channel combination scheme for the current frame, time-domain mix processing on the end segments of the left and right channel signals in the current frame, to obtain the end segments of the primary and secondary channel signals in the current frame.

* * * * *